(12) United States Patent
Hoag et al.

(10) Patent No.: US 9,895,730 B2
(45) Date of Patent: Feb. 20, 2018

(54) METHOD FOR EXTRACTION AND SURFACTANT ENHANCED SUBSURFACE CONTAMINANT RECOVERY

(75) Inventors: George E. Hoag, Bloomfield, CT (US); John B. Collins, Bloomfield, CT (US); Douglas K. Anderson, Bloomfield, CT (US)

(73) Assignee: Ethical Solutions, LLC, South Windsor, CT (US)

( * ) Notice: Subject to any disclaimer, the term of this patent is extended or adjusted under 35 U.S.C. 154(b) by 0 days.

(21) Appl. No.: 12/667,478

(22) PCT Filed: Sep. 26, 2008

(86) PCT No.: PCT/US2008/011229
§ 371 (c)(1),
(2), (4) Date: Mar. 18, 2010

(87) PCT Pub. No.: WO2009/042224
PCT Pub. Date: Apr. 2, 2009

(65) Prior Publication Data
US 2010/0185039 A1   Jul. 22, 2010

Related U.S. Application Data

(60) Provisional application No. 60/960,347, filed on Sep. 26, 2007, provisional application No. 61/071,526, filed on May 5, 2008.

(51) Int. Cl.
*B09C 1/08* (2006.01)
*B09C 1/00* (2006.01)
*B09C 1/02* (2006.01)

(52) U.S. Cl.
CPC ............... *B09C 1/08* (2013.01); *B09C 1/00* (2013.01); *B09C 1/002* (2013.01); *B09C 1/02* (2013.01)

(58) Field of Classification Search
None
See application file for complete search history.

(56) References Cited

U.S. PATENT DOCUMENTS

| 3,640,821 A | 2/1972 | Sweeny et al. |
| 3,938,590 A | 2/1976 | Redford et al. |
| (Continued) | | |

FOREIGN PATENT DOCUMENTS

| EP | 0706427 A1 | 4/1996 |
| WO | WO-1995/001232 A1 | 1/1995 |
| (Continued) | | |

OTHER PUBLICATIONS

Nadagouda, M. et al "Green Synthesis of Au Nanostructures at Room Temperature Using Biodegradable Plant surfactants" Crystal Growth Design. vol. 9, 4979-4983 (2009).*

(Continued)

*Primary Examiner* — Sheng H Davis
(74) *Attorney, Agent, or Firm* — Alix, Yale & Ristas, LLP

(57) ABSTRACT

Methods and compositions for removing contaminants from soil and groundwater by extracting the contaminants and assisting the extraction by provision of an oxidant introduced prior to or simultaneously with a surfactant into the subsurface. Extractable contaminant can be extracted from the subsurface. The amount and/or distribution of contaminant in the subsurface can be characterized. The extracting of contaminant and the introducing of oxidant and surfactant can be coordinated to reduce contaminant to a target amount. A portion of the contaminant can be oxidizable.

33 Claims, 53 Drawing Sheets

(56) References Cited

U.S. PATENT DOCUMENTS

| | | | |
|---|---|---|---|
| 4,068,717 A | 1/1978 | Needham | |
| 4,101,172 A | 7/1978 | Rabbitts | |
| 4,229,281 A | 10/1980 | Alquist et al. | |
| 4,321,147 A | 3/1982 | McCoy et al. | |
| 4,338,185 A | 7/1982 | Noelle | |
| 4,353,806 A | 10/1982 | Canter et al. | |
| 4,360,061 A | 11/1982 | Canter et al. | |
| 4,368,111 A | 1/1983 | Siefkin et al. | |
| 4,389,399 A | 6/1983 | Murdock | |
| 4,405,015 A | 9/1983 | McCoy et al. | |
| 4,470,899 A | 9/1984 | Miller et al. | |
| 4,474,616 A | 10/1984 | Smith et al. | |
| 4,968,412 A | 11/1990 | Guymon | |
| 5,000,872 A | 3/1991 | Olah | |
| 5,009,773 A | 4/1991 | Schramm et al. | |
| 5,143,598 A | 9/1992 | Graham et al. | |
| 5,286,141 A | 2/1994 | Vigneri | |
| 5,319,966 A | 6/1994 | Jackson et al. | |
| 5,340,467 A | 8/1994 | Gregoli et al. | |
| 5,399,350 A | 3/1995 | Potter | |
| 5,414,207 A * | 5/1995 | Ritter | 588/317 |
| 5,484,549 A * | 1/1996 | Hei et al. | 510/370 |
| 5,546,134 A | 8/1996 | Lee | |
| 5,560,737 A * | 10/1996 | Schuring et al. | 405/128.45 |
| 5,602,090 A | 2/1997 | Melikyan et al. | |
| 5,622,641 A | 4/1997 | Kim et al. | |
| 5,641,020 A | 6/1997 | Cherry et al. | |
| 5,741,427 A * | 4/1998 | Watts et al. | 210/747 |
| 5,829,691 A * | 11/1998 | Gaudin | 241/46.01 |
| 5,846,434 A | 12/1998 | Seaman et al. | |
| 5,849,201 A | 12/1998 | Bradley | |
| 5,905,036 A | 5/1999 | Pope et al. | |
| 5,948,242 A | 9/1999 | Ohsol et al. | |
| 5,968,249 A | 10/1999 | Duyvesteyn et al. | |
| 6,003,206 A | 12/1999 | Hall et al. | |
| 6,019,548 A * | 2/2000 | Hoag et al. | 405/128.5 |
| 6,019,888 A | 2/2000 | Mishra et al. | |
| 6,039,882 A | 3/2000 | Wolfe et al. | |
| 6,099,206 A | 8/2000 | Pennell | |
| 6,127,319 A | 10/2000 | House | |
| 6,158,924 A | 12/2000 | Athens et al. | |
| 6,242,663 B1 | 6/2001 | Ponder et al. | |
| 6,261,463 B1 | 7/2001 | Jacob et al. | |
| 6,261,986 B1 | 7/2001 | Bowman et al. | |
| 6,274,048 B1 | 8/2001 | Parker et al. | |
| 6,315,494 B1 | 11/2001 | Oberle | |
| 6,321,595 B1 | 11/2001 | Pope et al. | |
| 6,352,387 B1 * | 3/2002 | Briggs et al. | 405/128.25 |
| 6,387,278 B1 * | 5/2002 | Leif et al. | 210/747 |
| 6,474,908 B1 | 11/2002 | Hoag et al. | |
| 6,511,954 B1 | 1/2003 | Wilbur et al. | |
| 6,596,190 B1 | 7/2003 | Igawa et al. | |
| 6,623,211 B2 | 9/2003 | Kukor et al. | |
| 6,689,485 B2 | 2/2004 | Ponder et al. | |
| 6,719,902 B1 | 4/2004 | Alvarez et al. | |
| 6,726,406 B2 | 4/2004 | Gilmore et al. | |
| 6,777,449 B2 | 8/2004 | Vance et al. | |
| 6,869,535 B2 | 3/2005 | Cowdery et al. | |
| 6,881,490 B2 | 4/2005 | Kambe et al. | |
| 6,913,419 B2 | 7/2005 | Shiau | |
| 6,945,734 B1 | 9/2005 | Hayes et al. | |
| 7,021,863 B2 | 4/2006 | Shiau | |
| 7,056,061 B2 | 6/2006 | Kukor et al. | |
| 7,066,254 B2 | 6/2006 | Vinegar et al. | |
| 7,128,841 B2 | 10/2006 | Zhang | |
| 7,141,162 B2 | 11/2006 | Garner et al. | |
| 7,175,717 B2 | 2/2007 | Song et al. | |
| 7,186,673 B2 | 3/2007 | Varadaraj et al. | |
| 7,192,092 B2 | 3/2007 | Watson | |
| 7,226,966 B2 | 6/2007 | Kambe et al. | |
| 7,229,950 B2 | 6/2007 | Shpakoff et al. | |
| 7,300,227 B2 * | 11/2007 | Li | B09C 1/00 210/747.7 |
| 7,334,965 B2 | 2/2008 | Yang | |
| 7,364,386 B2 | 4/2008 | Shiau | |
| 7,431,775 B2 | 10/2008 | Wang et al. | |
| 7,553,105 B1 * | 6/2009 | Dugan et al. | 405/128.75 |
| 2002/0011442 A1 | 1/2002 | McMurtrey et al. | |
| 2002/0030022 A1 * | 3/2002 | Bradley | 210/752 |
| 2002/0179530 A1 * | 12/2002 | Cowdery et al. | 210/638 |
| 2003/0059926 A1 * | 3/2003 | deTorres | 435/262.5 |
| 2003/0175081 A1 * | 9/2003 | Shiau | 405/128.7 |
| 2004/0228690 A1 * | 11/2004 | Stegemeier et al. | 405/128.45 |
| 2005/0077242 A1 | 4/2005 | Karlsson | |
| 2005/0119353 A1 | 6/2005 | Detorres | |
| 2005/0191131 A1 | 9/2005 | Shiau | |
| 2005/0197267 A1 | 9/2005 | Zaki et al. | |
| 2006/0046297 A1 | 3/2006 | Ball | |
| 2006/0054570 A1 * | 3/2006 | Block et al. | 210/759 |
| 2006/0175266 A1 * | 8/2006 | Rima et al. | 210/764 |
| 2007/0116524 A1 | 5/2007 | Shiau | |
| 2008/0003687 A1 | 1/2008 | Satoh et al. | |
| 2008/0207981 A1 | 8/2008 | Hoag et al. | |
| 2008/0237141 A1 * | 10/2008 | Kerfoot | 210/739 |
| 2009/0245939 A1 * | 10/2009 | Burns et al. | 405/128.75 |
| 2010/0209193 A1 | 8/2010 | Hoag et al. | |
| 2010/0209194 A1 | 8/2010 | Guite et al. | |

FOREIGN PATENT DOCUMENTS

| | | |
|---|---|---|
| WO | WO-1998/025857 A1 | 6/1998 |
| WO | WO-2003/068324 | 8/2003 |
| WO | WO-2009/042228 | 4/2006 |
| WO | WO-2006/055054 A1 | 5/2006 |
| WO | WO-2006/068354 A1 | 6/2006 |
| WO | WO-2007/126779 A2 | 11/2007 |
| WO | WO-2009/014697 | 1/2009 |
| WO | WO-2009/042223 A2 | 4/2009 |
| WO | WO-2009/042224 A1 | 4/2009 |
| WO | WO-2009/140694 | 5/2009 |
| WO | WO-2009/114145 A2 | 9/2009 |

OTHER PUBLICATIONS

Diallo, M. et al. "solubilization of Nonaqueous Phase liquid Hydrocarbons in Micellar Solutions of Dodecyl Alcohol Ethoxylates" Enviorn. Sci. Technol. 28, 1929-1837 (1994).*

Adventus Group, Products: Overview for Accelerated Bioremediation Accessed Apr. 15, 2007, www.adventusgroup.com/products/technologies.shtml.

Adventus Group. Groundwater Solutions. Accessed Apr. 15, 2007, www.adventusgroup.com/solutions/groundwater.shtml.

Anastas PT, Warner JC. Green Chemistry: Theory and Practice, Oxford University Press, Inc: New York. 1998.

Arcadis. Perchlorate. www.arcadis-us.com.

Beal DR, Faircloth H, Tackling Tough Groundwater Contaminants: the presence of dense non-aqueous-phase liquids (DNAPLs) in the sub-surfaces requires some unconventional approaches to site investigation and remediation, Chemical Engineering, Mar. 2002, 91-94.

Bergendahl J, Thies T. Fenton's Oxidation of MTBE with Zero-valent Iron. 2004. Water Research. 38:327-334.

Block, PA, Brown RA, Robinson, D. Novel activation technologies for sodium persulfate in situ chemical oxidation. Proceedings of the Fourth International Conference on the Remediation of Chlorinated and Recalcitrant Compounds, Monterey, CA, May 2004. Batelle Press, Columbus, OH. 2004.

Boussahel R, Hark D, Mammar M, Lanara-Mohamed S. Degradation of Obsolete DDT by Fenton Oxidation with Zero-Valent Iron., Desalination 2007, 206: 369-372. Presented at the EuroMed 2006 Conference on Desalination Strategies in South Mediterranean Countries, Montpellier, France May 21-25, 2006.

Carvel DD, Cartwright RT Innovative heavy oil contaminant remediation at typical MGP remediation sites. 2005. Unpublished data from web sites: http://www.mecx.net/services1.html.

Choi CW, Kin SC, Hwang SS, Choi BK, Ahn HJ, Lee MY, Park SH, Kim SK. Antioxidant activity and free radical scavenging capacity between Korean medicinal plants and flavonoid by assay-guided comparison. Plant Science 2002, 16: 1161-1168.

Chun H, Scriven LE. Hydrodynamic model of steady movement of a solid/liquid/fluid contact line. J. Colloid Interface Sci. 1971, 35: 85-101.

(56) References Cited

OTHER PUBLICATIONS

Collins, John and Hoag, George. Coelution Technologies and Surfactant-Enhanced in Situ Oxidation as new breakthrough technologies in the treatmen of toxic subsurface contaminants. 11th Annual Green Chemistry and Engineering Conference. 2007. Retrieved Mar. 25, 2009. http://acs.confex.com/acs/green07/techprogram/P42826.htm.

Coutteneye RA, Huang KC, Hoag GE, Suib SL. Evidence of Sulfate Free Radical (SO4-") Formation under Heat-assisted Persulf ate Oxidation of MTBE. Proceedings of the 19th Petroleum Hydrocarbons and Organic Chemicals in Ground Water: Prevention, Assessment, and Remediation, Conference and Exposition, Atlanta, GA, United States, Nov. 5-8, 2002, 345-350.

Dahl JA, Maddux LS, Hutchison JE, Toward Greener Nanosynthesis, Chem. Rev. 2007, 107: 2228.

Das, SK, Butler, R M. Mechanism of the Vapor Extraction Process for Heavy Oil and Bitumen. J Petroleum Sci. and Eng. 1998. 21: 43-59.

Diallo et al. Solubilization of nonaqueous phase liquid hydrocarbons in micellar solution of dodecyl alcohol ethoxylates . Environ. Sci. Technol. 1994. 1829-1837.

Edwards, DA, Luthy, RG, Lly, Z. Solubilization of Polycyclic Hydrocarbons in Micellar Nonionic Surfactant Solutions. 1991 Environ. Sci. Technol. 25:127-133.

EOS Remediation Inc. Emulsified Edible Oils for Anaerobic Bioremediation. Accessed Apr. 15, 2007, www.eosremediation.com.

Falta RW. Using Phase Diagrams to Predict the Performance of Cosolvent Floods for NAPL Remediation. Ground Water Monit. Rem. 1998, 18(3): 227-232.

Fang, J, You H, Kong P, Yi Y, Song X, Ding B. Dendritic Silver Nanostructure Growth and Evolution in Replacement Reaction. Crystal Growth and Design 2007, 7:864.

Flaming JE, Knox RC, Sabatini DA, Kibbey TC, Surfactant Effects on Residual Water and Oil Saturations in Porous Media. 2003, Vadose Zone Journal 2:168-176.

Florida Chemical Company, Material Safety Data Sheet for Citrus Burst 3. Jul. 2007, Winter Haven, FL.

Frankel AJ, Owsianiak, LM, Wuerl, BJ, Horst, JF. In-Situ Anaerobic Remediation of Perchlorate-Impacted Soils. Arcadis US.

Georgetti SR, Casagrande R, Di Mambro, VM, Azzolini, AECS, Fonseca, MJV. Evaluation of the Antioxidant of Different Flavonoids by the Chemiluminescence Method. AAPA PharmSci. 2003. 5(2) Article 20.

Gillham RW, O'Hannesin SF. Enhanced degradation of halogenated aliphatics by zero-valent iron. Ground Water 1994, 32(6): 959-967.

Goi et al. Combined chemcial and biological treatment of oil contaminated soil. Chemosphere. Pergamon Press. Oxford. GB. 2006. vol. 63:10. 1754-1763.

Guha S, Jaffe PR. Biodegradation kinetics of phenanthrene partitioned into the micellar phase of nonionic surfactants. Env. Sci. & Tech. 1996, 30: 605-611.

Hatano T, Kagawa H, Yasuhara T, Okuda T. Two new flavonoids and other constituents in licorice root: their relative astringency and radical scavenging effect. Chem. Phar. Bull. 1998, 36 : 2090-2097.

He F, Zhao D. Preparation and characterization of a new class of starch-stabilized bimetallic nanoparticles for degradation of chlorinated hydrocarbons in water. Environ Sci Technol. 2005, 39: 3314-3320.

House DA, Kinetics and Mechanism of Oxidations by Peroxydisulfate, Chemistry Review 1962, 62: 185-200.

Huang K, Coutteneye RA, Hoag G. Kinetics of heat-assisted persulfate exidation of methyl tert-butyl ether (MTBE). Chemosphere 2002, 49(4), 413-420.

International Search Report and the Written Opinion of the International Searching Authority for PCT/US2007/007517, dated Nov. 27, 2008.

International Search Report and Written Opinion for PCT/US08/011228 dated May 28, 2009.

International Search Report and Written Opinion issued in International Application No. PCT/US2008/011235, dated Dec. 19, 2008.

International Search Report and Written Opinion issued in International Application No. PCT/US2008/11229, dated Dec. 9, 2008.

International Search Report and Written Opinon for PCT/US2008/008905 dated May 7, 2009.

International Search Report for International Application No. PCT/US2009/044402, dated Apr. 12, 2010.

Interstate Technology & Regulatory Council Dense Nonaqueous Phase Liquids Team, Technical and Regulatory Guidance for Surfactant/Cosolvent Flushing of DNAPL Source Zones, Apr. 2003.

Jafvert CT, Technology Evaluation Report: Surfactants/Cosolvents. Dec. 1996, Gound-Wter Remediation Analysis Center, Pittsburgh, PA.

Jawitz, JW, Annable, MD, Rao, PSC, Rhue, RD. Field Implementation of a Winsor Type 1 Surfactant. Alcohol Mixture for in Situ Solubilization of a Complex LNAPL as a Single-Phase Microemulsion. 1998. Environ. Sci. Technol., 32:523-530.

Kile, DE, Chiou, CT. Water Solubility Enhancements of DDT and Trichlorobenzene by Some Surfactants Below and Above the Critical Micelle Concentration. Environ. Sci. Technol. 1989, 23:832-838.

Kislenko VN, Berlin AA, Litovchenko NV, Kinetics of Oxidation of Glucose by Persulfate Ions in the Presence of Mn (II) Ions, Kinetics and Catalysis 1997, 38(3): 391-396.

Kolthoff IM, Medalia AI, Raaen HP, The Reaction Between Ferrous Iron and Peroxides IV Reaction with Potassium Sulfate, Journal of American Chemical Society 1951, 73: 1733-1739.

Kotterman MJ, Rietberg HJ, Hage A, Field JA. Polycyclic aromatic hydrocarbon oxidation by white-rot fungus *Bjerkandera* sp. Strain BOS55 in the presence of non-ionic surfactants. Biotechnology and Bioengineering 1997, 57: 220-227.

Kumar A, Vemula PK, Ajayan PM, John G., Silver Nanoparticle-Embedded Antimicrobial Paints Based on Vegetable Oil, Nature Materials 2008, 7: 236-241.

Li Zhaohui, Surfactant-enhanced oxidation of trichloroethylene by permanganate-proof of concept. Chemosphere 2004, 54:419-423.

Liang CJ, Bruell CH, Marley MC, Sperry, KL. Thermally activated persulfate oxidation of trichloroethylene (TCE) and 1,1,1-trichloroethane (TCA) in aqueous systems and soil slurries. 2003. Soil & Sediment Contamination 2003, 12(2): 207-228.

Liang CJ, Bruell CJ, Marley MC, Sperry KL. Persulfate oxidation for in situ remediation of TCE I: Activated by ferrous ion with and without a persulfate-thiosulfate redox couple. Chemosphere 2004, 55(9), 1213-1223.

Luong HV, Lin HK. Controlling Fenton reaction for soil remediation. Analytical Letters 2000, 33(14), 3051-3065.

Martel R, Gelinas P. Surfactant solutions developed for NAPL recovery in contaminated aquifers. Ground Water 1996, 34: 143-154.

Martel R, Gelinas PJ, Desnoyers JE, Masson A. Phase Diagrams to Optimize Surfactant Solutions for Oil and DNAPL Recovery in Aquifers, Ground Water 1993, 31: 789-800.

Moschopedis SE. et al. Surface-active materials from Athabasca oil sands. Fuel processing Technology 1980, 3: 55-61.

Murphy CJ, Gole AM, Hunyadi SE, Orendorff CJ. One-Dimensional Colloidai Gold and Silver Nanostructures. Inorg Chem 2006, 45(19): 7544-7554.

Nadagouda MN, Varma RS, Green Chem. 2007, 9: 632.

Nadagouda MN, Varma RS. A Greener Synthesis of Core (Fe, Cu)-Shell (Au, Pt, Pd and Ag) Nanocrystals Using Aqueous Vitamin C, Crystal Growth and Design 2007, 7(12): 2582-2587.

Nadagouda MN, Varma RS. Green and Controlled Synthesis of Gold and Platinum Nanomaterials Using Vitamin B2: Density-Assisted Self Assembly of Nanospheres, Wires and Rods, Green Chem. 2006, 8: 516.

Nadagouda MN, Varma RS. Green synthesis of silver and palladium nanoparticles at room temperature using coffe and tea extract. Royal Society of Chemistry. Green Chem 2008, 10: 859-862.

Nadagouda MN, Varma RS. Microwave Assisted Shape Controlled Bulk Synthesis of Ag and Fe Nanorods in Poly(ethylene glycol) Solutions, Crystal Growth and Design 2008, 8(1): 291-295.

(56) References Cited

OTHER PUBLICATIONS

Nadagouda MN, Varma RS. Microwave Assisted Shape Controlled Bulk Synthesis of Noble Nanocrystals and Their Catalytic Properties, Crystal Growth and Design 2007, 7(4): 686-690.

Nadagouda MN, Varma RS. Preparation of novel metallic and bimetallic cross-linked poly (vinly alcohol) nanocomposites under microwave irradiation. Macromolecular Rapid Communications 2007, 28: 465-472.

Nadagouda MN, Varma RS. Synthesis of Thermally stable carboyxmethyl cellulose/metal biodegradable nanocomposites for potential biological application. Biomacromolecules 2007, 8(9):2762-2767.

Naik RR, Stringer SJ, Agarwal G, Jones SE, Stone MO. Nature Mater. 2002, 1: 169.

Narayan A, Landstrom L, Boman M. Laser-assisted synthesis of ultra small metal nanoparticles. Appl. Surf Sci 2003, 137: 208.

Niu S-F, Liu Y, Xu X-H, Lou Z-H. Removal of hexavalent chromium from aqueous solution by iron Nanoparticles. J. Zhejiang Univ Sci B 2005, 6(10): 1022-1027.

Office Action for U.S. Appl. No. 12/068,653, dated May, 26, 2010.

Office Action in U.S. Appl. No. 12/771,210 dated Aug. 20, 2010.

Peters, S.M. et al. A Laboratory Study on the Degradation of Gasoline Contamination Using Fenton's Reagent, Proceedings 54th Canadian Geotechnical Conference, 2001 An Earth Odyssey, p. 1170-1177.

Pirkanniemi K, Sillanpaa M, Sorokin A. Degradative Science of the Total Environment 2003, 307: 1-3, 11-18.

Ponder S, Darab JG, Bucher J, Caulder D, Craig I, Davis L, Edelstein N, Lukens W, Nitsche H, Rao L, Shuh DK, Mallouk TE. Surface chemistry and electrochemistry of supported zerovalent iron nanoparticles in the remediation of aqueous metal contaminants. Chem. Mater. 2001, 13(2): 479-486.

Ponder SM, Darab JG, Mallouk TE. Remediation of Cr(VI) and Pb(II) aqueous solutions using supported, nanoscale zero-valent iron. Environ. Sci. Technol. 2000, 34: 2564-2569.

Powell RM, Puls RW, Hightower SK, Sabatini DA. Coupled Iron Corrosion and Chromate Reduction: Mechanisms for Subsurface Remediation. Environ. Sci. Technol. 1995, 29: 1913-1922.

Raveendran P, Fu J, Wallen SL. Completely "Green" Synthesis and Stabilization of Metal Nanoparticles, J. Am. Chem. Soc. 2003, 125: 13940.

Regenesis. Chemical Oxidation. Accessed Apr. 15, 2007, www.regenesis.com/products/chemOx/.

Regenesis. Enhanced Aerobic Bioremediation, Accessed Apr. 15, 2007, www.regenesis.com/products/enhAer/.

Regenesis. Remediation Products. Accessed Apr. 15, 2007, www.regenesis.com.

Roote, Diane S. Technology Status Report In Situ Flushing: Ground-Water Remediation Technologies Analysis Center, Pittsburg, PA, Nov. 1998.

Schramm et al. The Influence of Interfacial tension in the recovery of bitumen by water-based conditioning and flotation of Athabasca oil sands. Fuel Processing Technology 2003, 80: 101-118.

Schrick B, Blough J, Jones A, Mallouk TE. Hydrodechlorination of trichloroethylene to hydrocarbons using bimetallic nickel-iron nanoparticles. Chem. Mater. 2002, 14(12): 5140-5147.

Shiau BJ, Sabatini DA, Harwell JH. Solubilization and mobilization of DNAPLs using direct food additive (edible) surfactants. Ground Water 1994, 32: 561-569.

Sundstrom DW, Allen JS, Fenton SS, Salimi FE, Walsh KJ, Treatment of Chelated Iron and Copper Wastes by Chemical Oxidation, J Environ Sci Health 1996, A31: 1215.

Swe, MM, Yu, LE, Hung, KC, Chen, BH. Solubilization of Selected Polycyclic Aromatic Compounds by Nonionic Surfactants. Journal of Surfactants and Detergents. 2006, 9:3, 237-244.

Sweeny, KH. 1981 a. The Reductive Treatment of Industrial Wastewater: II. Process Applications. American Institute of Chemical Engineers, Symposium Series, Water—1980 Fd. G.F. Nennett. 209(77): 67-71.

Sweeny, KH. 1981 b. The Reductive Treatment of Industrial Wastewater: I. Process Description. American Institute of Chemical Engineers, Symposium Series, Water-1980 Ed. GF Nennett, 209(77): 72-78.

Tetrachloroethylene. Accessed Nov. 19, 2010. http://en.wikipedia.org/w/index.php?title=Tetrachloroethylene&printable=yes.

USDA 2007. Oxygen Radical Absorbance Capacity (ORAC) of Selected Foods-2007. Nutrient Data Laboratory, Beltsville Human Nutrition Research Center, Agricultural Research Service.

Uyeda R. Studies of Ultrafine Particles in Japan: Crystallography, Methods of Preparation and Technological Applications. Prog. Mater. Sci. 1991, 35: 1.

Wang C-B, Zhang W. Synthesizing nanoscale iron particles for rapid and complete dechlorination of TCE and PCBs. Environ. Sci. Technol. 1997, 31(7): 2154-2156.

Wang CC, Chen DH, Huang TC, Synthesis of palladium nanaparticles in water-in-oil microemulsions. Colloids ad Surfaces A: Physicochemical and Engineering Aspects 2001, 189: 145.

Wang X, Li Y. Monodisperse nanocrystals: general synthesis, assembly, and their applications. Chem Commun Camb 2007, 28: 2901-2910.

Wei JJ, Xu XH, Liu Y. Kinetics and mechanism of dechlorination of o-chlorophenol by nanoscale. Pd/Fe. Chem Res Chinese U. 2004;20:73-76.

Wu X, Beecher GR, Holden JM, Haytowitz DB, Gebhardt SE, Prior RL. Lipophilic and hydrophilic antioxidant capacities of common foods in the United States. Journal of Agricultural and Food Chemistry 2004, 52: 4026-4037.

Xu Y, Zhang W. Subcolloidal Fe/Ag particles for reductive dehalogenation of chlorinated benzenes. Ind. Eng. Chem. Res. 2000, 39(7): 2238-2244.

Yen GC, Chen F. Antioxidant activity of various tea extracts in relation to their antimutagenicity. Journal of Agricultural and Food Chemistry 1995, 45: 27-32.

Yeom IT, Ghosh MM. Mass transfer limitation in PAH-contaminated soil remediation. Water Sci. Tech 1998, 37: 111-118.

Zeveloff J, Inventor Sues Soil Remediation Co. Over Patents. Portfolio Media. Inc., Oct. 2008, New York NY.

Zhang H, Jin Z-H, Han L, Qin C-H. Synthesis of nanoscale zero-valent iron supported on exfoliated graphite for removal of nitrate. Transactions of Nonferrous Metals Society of China 2006, 16(1): s345-s349.

Zhang W, Wang C, Lien H. Treatment of chlorinated organic contaminants with nanoscale bimetallic particles. Catal. Today 1998, 40(4): 387-395.

Zhang W-X. Nanoscale iron particles for environmental remediation: An overview. J. Nanoparticle Research 2003, 5: 323-332.

Zheng Z, Obbard JP. Polycyclic Aromatic Hydrocarbon Removal from Soil by Surfactant Solubilization and Phanerochaete chrysosporium Oxidation. J. Environ. Qual. 2002, 31: 1842-1847.

Office Action issued by the USPTO for U.S. Appl. No. 12/771,210 dated Jul. 27, 2011.

Siegrist, et al., "Reaction and Transport Process Controlling In Situ Chemical Oxidation of DNAPLs," SERDP Project CU-1290,Nov. 1, 2006.

Office Action in U.S. Appl. No. 12/670,373 dated Jul. 30, 2012.

\* cited by examiner

Legend within text

MGP column experiments: deionized water and heat effect on
MGP DNAPL (before and after 8-day experiment)

Experimental Conditions: column dimensions are
L=30 cm, D=5cm; column spiked with 8 grams
of MGP DNAPL; flow rate @ ~ 5 ml/min;
experiment ran for 8 days in incubator set at
50°C MGP column experiments: 10 g/L VeruSOL™-3, 8% hydrogen peroxide, and Fe(NTA) effect on MGP DNAPL (before and after 14-day experiment)

Experimental Conditions: column dimensions are
L=30 cm, D=5cm; column spiked with 8 grams of
MGP DNAPL; flow rate @ ~ 5 ml/min; experiment
ran for 14 days MGP column experiments: 10 g/L VeruSOL™-3, 8% hydrogen peroxide, and 16.8 g/L NaCO₃ effect on MGP DNAPL (before and after 3-day experiment)

Experimental Conditions: column dimensions are L=30 cm, D=5cm; column spiked with 8 grams of MGP DNAPL; flow rate @ ~ 5 ml/min; experiment ran for 3 days MGP column experiments: 10 g/L VeruSOL™-3, 4% hydrogen peroxide, and 8.4 g/L NaCO₃ effect on MGP DNAPL (before and after 3-day experiment)

Experimental Conditions: column dimensions are
L=30 cm, D=5cm; column spiked with 6 grams of
MGP DNAPL; flow rate @ ~ 5 ml/min; experiment
ran for 3 days MGP column experiments: 10 g/L VeruSOL™-3, 2% hydrogen peroxide, and 8.4 g/L NaCO₃ effect on MGP DNAPL (before and after 3-day experiment)

Experimental Conditions: column dimensions are L=30 cm, D=5cm; column spiked with 6 grams of MGP DNAPL; flow rate @ ~ 5 ml/min; experiment ran for 3 days Tar sand column experiments: 10 g/L VeruSOL™-3 and 4 ml/min nitrogen air effect on MGP DNAPL (before and after 12-day experiment)

Experimental Conditions: column dimensions are
L=30 cm, D=5cm, column spiked with 100
grams Tar Sands homogenized with 100 grams
clean sand; flow rate @ ~ 5 ml/min, experiment
ran for 12 days MGP column experiments: 10 g/L VeruSOL™-3 and 4 ml/min nitrogen air effect on MGP DNAPL (before and after 13-day experiment)

Experimental Conditions: column dimensions are
L=30 cm, D=5cm; column spiked with 8 grams of
MGP DNAPL; flow rate @ ~ 5 ml/min; experiment
ran for 13 days MGP column experiments: deionoized water and 4 ml/min nitrogen
air effect on MGP DNAPL (before and after 12-day experiment)

Experimental Conditions: column dimensions are
L=30 cm, D=5cm; column spiked with 8 grams of
MGP DNAPL; flow rate @ ~ 5 ml/min; experiment
ran for 12 days

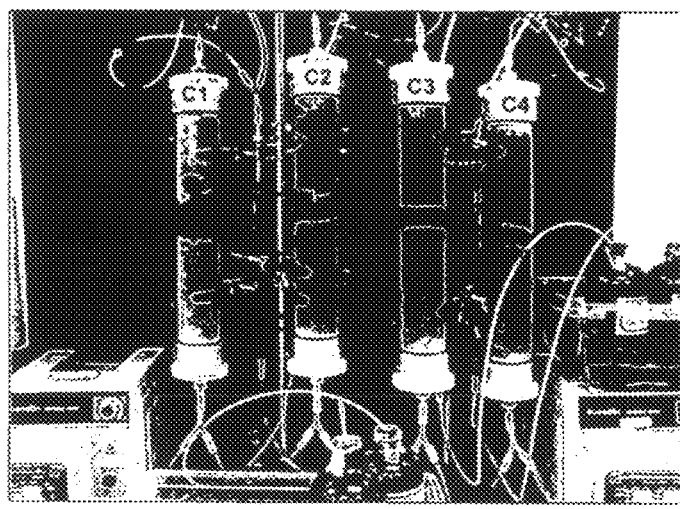

Non-aqueous phase liquid displacement experimental conditions

C1= Control Column
C2= Hydrogen Peroxide @ 8%, VeruSOL @ 10 g/L, NaHCO$_3$ @ 16.8 g/L Flowrate @ 0.5 ml/min
C3= Hydrogen Peroxide @ 4%, VeruSOL @ 10 g/L, NaHCO$_3$ @ 8.4 g/L Flowrate @ 0.5 ml/min
C4= Hydrogen Peroxide @ 2%, VeruSOL @ 10 g/L, NaHCO$_3$ @ 8.4 g/L Flowrate @ 0.5 ml/min
Notes: all columns contained 950 grams sand and were spiked with 8 grams DNAPL (MGP);
dimensions of the columns are length=30 cm, diameter= 5 cm, volume= 589 ml FIGURE 21a Non-aqueous phase liquid displacement experimental conditions C1= Hydrogen Peroxide @ 8%, Fe-NTA: 250 mg/L as Fe, Flowrate @ 0.5 ml/min
C2= Hydrogen Peroxide @ 8%, VeruSOL @ 10 g/L, Fe-NTA: 250 mg/L as Fe, Flowrate @ 0.5 ml/min
Notes: all columns contained 950 grams sand and were spiked with 8 grams DNAPL (MGP); dimensions of the columns are Length=30 cm, Diameter= 5 cm, Volume= 589 ml Non-aqueous phase liquid displacement experimental conditions Time=0 hrs C1= Hydrogen Peroxide @ 8%, Fe-NTA: 250 mg/L as Fe, Flowrate @ 0.5 ml/min
C2= Hydrogen Peroxide @ 8%, VeruSOL @ 10 g/L, Fe-NTA: 250 mg/L as Fe, Flowrate @ 0.5 ml/min Non-aqueous phase liquid displacement experimental conditions Time≈9 hrs C1= Hydrogen Peroxide @ 8%, Fe-NTA: 250 mg/L as Fe, Flowrate @ 0.5 ml/min
C2= Hydrogen Peroxide @ 8%, VeruSOL @ 10 g/L, Fe-NTA: 250 mg/L as Fe, Flowrate @ 0.5 ml/min

Non-aqueous phase liquid displacement experimental conditions

Time=12 hrs

C1= Hydrogen Peroxide @ 8%, Fe-NTA: 250 mg/L as Fe, Flowrate @ 0.5 ml/min
C2= Hydrogen Peroxide @ 8%, VeruSOL @ 10 g/L, Fe-NTA: 250 mg/L as Fe,
    Flowrate @ 0.5 ml/min Non-aqueous phase liquid displacement experimental conditions Time=24 hrs C1= Hydrogen Peroxide @ 8%, Fe-NTA 250 mg/L as Fe, Flowrate @ 0.5 ml/min
C2= Hydrogen Peroxide @ 8%, VeruSOL @ 10 g/L, Fe-NTA 250 mg/L as Fe, Flowrate @ 0.5 ml/min

METHOD FOR EXTRACTION AND SURFACTANT ENHANCED SUBSURFACE CONTAMINANT RECOVERY

FIELD OF THE INVENTION

The present invention relates to methods and compositions for remediating soil and groundwater. For example, the present invention relates to methods and compositions for removing contaminants from soil and groundwater by extracting the contaminants and assisting the extraction by provision of a gas under pressure.

SUMMARY OF THE INVENTION

A method according to the invention for decreasing the amount of contaminant at a site in a subsurface, with at least a portion of the contaminant being extractable, can include the following. An oxidant can be introduced prior to or simultaneously with a surfactant into the subsurface. Alternatively, an oxidant can be introduced after a surfactant into the subsurface. Extractable contaminant can be extracted from the subsurface. The amount and/or distribution of contaminant in the subsurface can be characterized. The extracting of contaminant and the introducing of oxidant and surfactant can be coordinated to reduce contaminant to a target amount. A portion of the contaminant can be oxidizable. The oxidant can oxidize contaminant.

For example, the extracting of contaminant and the introducing of oxidant and surfactant can be coordinated to meet a predetermined goal and/or to optimize one or more parameters. For example, the extracting of contaminant and the introducing of oxidant and surfactant can be coordinated to minimize the amount of oxidant and/or surfactant that must be added to reduce the contaminant to a target amount. This may involve extracting contaminant for an extended period of time prior to adding oxidant and surfactant. For example, the extracting of contaminant and the introducing of oxidant and surfactant can be coordinated to minimize the time required to reduce the contaminant to a target amount. This may involve introducing oxidant and surfactant while extracting contaminant from the start of the process.

A method according to the invention for decreasing the amount of a contaminant at a site in a subsurface can include the following. An oxidant and a surfactant and/or cosolvent can be introduced into the subsurface. The surfactant can be allowed to solubilize or desorb the contaminant; the oxidant can be allowed to oxidize the solubilized contaminant in the subsurface; and the contaminant can be extracted from the subsurface, so that the amount of the contaminant in the subsurface is substantially decreased. The overall rate of oxidization of the contaminant can be controlled to a predetermined value; and the overall rate of solubilization of the contaminant can be controlled to a predetermined value. For example, such control can be achieved by selecting the oxidant and surfactant and/or cosolvent and adjusting the concentrations of oxidant and surfactant and/or oxidant, so that the rate of oxidation of the contaminant is greater than, less than, or equal to the rate of solubilization of the contaminant.

The surfactant and/or cosolvent can be introduced into the subsurface before the oxidant is introduced into the subsurface. The surfactant and/or cosolvent is introduced into the subsurface after the oxidant is introduced into the subsurface.

A method according to the invention can include allowing the oxidant to liberate gaseous oxygen in the subsurface in the form of bubbles. The oxygen bubbles can be allowed to hydrodynamically scrub contaminant from soil particles in the subsurface.

A method for decreasing the concentration of a contaminant, such as a Light Non-Aqueous Phase (LNAPL) contaminant, at a site in a soil can include the following. A remediation zone including the contaminant, e.g., the LNAPL contaminant, can be selected. An oxidant that produces a gas phase can be introduced into a subsurface containing the soil to establish an oxidation zone. The concentration distribution of oxidant in the subsurface can be identified to determine the extent of the oxidation zone. For example, the concentration of oxidant in the oxidation zone can be at least about 500 mg/L. For example, the concentration of oxidant in the oxidation zone can be in the range of from about 500 mg/L to about 100 g/L. For example, the molar concentration of oxidant in the oxidation zone can be at least about 0.002 mol/L. For example, the molar concentration of oxidant in the oxidation zone can be in the range of from about 0.002 to about 0.4 mol/L. For example, the molar concentration of oxygen atoms in the oxidation zone can be at least about 0.015 mol/L.

Under, inside, upgradient, or downgradient of the oxidation zone, the contaminant, e.g., the LNAPL contaminant, can be induced to flow toward an extraction well to establish an extraction zone. The contaminant, e.g., the LNAPL contaminant, can be further induced to flow to an extraction zone by increasing contaminant solubility, mobility, or solubilization and mobility using surfactants, cosolvents, or mixtures of cosolvents and surfactants. The extraction zone can include points in the subsurface at which a fluid element will eventually travel into the extraction well. The oxidation zone and the extraction zone can lie within the remediation zone. The oxidation zone can surround the contaminant, e.g., the LNAPL contaminant, extraction zone. The oxidation zone can include oxidant at a concentration sufficient to destroy contaminants moving into the oxidation zone, so that the oxidation zone prevents the spread of contaminant beyond the remediation zone. For example, the oxidation zone can have a concentration of oxidant of at least about 500 mg/L. For example, the oxidation zone can have a concentration of oxidant in the range of from about 500 mg/L to about 100 g/L.

The oxidation zone can prevent the spread of contaminant beyond the remediation and extraction zone. With a method according to the invention, the amount of contaminant in the soil can be substantially reduced.

A method for determining a subsurface contaminant remediation protocol can include the following. A soil sample, groundwater and contaminants can be collected from the subsurface. At least one target contaminant can be identified for concentration reduction. A surfactant, cosolvent, or mixture of cosolvents and surfactants can be identified to solubilize, mobilize, or solubilize and mobilize contaminants. An oxidant can be selected for injection into the subsurface to oxidize the target contaminant. The oxidant can include an oxidant that generates a gas phase upon its decomposition in the subsurface or the oxidant can be added as a gas. Further, in addition to the added oxidant, dissolved gas under pressure can be added to the subsurface to generate a gas phase. The behavior of the gas phase, in addition to the cosolvent-surfactant mixture or surfactant alone leads to enhanced extraction of the contaminant. Further, a dissolved gas under pressure can be added to the subsurface to generate a gas phase in addition to a cosolvent-surfactant mixture or surfactant, which leads to enhanced extraction of the contaminant. The spatial concentration distribution of the target contaminant can be determined. A hydrogeological property of the subsurface can be determined. The determined spatial concentration distribution of the target contaminant and the hydrogeological property can be used to determine a target depth for the oxidant, gas phase generating oxidant, or pressurized dissolved gas in liquid, cosolvent-surfactant or surfactant and injection site(s) of the above injectants, and an extraction site for the contaminant.

A method for reducing the concentration of a contaminant at a site in a subsurface can include the following. The contaminant can include a non-aqueous phase liquid (NAPL), a dense non-aqueous phase liquid (DNAPL), and/or a light non-aqueous phase liquid (LNAPL). An extraction well can be provided in the subsurface. An injection fluid can be injected at an injection locus into the subsurface. The injection fluid can include hydrogen peroxide and/or another oxidant, or another gas phase generating oxidant or pressure dissolved gas in a liquid. The hydrogen peroxide and/or the other oxidant or dissolved gas can be allowed to decompose to liberate oxygen or dissolved gas in the subsurface. The other oxidant can be, for example, ozone, a persulfate, sodium persulfate, or a percarbonate. The injection fluid can include a liquid, e.g., water, and a dissolved gas, e.g., oxygen and/or carbon dioxide, and the dissolved gas can effervesce as a liberated gas upon a decrease of pressure on the injection fluid in the subsurface. The injection fluid can include a compressed gas and/or a supercritical fluid under a pressure greater than atmospheric. An injected gas can include, for example, oxygen, carbon dioxide, nitrogen, air, an inert gas, helium, argon, another gas, or combinations of these. For example, the injection fluid can include dissolved carbon dioxide obtained from emissions of a fossil-fuel consuming power generation plant. The injection fluid can include a surfactant and/or a cosolvent, for example, the injection fluid can include VeruSOL. The injection fluid can include an alkali carbonate or bicarbonate, such as sodium bicarbonate. For example, the sodium bicarbonate can be at a concentration in a range of from about 1 g/L to about 200 g/L, or from about 8 g/L to about 16 g/L.

The injection fluid can include an activator, for example, a metal activator, a chelated metal activator, a chelated iron activator, Fe-NTA (iron-nitrilotriacetic acid), Fe(II)-EDTA (iron II-ethylenediaminetetraacetic acid), Fe(III)-EDTA (iron III-ethylenediaminetetraacetic acid), Fe(II)-citric acid, Fe(III)-citric acid, Fe(II)-EDDS (iron II-ethylenediaminedisuccinic acid), or Fe(III)-EDDS (iron III-ethylenediaminedisuccinic acid), Fe(II)-DTPA (iron II-diethylenetriaminepentaacetic acid), or Fe(III)-DTPA (iron III-diethylenetriaminepentaacetic acid). For example, the iron of Fe-NTA can be at a concentration in the injection fluid in a range of from about 10 mg/L to about 5000 mg/L, or can be about 250 mg/L. The injection fluid can include an antioxidant. The oxygen and/or the gas produced from reaction of the oxygen, hydrogen peroxide, and/or other oxidant with the contaminant, e.g., carbon dioxide, can be allowed to impose pressure to force the contaminant to flow through the subsurface toward the extraction well. The contaminant can be removed from the extraction well to a surface above the subsurface. The contaminant can then be stored, for example, in a storage tank, or can be disposed of, for example, in a waste destruction facility. For example, the hydrogen peroxide in the injection fluid can be in the form of a solution of hydrogen peroxide in water. For example, the hydrogen peroxide can be at a concentration in a range of from about 0.5 wt % to about 20 wt %, or from about 2 wt % to about 8 wt %.

A method can include monitoring the concentration and/or spatial distribution of hydrogen peroxide, another oxidant, a surfactant, a cosolvent, a contaminant, and/or products of contaminant oxidation in a subsurface.

A method of designing a procedure for reducing the concentration of a contaminant at a site in a subsurface can include the following. A sample can be obtained from a contaminated site of interest, e.g. a core sample, or a simulated or analogous sample can be composed. The sample can be tested with various concentrations of hydrogen peroxide, other oxidants, and surfactants and/or cosolvents, e.g., VeruSOL. The sample can be tested under various conditions of temperature, pressure, and flow rate. The rate of mobilization of the contaminant under the various conditions can be determined. An optimum set of conditions for reducing the concentration of the contaminant at the site in the subsurface can be selected.

In an embodiment, a kit for reducing the concentration of a contaminant at a site in a subsurface includes an injection fluid injection system, a contaminant extraction system, and an injection fluid. The injection fluid can include hydrogen peroxide, another oxidant, a surfactant, and/or a cosolvent.

Burst 1 (CB-1), *Citrus* Burst 2 (CB-2), *Citrus* Burst 3 (CB-3), and EZ-Mulse) in water.

Figure 11:
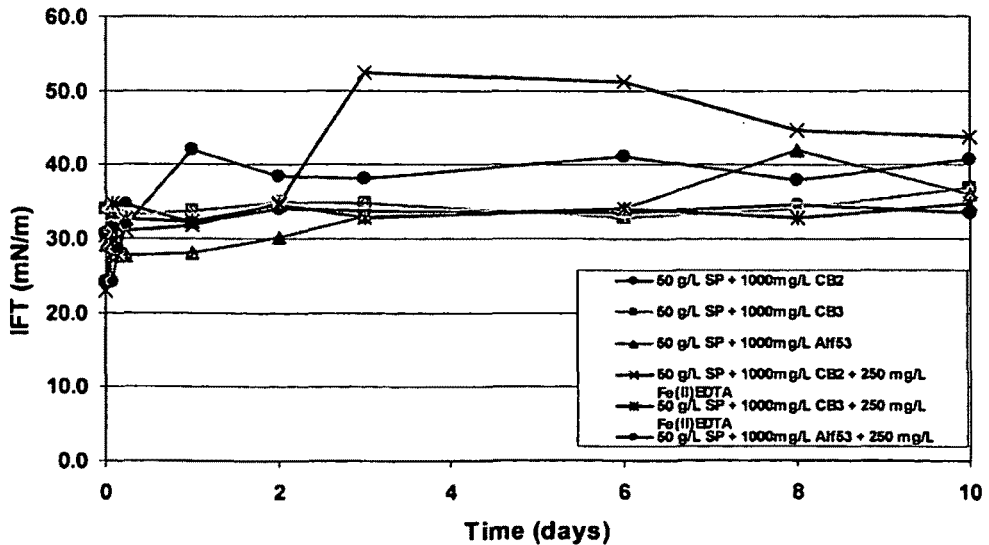

FIG. 11 is a graph depicting the interfacial surface tension (IFT) as a function of time for solutions of three different surfactants (*Citrus* Burst 2 (CB2), *Citrus* Burst 3 (CB3), and Alfoterra 53 (Alf53)) and sodium persulfate in water, both with Fe(II)EDTA activator and without activator.

Figure 12:
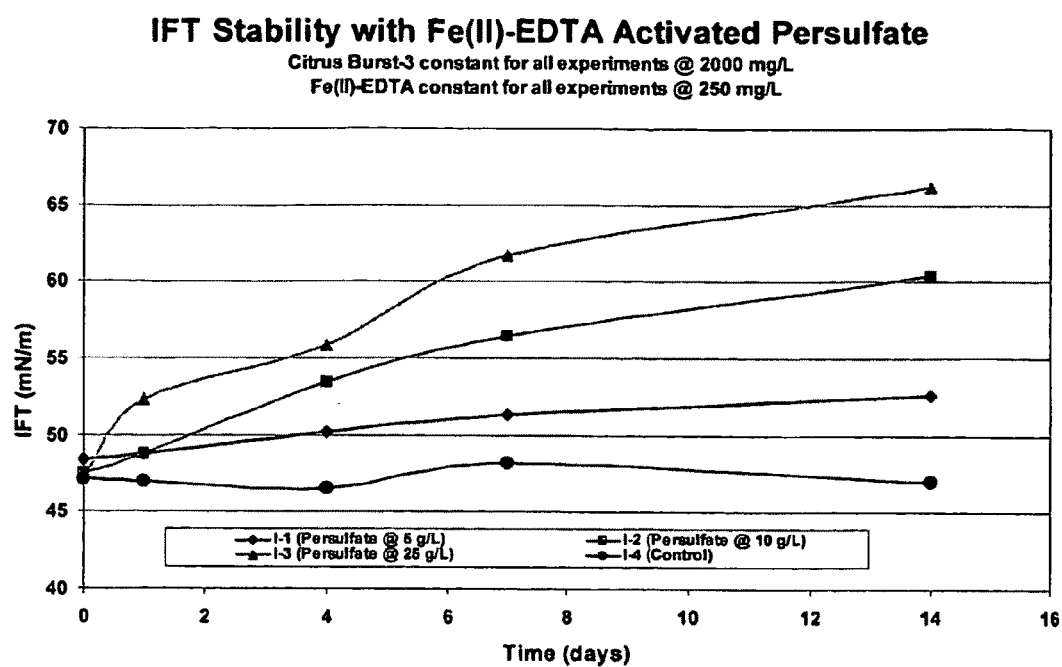

FIG. 12 is a graph depicting the interfacial surface tension as a function of time for solutions of *Citrus* Burst 3 and Fe(II)-EDTA in water with various concentrations of sodium persulfate.

Figure 13:
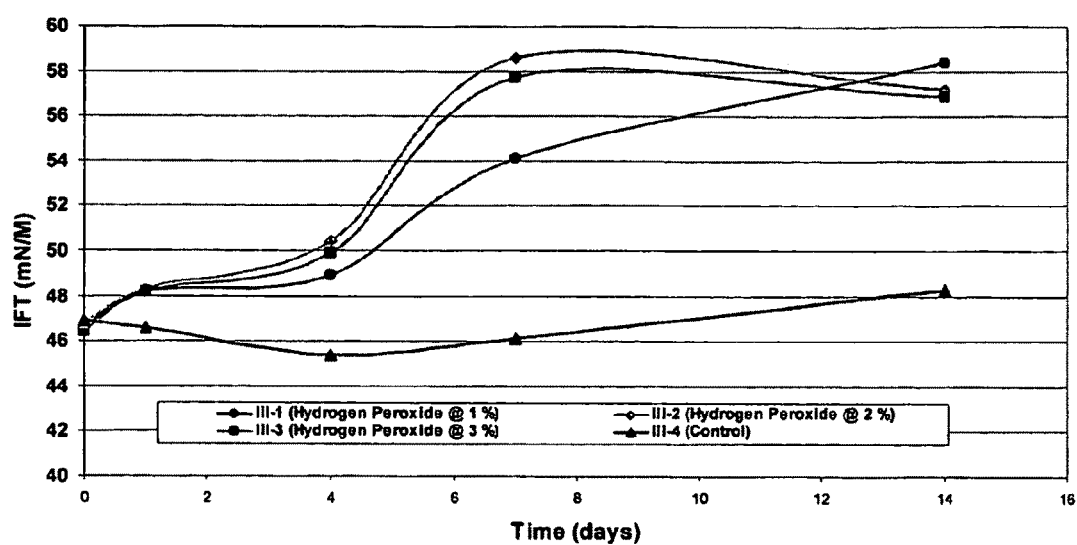

FIG. 13 is a graph depicting the interfacial surface tension OFT) as a function of time for solutions of *Citrus* Burst 3 and sodium persulfate in water with various concentrations of hydrogen peroxide.

Figure 14:
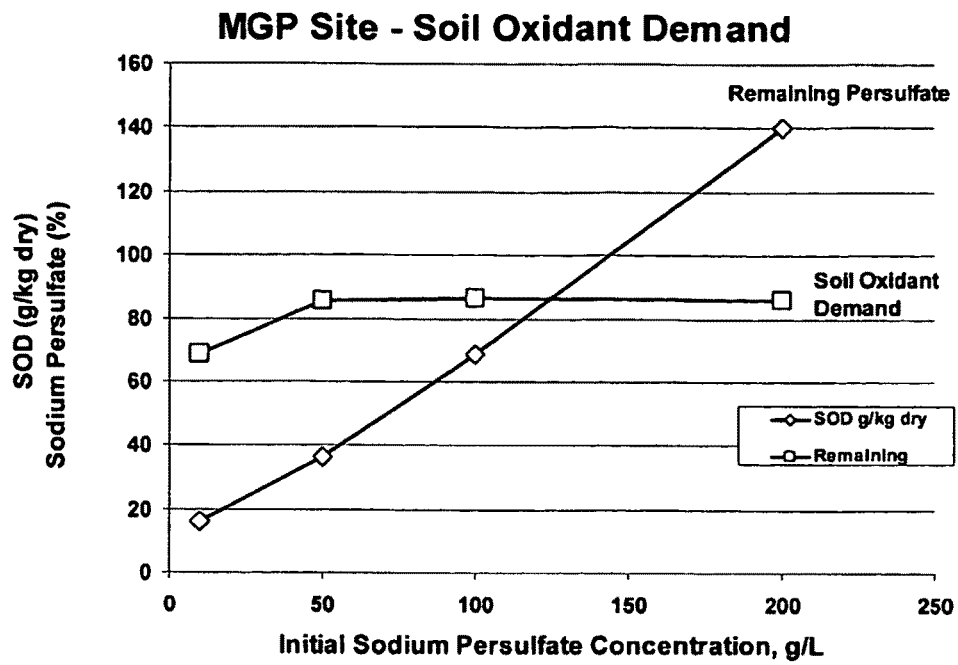

FIG. 14 is a graph depicting the results of soil oxidant demand (SOD) testing.

Figure 15:
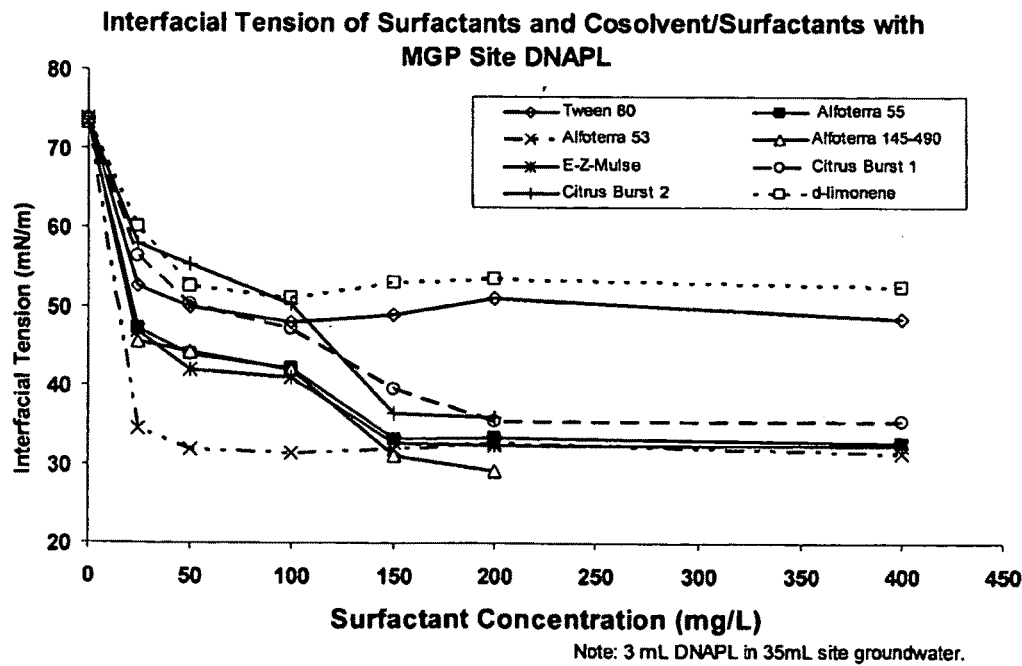

FIG. 15 is a graph depicting interfacial tension of a DNAPL-water mixture as a function of surfactant concentration for various surfactants.

Figure 16:
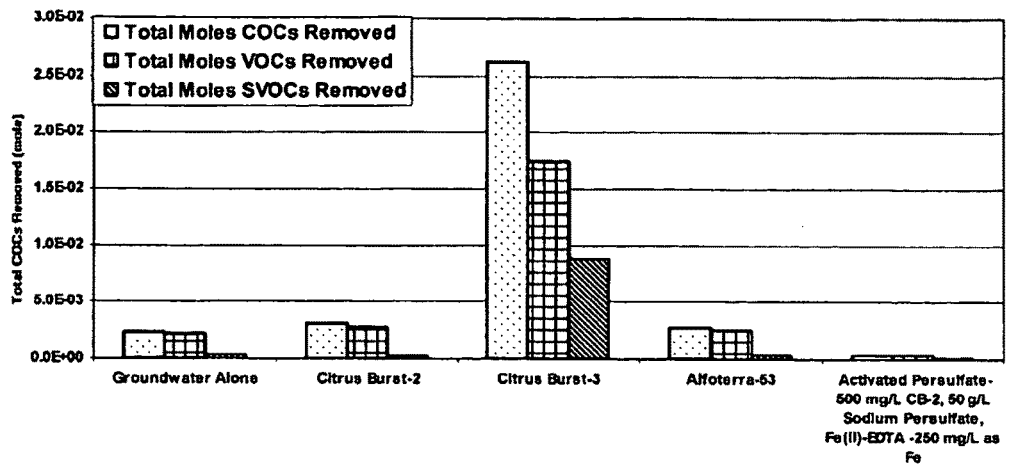

FIG. 16 is a bar graph depicting the results of column tests performed under various conditions.

Figure 17:
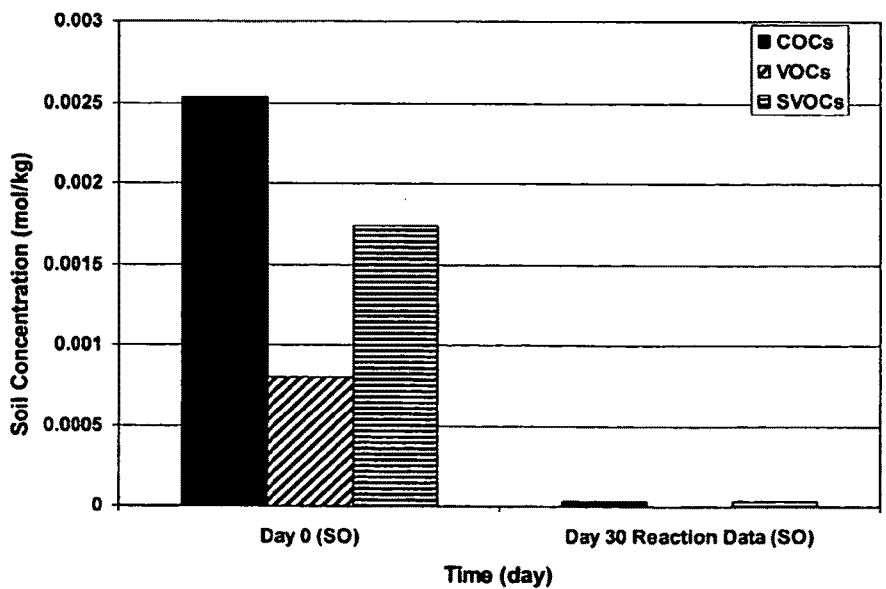

FIG. 17 is a bar graph depicting the results of 30-day soil slurry testing using Fe(II)-EDTA activated persulfate and *Citrus* Burst-1.

Figure 18:
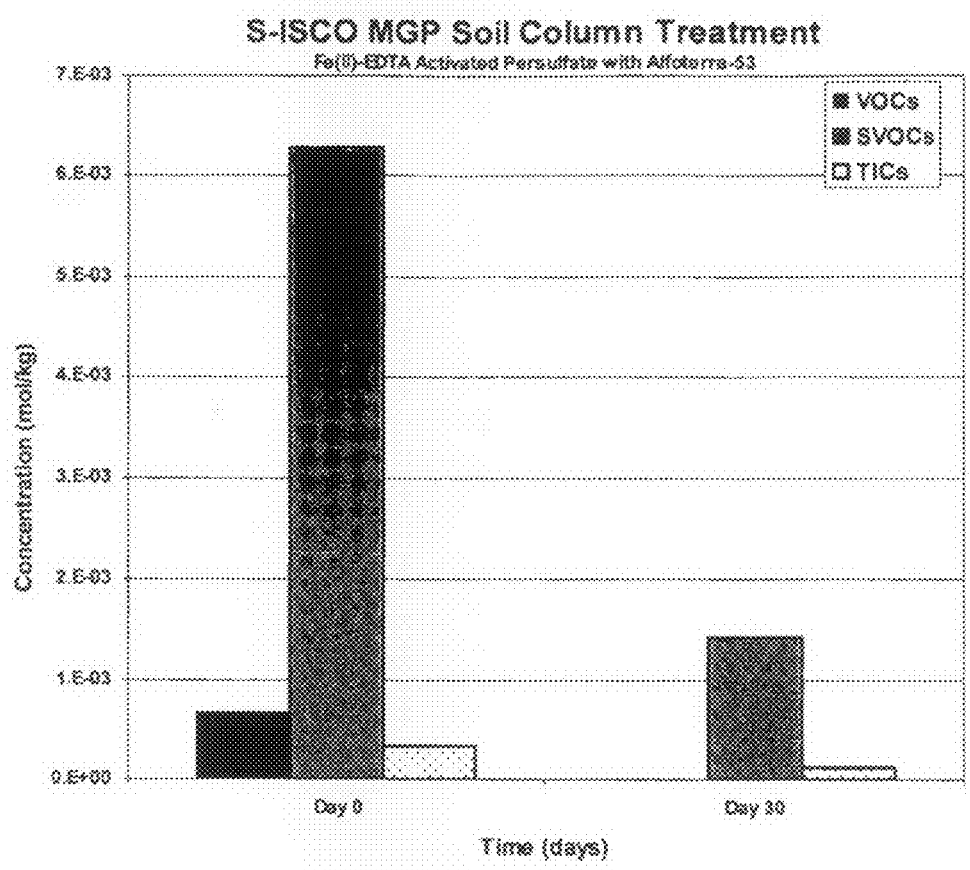

FIG. 18 is a bar graph depicting the results of column testing using Fe(II)-EDTA activated persulfate with Alfoterra-53.

Figure 19:
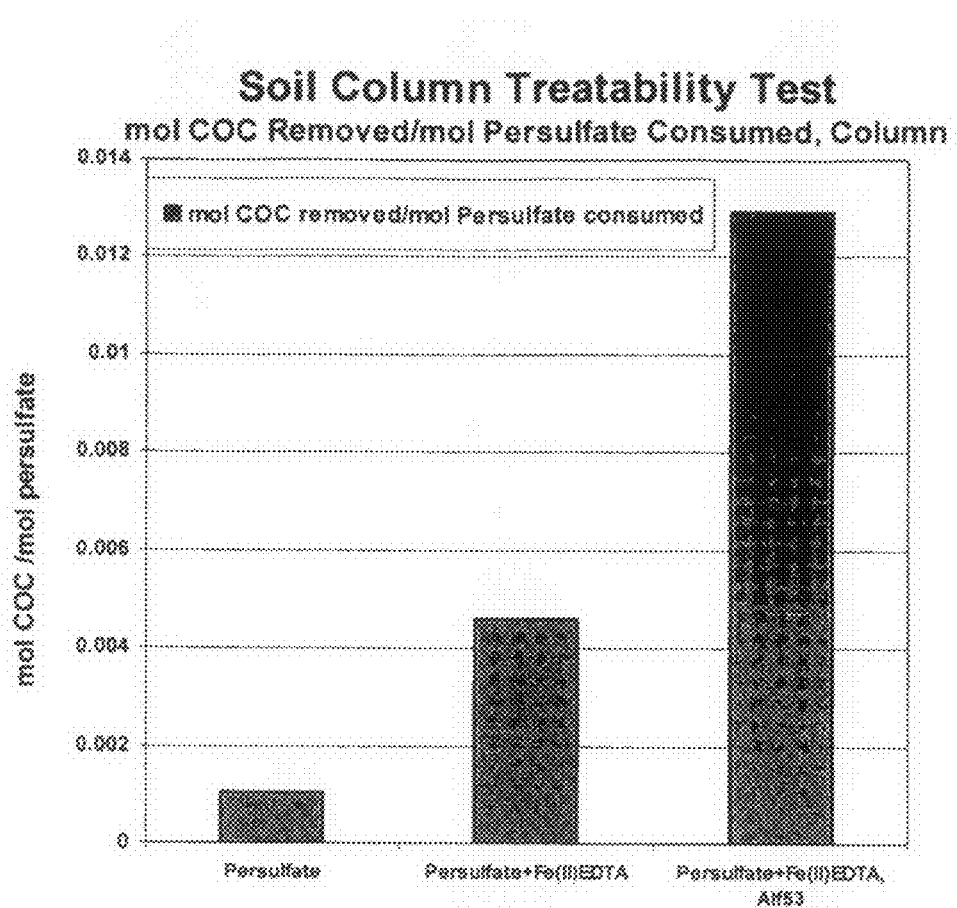

FIG. 19 is a bar graph depicting the results of column testing performed under various conditions. Results from three different column tests are presented. One column had only persulfate injected, a second column had persulfate plus Fe(II)-EDTA added as an activator, and a third column had persulfate plus Fe(II)-EDTA and Alfoterra-53 (a S-ISCO test). The molar ratio of moles of total COCs to moles of persulfate consumed increased significantly in the S-ISCO (column 3) in comparison to the ISCO alone (columns 1 and 2).

Figure 20A:
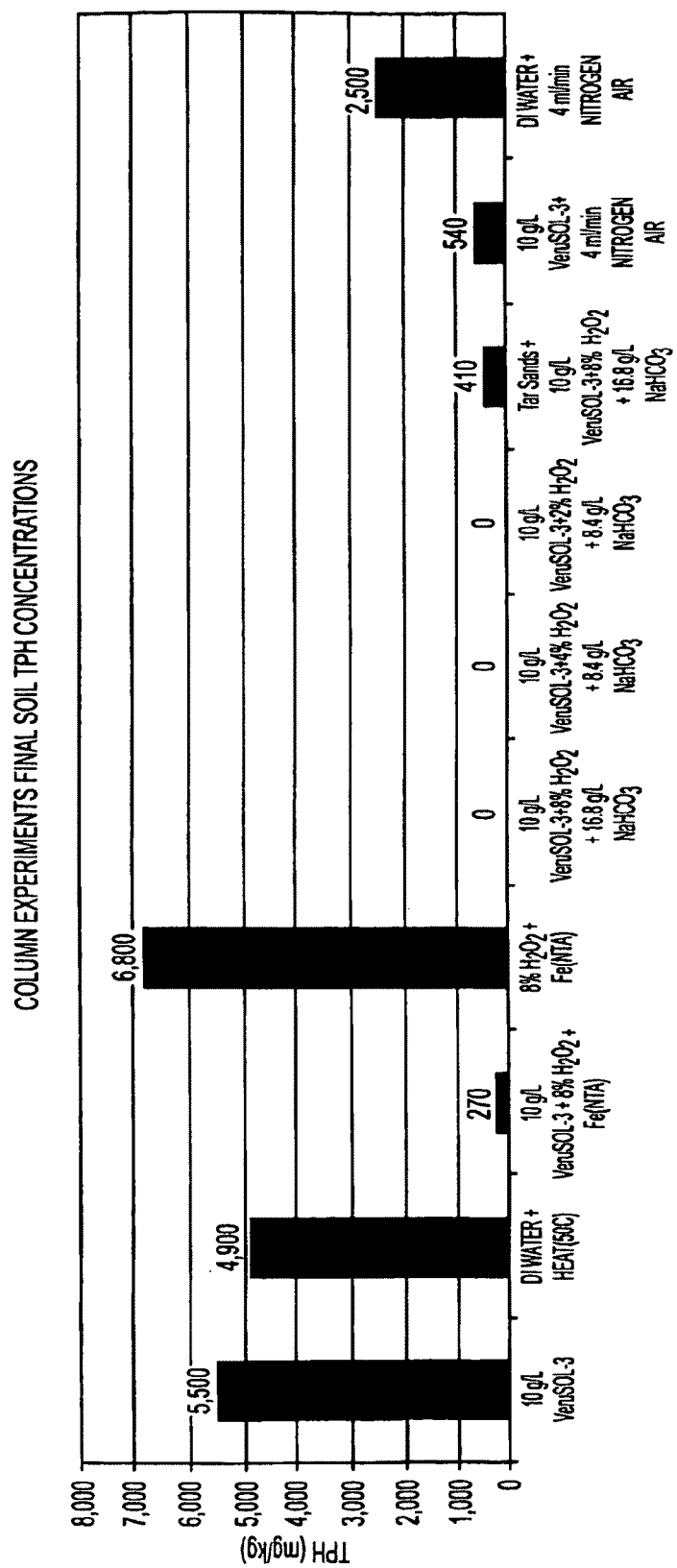
Figure 20B:
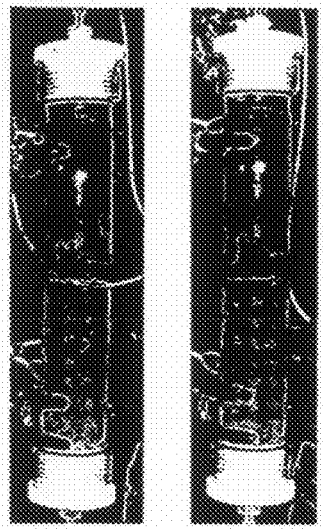
Figure 20C:
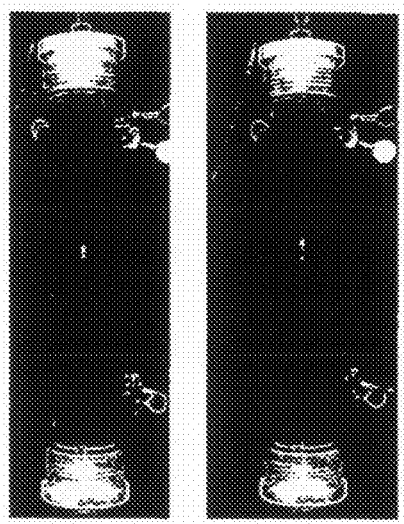
Figure 20D:
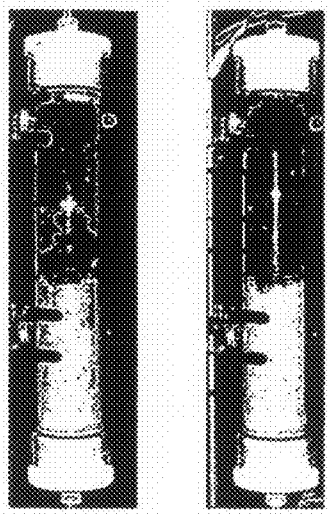
Figure 20E:
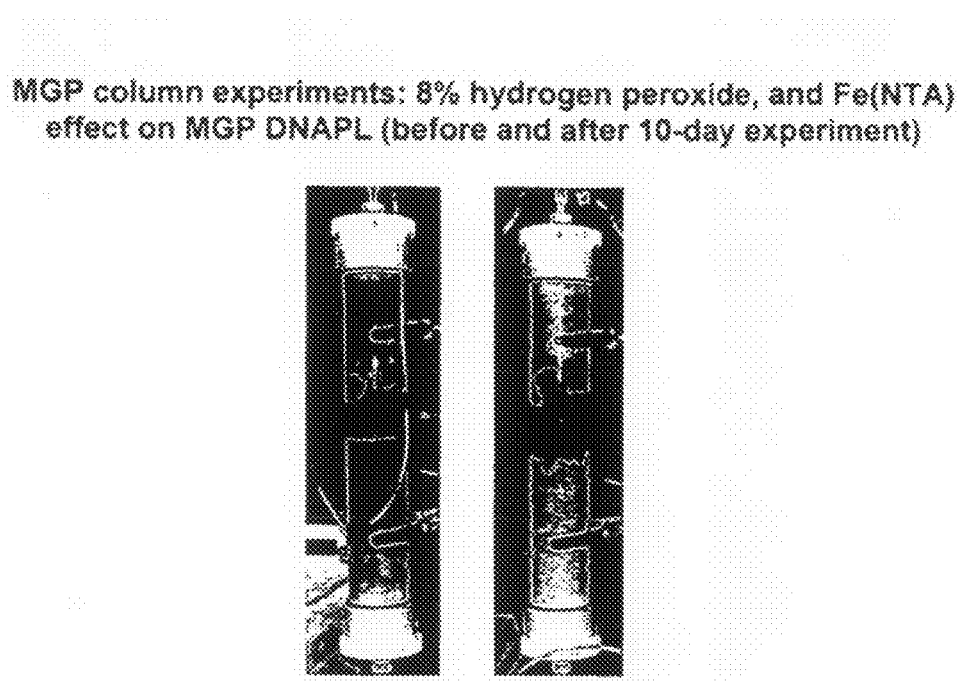
Figure 20F:
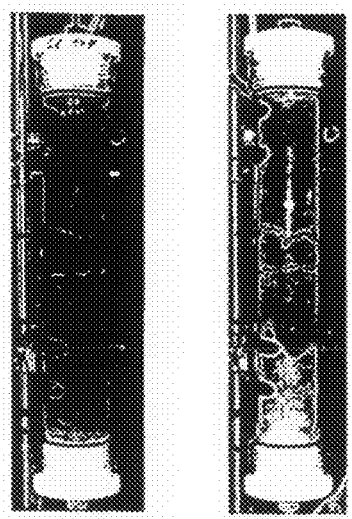
Figure 20G:
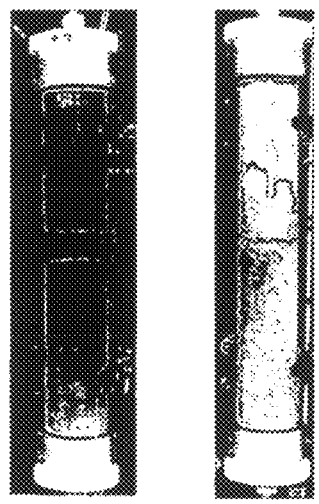
Figure 20H:
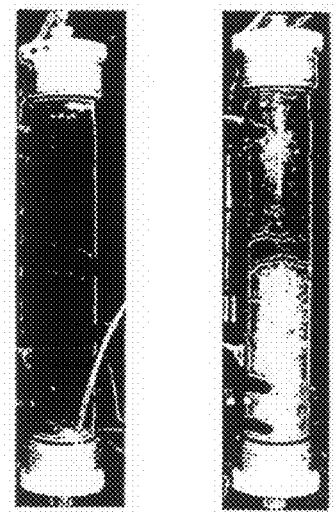
Figure 20I:
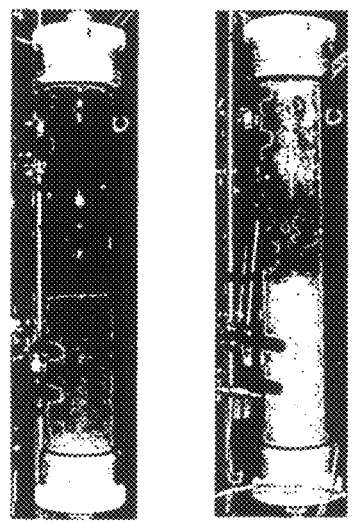
Figure 20J:
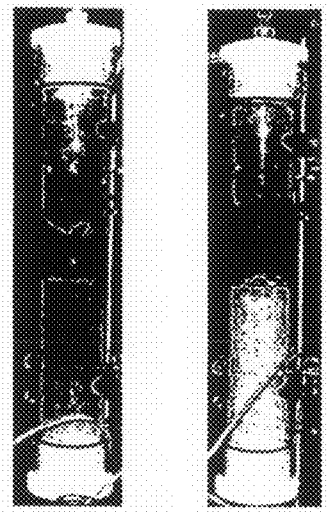
Figure 20K:
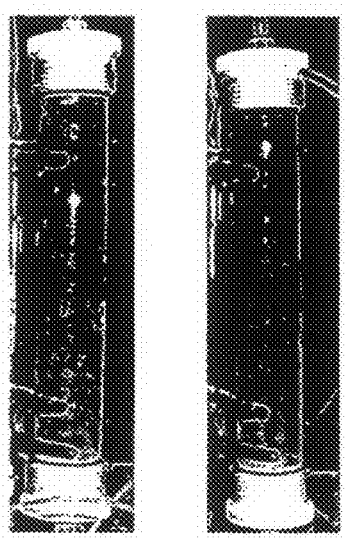

FIG. 20a depicts a bar graph presenting the final soil TPH (total petroleum hydrocarbons) concentrations in several columns through which various fluids (e.g., VeruSOL-3, $H_2O_2$ (hydrogen peroxide), and nitrogen gas are flowed.

FIGS. 20b to 20k present images of the columns for which final soil TPH concentrations are shown in FIG. 20a before fluid is flowed through the column and after a period of flowing fluid through the column.

FIGS. 21a to 21f present images of columns that depict displacement of NAPL in several columns through which hydrogen peroxide ($H_2O_2$), sodium bicarbonate ($NaHCO_3$), and VeruSOL are flowed at various concentrations.

FIGS. 22a to 22f present images of columns that depict displacement of NAPL in columns through which hydrogen peroxide ($H_2O_2$) and Fe-NTA is flowed, with and without VeruSOL.

Figure 23:
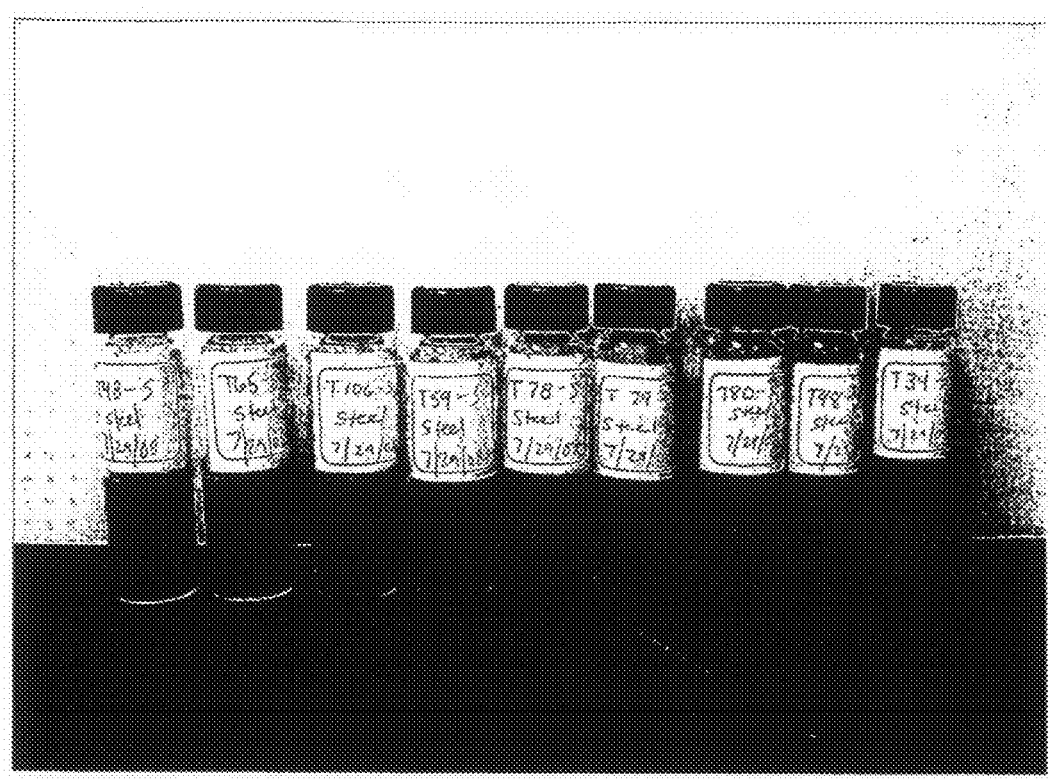

FIG. 23 presents a photograph showing the results of an emulsification screening study.

Figure 24:
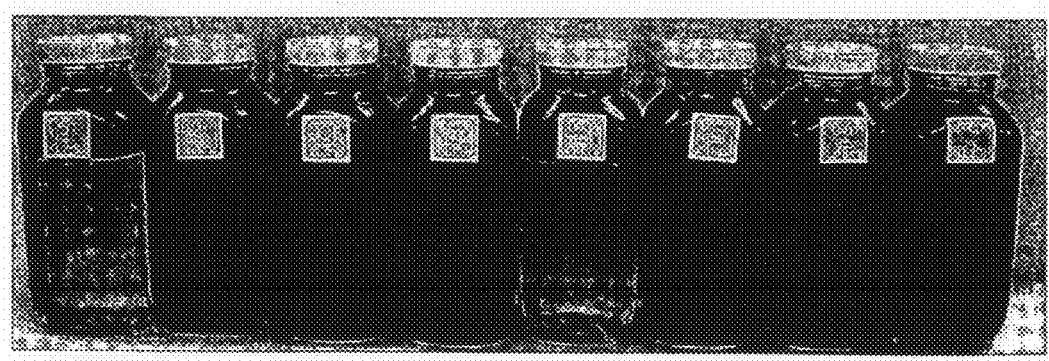

FIG. 24 presents a photograph showing the results of emulsification tests 5 minutes after removal from a shaker table.

Figure 25:
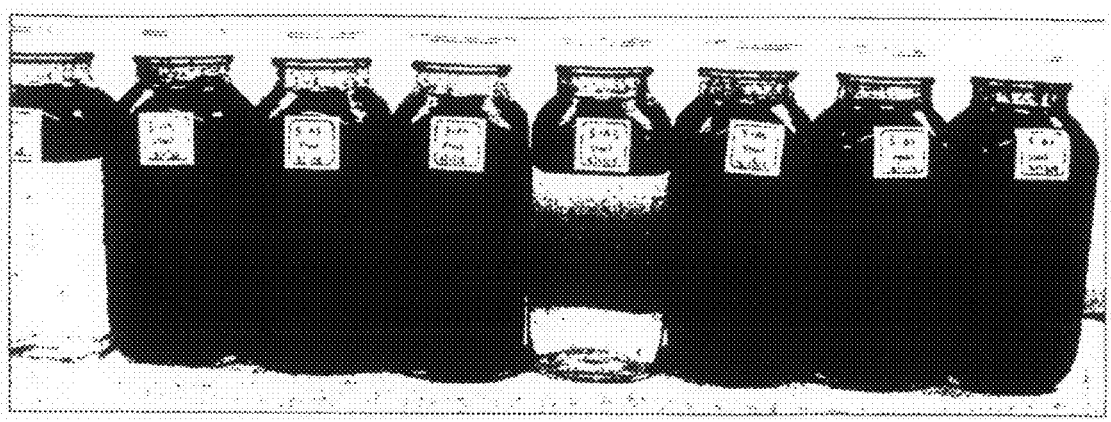

FIG. 25 presents a photograph showing the results of emulsification tests 30 minutes after removal from a shaker table.

Figure 26:
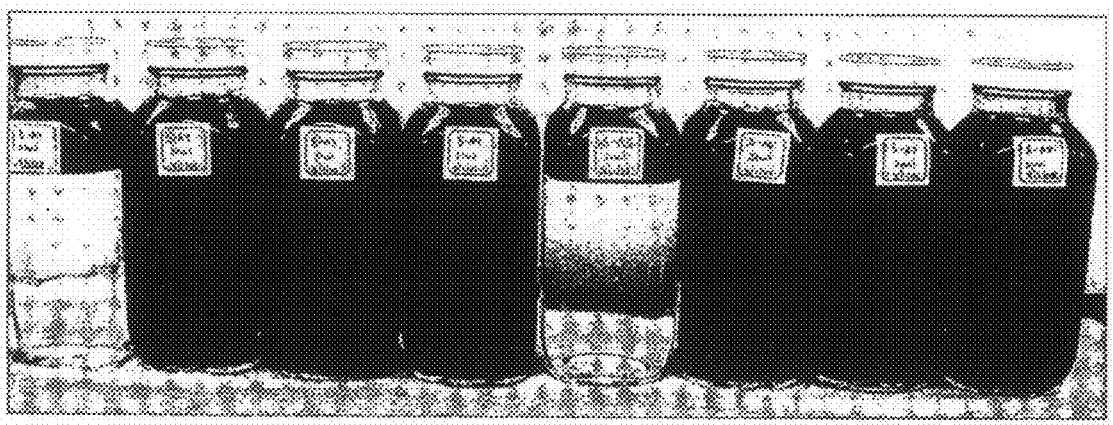

FIG. 26 presents a photograph showing the results of emulsification tests 60 minutes after removal from a shaker table.

Figure 27:
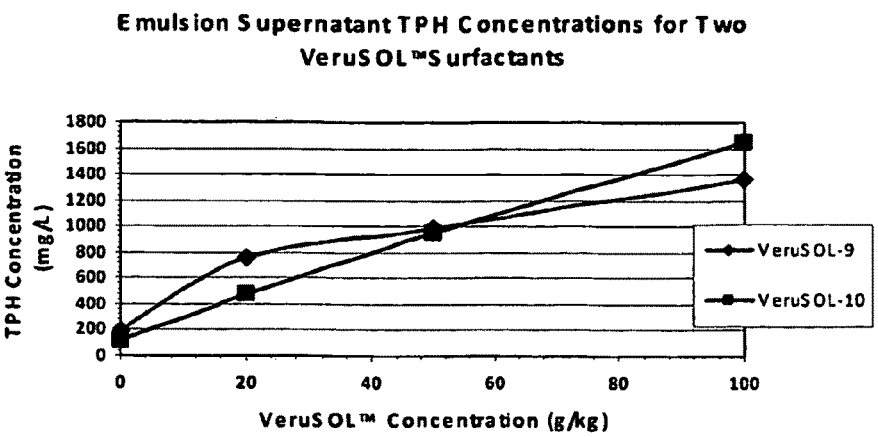

FIG. 27 presents emulsion supernatant TPH concentrations as a function of VeruSOL™ concentration for two VeruSOL™ Surfactants.

Figure 28:
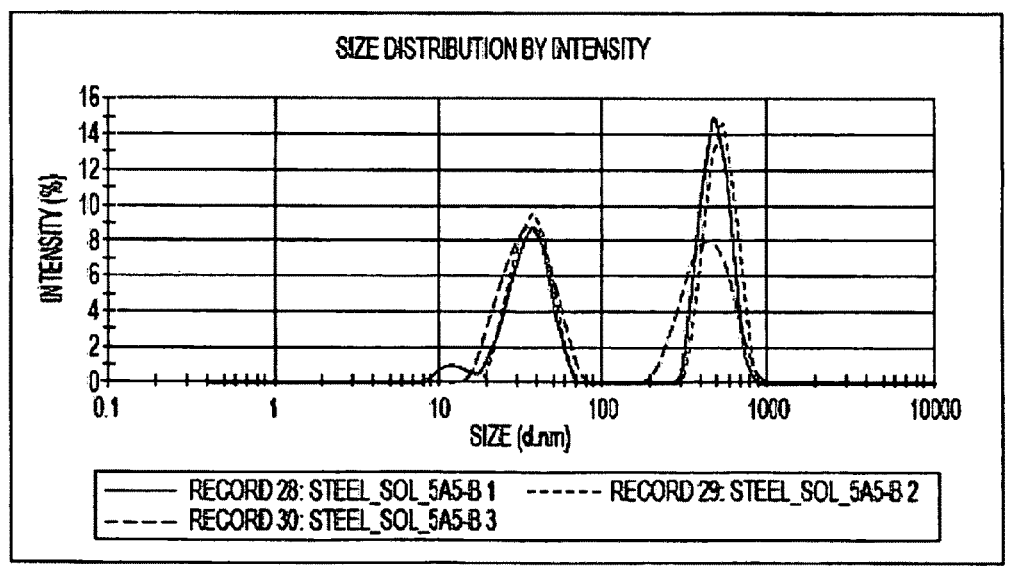

FIG. 28 presents a graph of intensity as a function of particle size as indicative of colloid particle size distribution (Aqueous Control with Site LNAPL).

Figure 29:
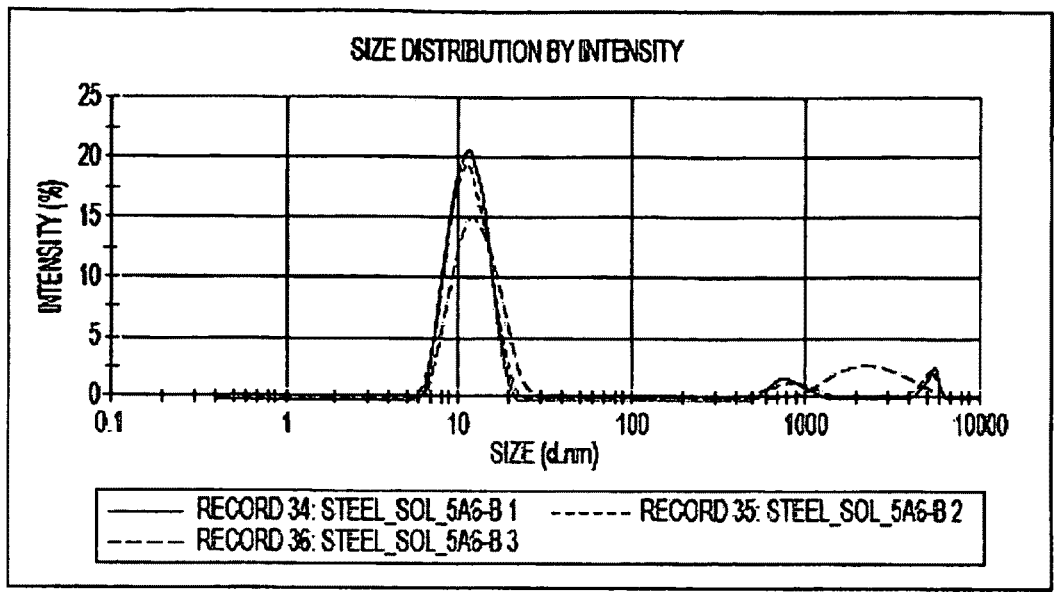

FIG. 29 presents a graph of intensity as a function of particle size as indicative of colloid particle size distribution with VeruSOL-10™ at 20 g/kg.

Figure 30:
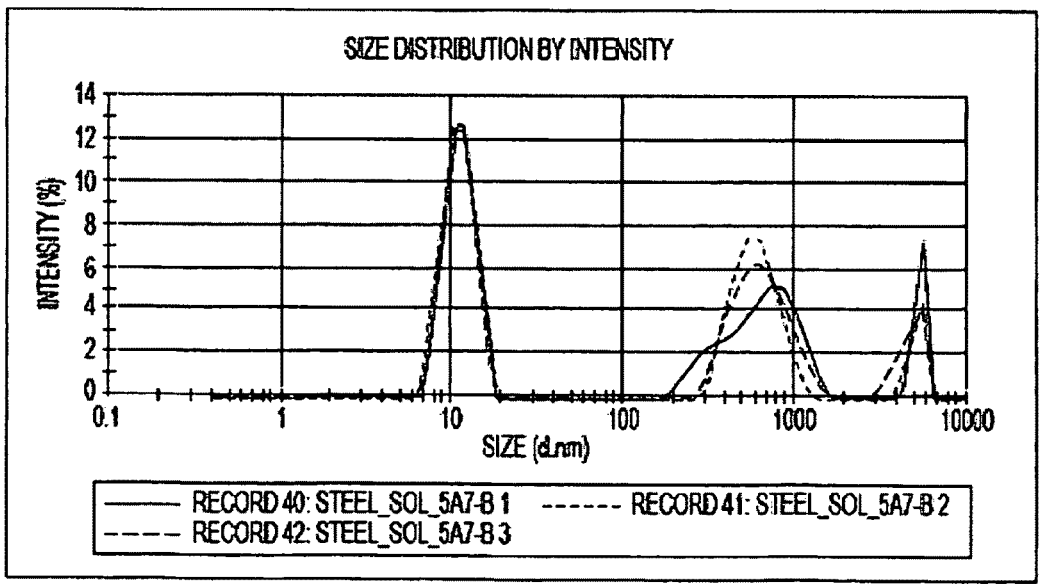

FIG. 30 presents a graph of intensity as a function of particle size as indicative of colloid particle size distribution with VeruSOL-10™ at 50 g/kg.

Figure 31:
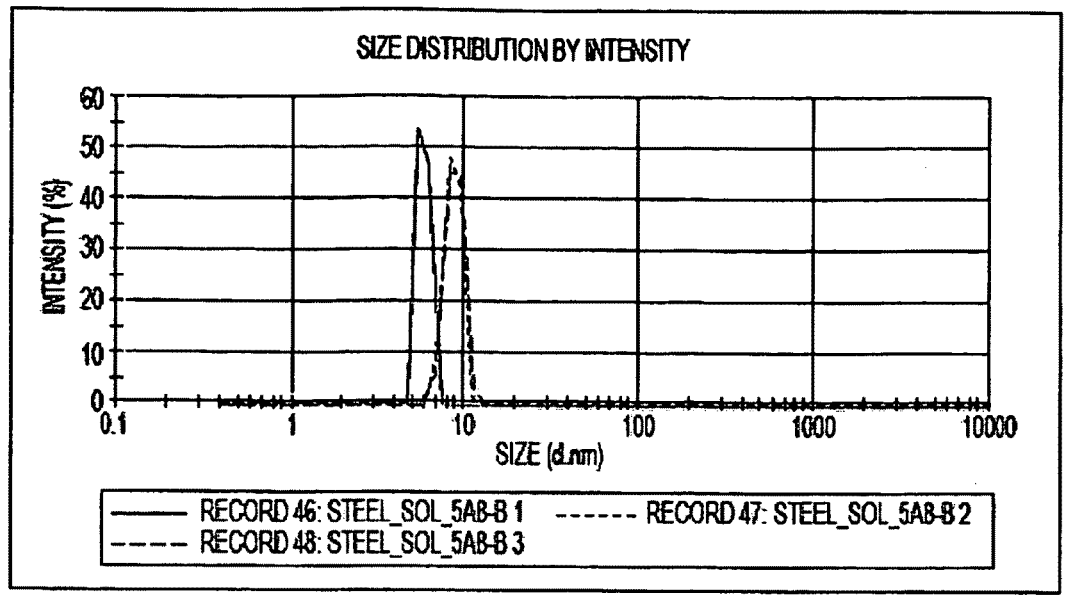

FIG. 31 presents a graph of intensity as a function of particle size as indicative of colloid particle size distribution with VeruSOL-10™ at 100 g/kg.

Figure 32:
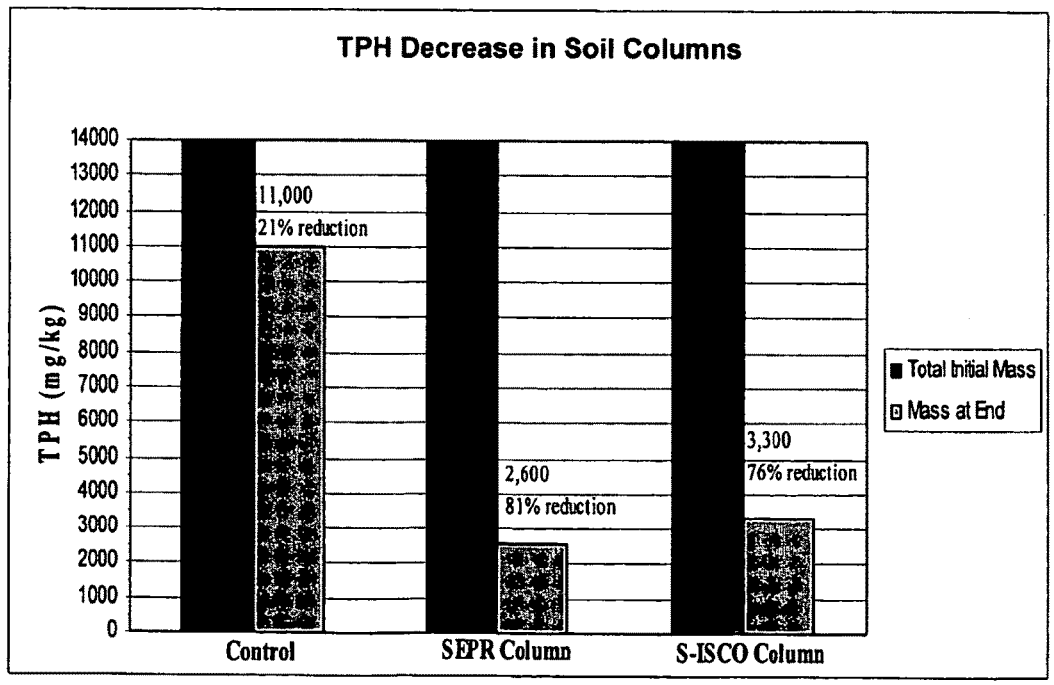

FIG. 32 presents results of the treatment of soil columns with the SEPR™ and S-ISCO™ processes in Phase I of a study.

Figure 33:
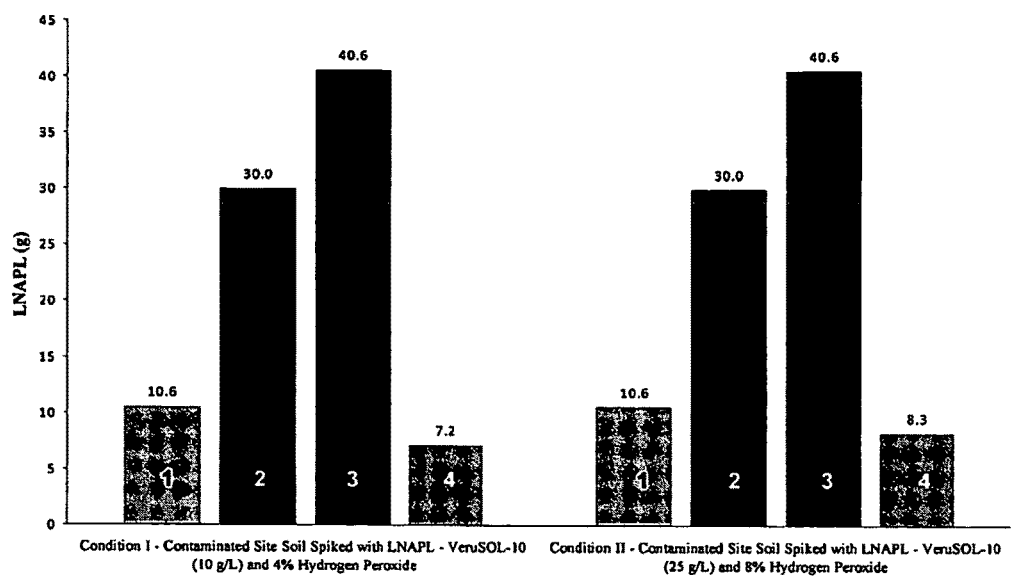

FIG. 33 presents results of the treatment of soil columns with the SEPR™ process in Phase II of a study.

Figure 34:
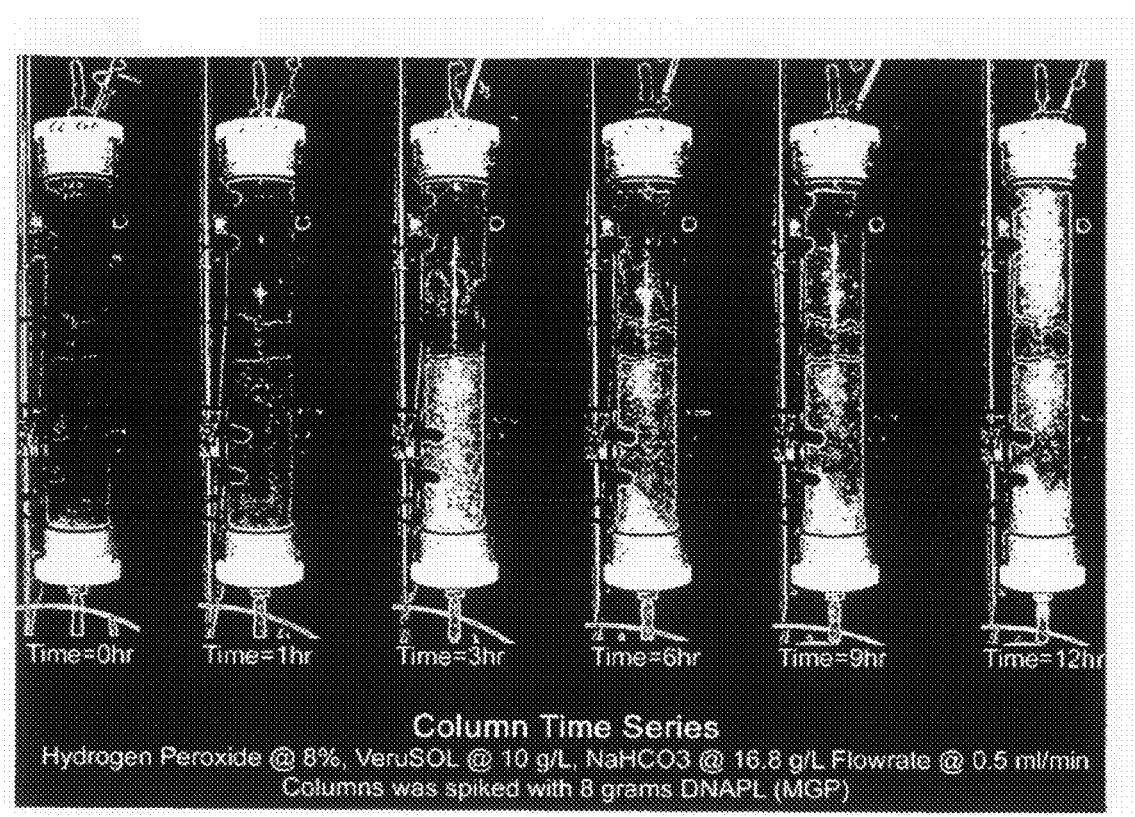

FIG. 34 presents photographs at different times of a soil column treated with the SEPR™ process.

Figure 35:
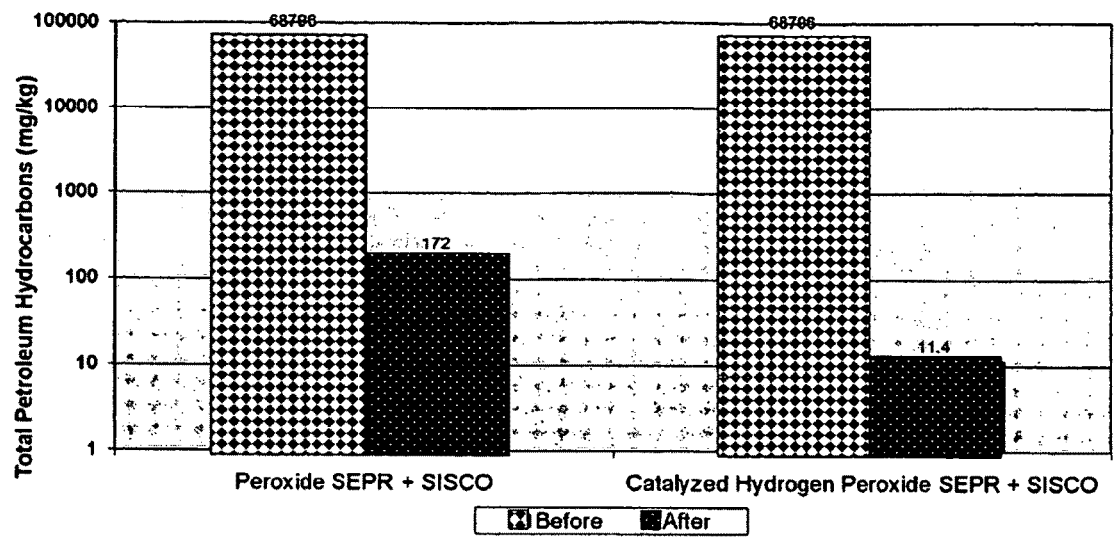

FIG. 35 presents a comparison of soil column surfactant enhanced product recovery (SEPR™) using hydrogen peroxide and using catalyzed hydrogen peroxide.

Figure 36:
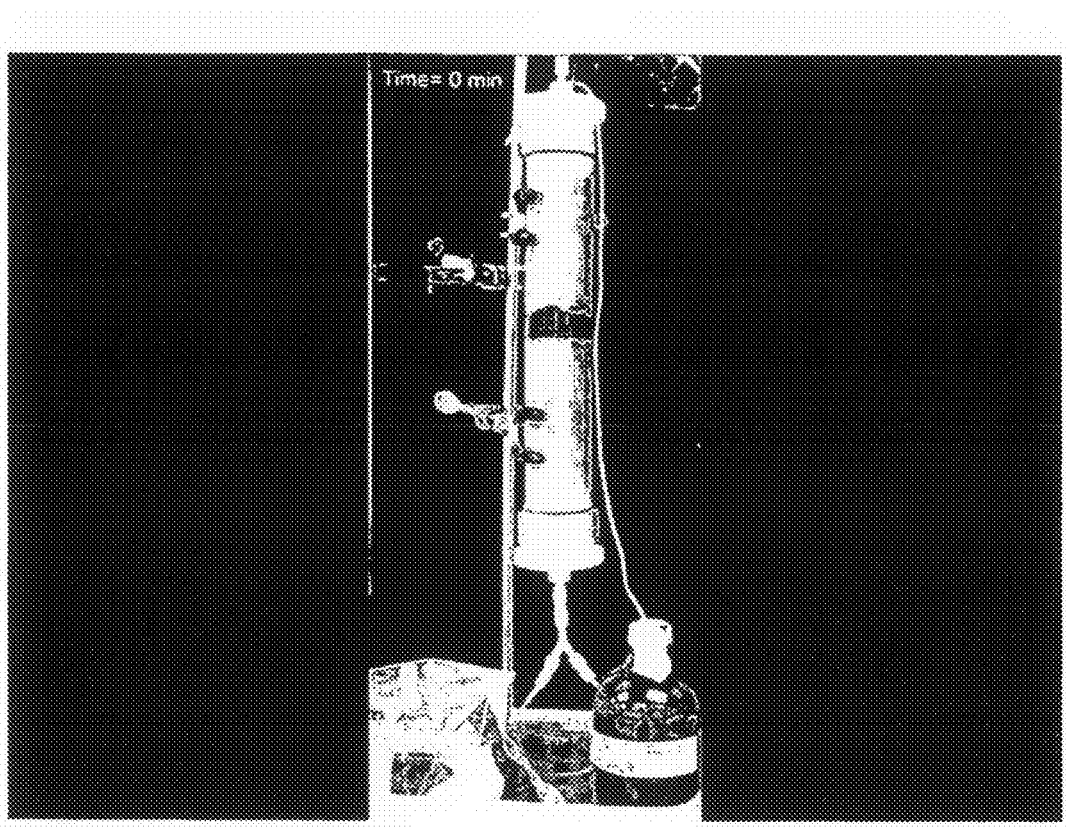

FIG. 36 presents a photograph of a soil column to which the SEPR™ process is being applied.

Figure 37:
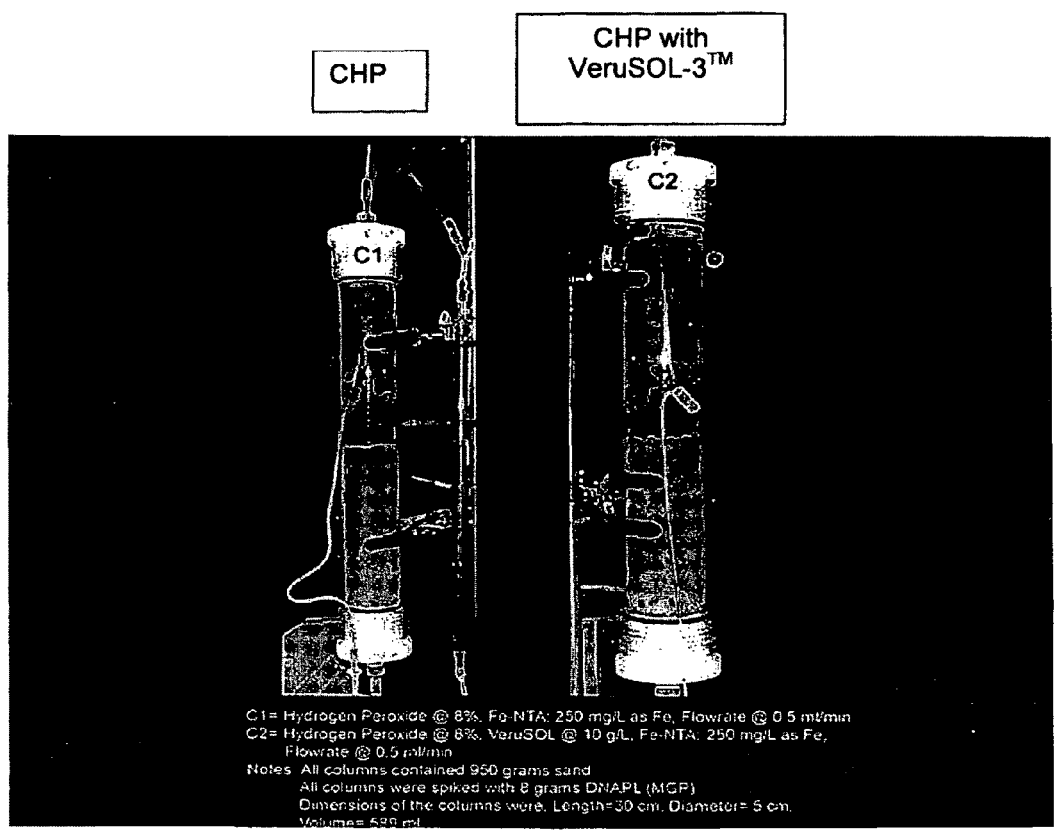

FIG. 37 presents photographs of a soil column treated with hydrogen peroxide and a soil column treated with hydrogen peroxide and VeruSOL™.

Figure 38:
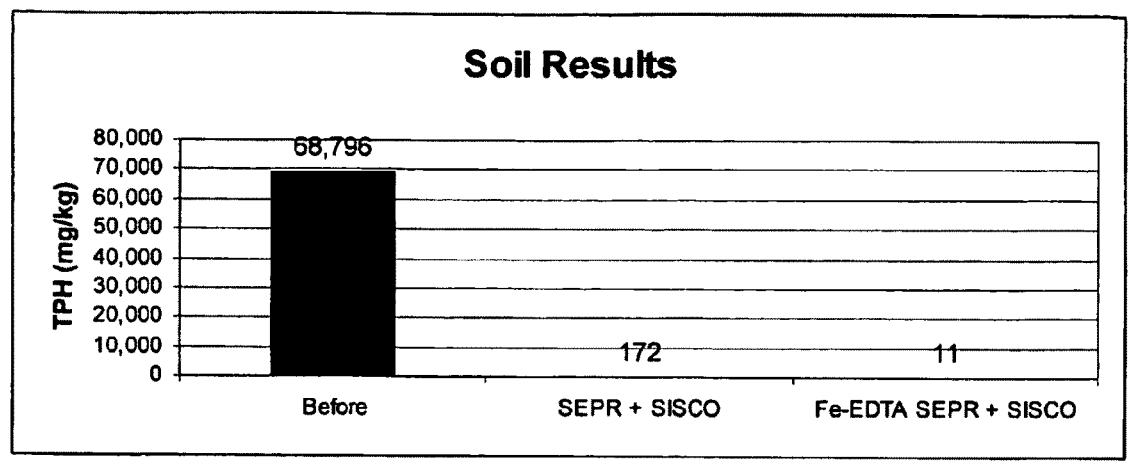

FIG. 38 presents results for treatment of contaminated soil with the SEPR™ and S-ISCO™ processes with and without the inclusion of Fe-EDTA in the SEPR™ process.

Figure 39:
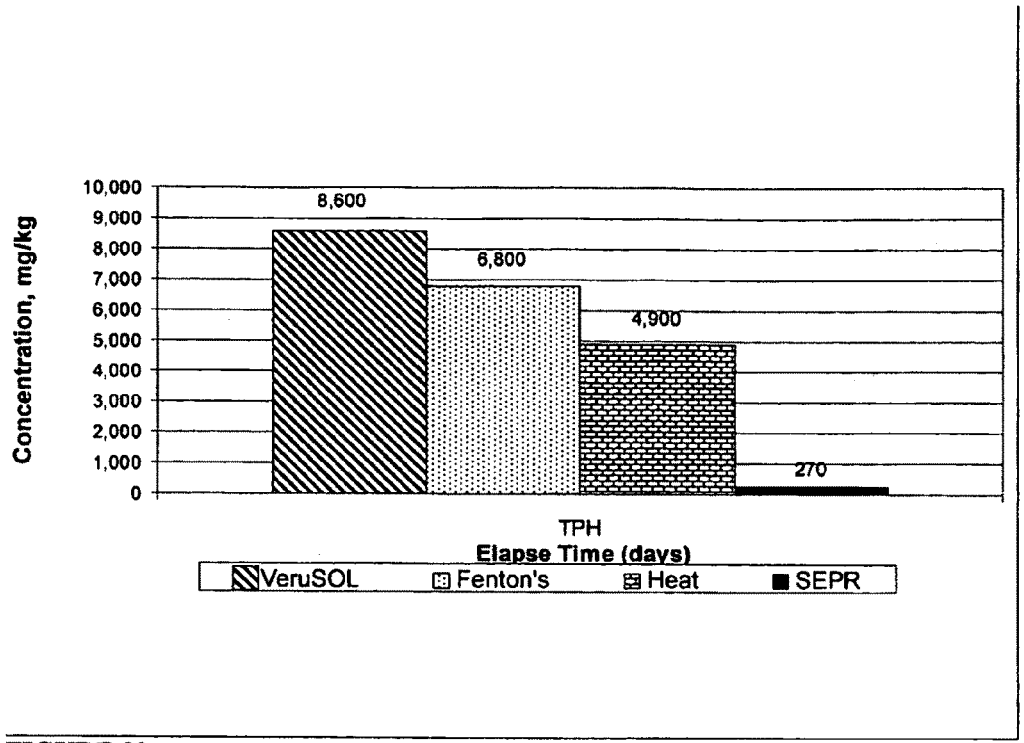

FIG. 39 presents a comparison of the results of treatment of contaminated soil with VeruSOL™, with Fenton's reagent, with heat, and with the SEPR™ process.

Figure 40:
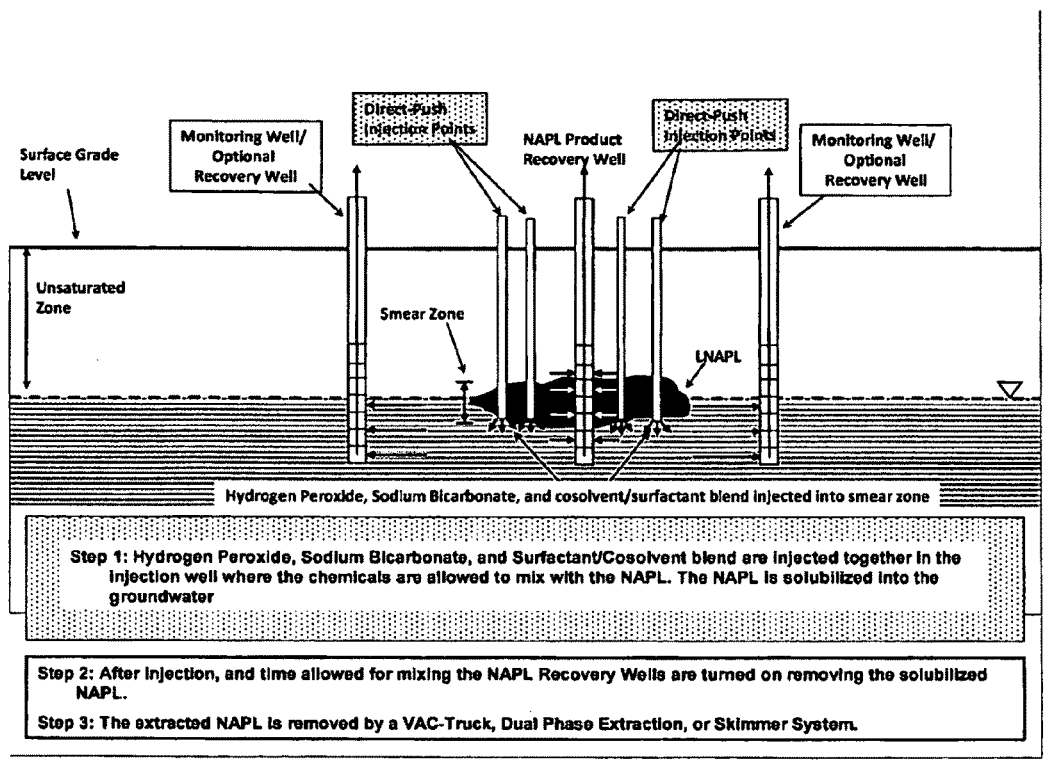

FIG. 40 presents a cartoon illustrating the SEPR™ (facilitated remediation) process.

Figure 41:
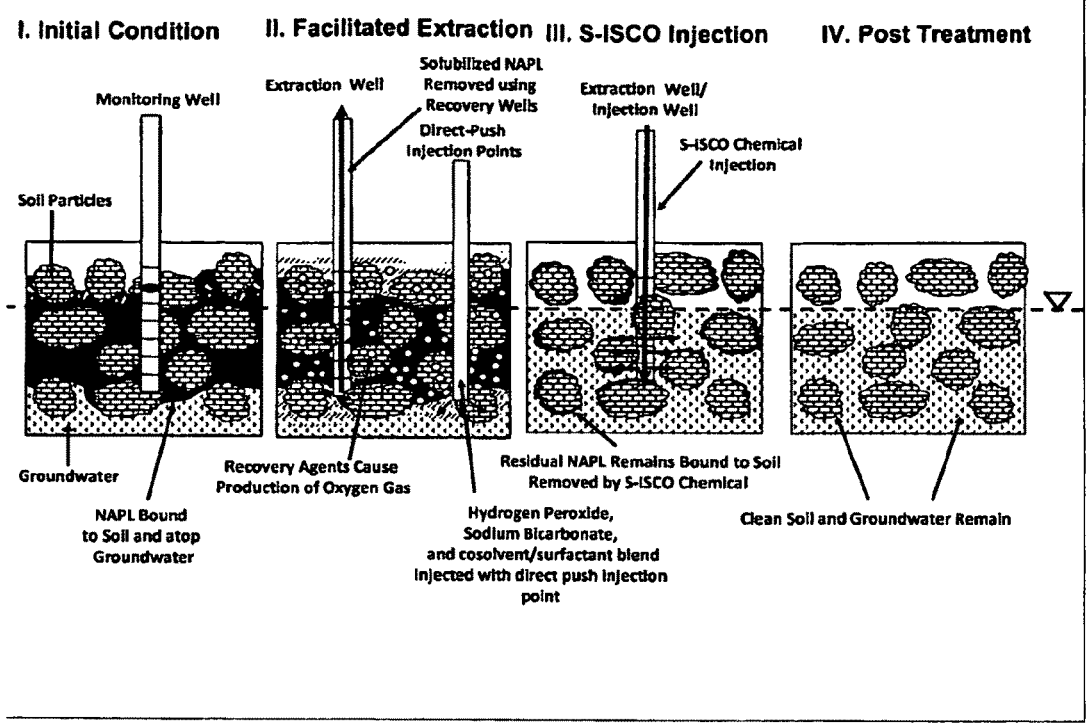

FIG. 41 presents a cartoon illustrating the SEPR™ (facilitated remediation) process.

Figure 42:
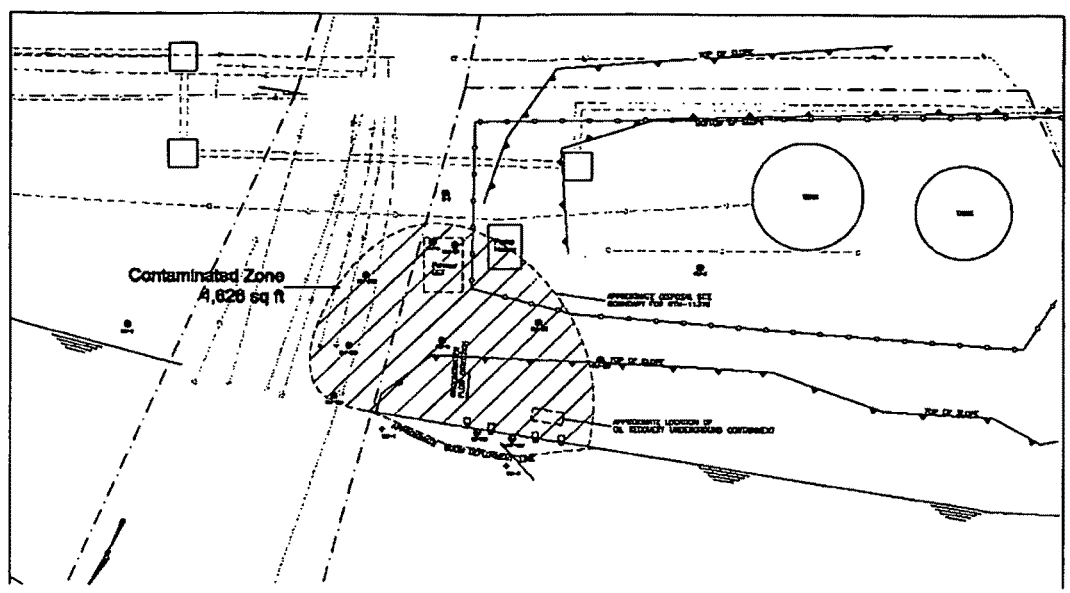

FIG. 42 presents a plan view of a site undergoing remediation.

Figure 43A:
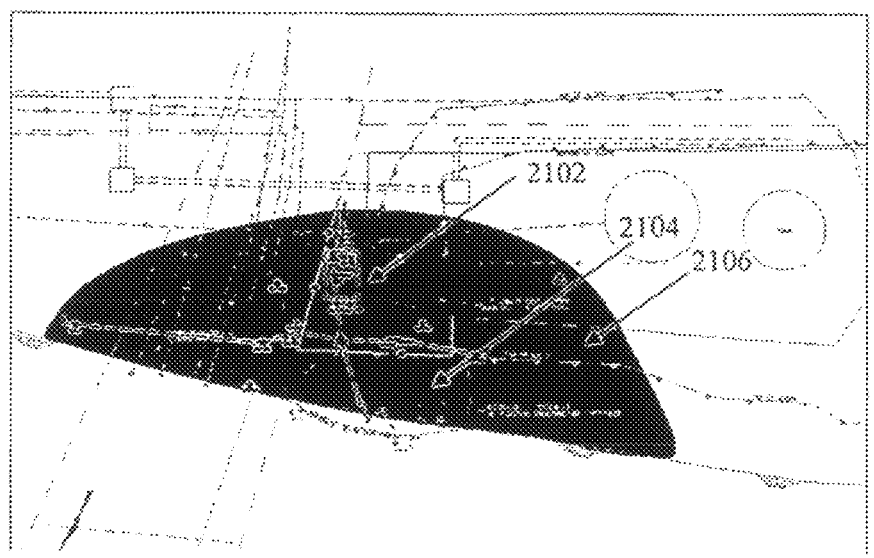

FIG. 43A presents a plan view of the site prior to treatment.

Figure 43B:
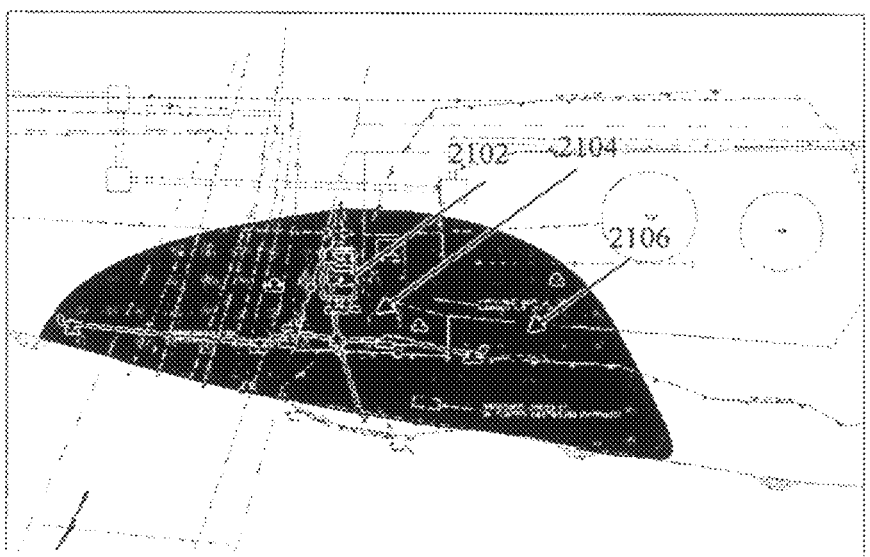

FIG. 43B presents a plan view of the site after 4 weeks of SEPR™ treatment.

Figure 44A:
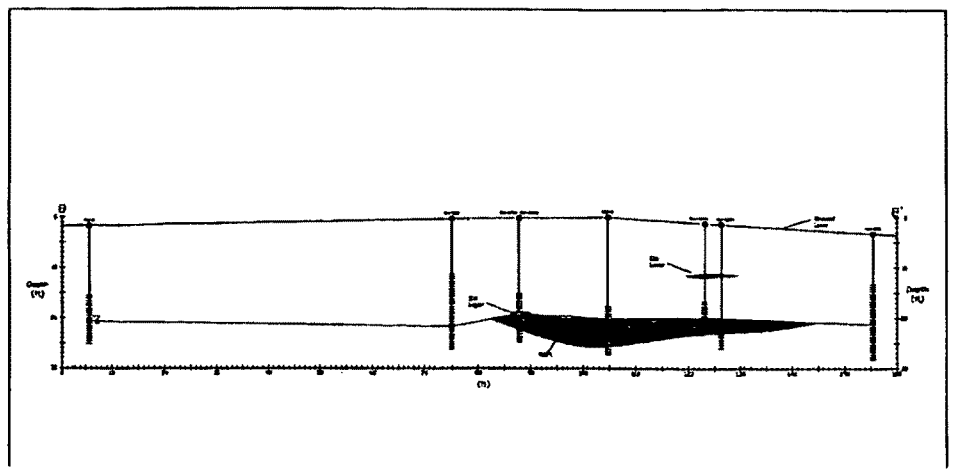

FIG. 44A presents an elevation view of the site.

Figure 44B:
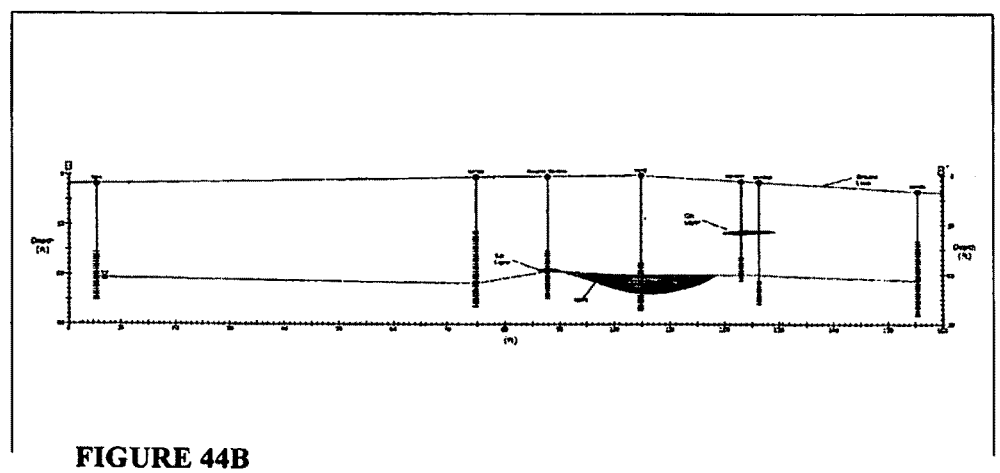

FIG. 44B presents an elevation view of the site after five weeks of treatment.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference as if each had been individually incorporated.

It is to be understood that the term "surfactant" encompasses a single surfactant, a mixture of surfactants, and one or more surfactants together with one or more cosolvents, unless the context in which the term "surfactant" is used indicates otherwise.

"Contaminants" encompasses any substance present in a location that, by its presence, diminishes the usefulness of the location for productive activity or natural resources, or would diminish such usefulness if present in greater amounts or if left in the location for a length of time. The location may be subsurface, on land, in or under the sea or in the air. As used herein, "contaminated soil" encompasses any soil that contains at least one contaminant according to the present invention. "Contaminant" thus can encompass trace amounts or quantities of such a substance. Examples of productive activities include, without limitation, recreation; residential use; industrial use; habitation by animal, plant, or other life form, including humans; and similar such activities. Examples of natural resources are aquifers, wetlands, sediments, soils, plant life, animal life, and ambient air quality.

"Introduce" means to cause to be present in a location. A material or item can be introduced into a location even if the material or item is released somewhere else and must travel some distance in order to reach the location. For example, if a substance is released at location A, and the substance will migrate over time to location B, the substance has been "introduced" into location B when it is released at location A. An item can be introduced in any manner appropriate under the circumstances for the substance to be introduced into the location.

An "effective amount" encompasses an amount of a material or item that will bring about a decrease in the amount of one or more contaminants in a location. An "effective amount" also encompasses an amount that brings about a stabilization of contaminant amounts or quantities in a location where they would otherwise increase or remain constant. It also encompasses an amount that brings about a reduction in the rate of increase of the amount or quantity of a contaminant in a location, as compared to the rate that would have obtained had the material or item not been introduced.

"Activate" means to modify or alter a substance in such a way that the substance is able to perform a function it was unable, or less able, to perform prior to activation. For example, "activation" encompasses the conversion of a persulfate ion into sulfate free radical, which is then able to oxidize other substances in a location.

"Expose" means to cause to be, or become, available for interaction with other substances in the surroundings. For example, once a polymer-coated nanoparticle is "exposed," it is available to come into contact, chemically react, or otherwise interact with chemicals in the location into which it has been introduced.

A "reducing environment" or "reducing zone" is an environment in which substances are generally more likely to be reduced—e.g., have their oxidation numbers reduced, or gain electrons—than they are in another location. A reducing environment can also be conducive to the growth and metabolism of anaerobic organisms, as a reducing environment will eliminate species, such as oxygen, that might otherwise interfere with their growth or development.

An "oxidizing environment" or "oxidizing zone" is an environment in which substances are generally more likely to be oxidized—e.g., have their oxidation numbers increased, or lose electrons—than they are in another location. An oxidizing environment can also be conducive to the growth and metabolism of aerobic organisms.

The Hoag-Collins in-situ chemical oxidation (ISCO) process uses the injection of chemical oxidants into a subsurface to destroy contaminants such as LNAPLs and DNAPLs. The Hoag-Collins surfactant-enhanced in-situ chemical oxidation (S-ISCO) process uses the simultaneous application of low concentrations of surfactants and cosolvents with chemical oxidants. The S-ISCO process simultaneously solubilizes and oxidizes contaminants, thereby saving time, energy, and cost. The S-ISCO process inherently rapidly destroys solubilized LNAPL and DNAPL compounds and minimizes or eliminates the risk of not recovering solubilized, emulsified, and/or mobilized LNAPL and DNAPL contaminants.

A goal in the remediation of sites containing large quantities of contaminants, such as LNAPLs and DNAPLs, is to obtain the benefits of ISCO (in-situ chemical oxidation) or S-ISCO (surfactant enhanced in-situ chemical oxidation) in destroying the contaminants without mobilizing them off site, while reducing the quantity and thus the cost of the oxidant injected.

In a method according to the invention, a user creates a localized zone in the subsurface for the extraction of large quantities of contaminants, such as LNAPLs or DNAPLs (extraction zone), while having chemical oxidation of the contaminants take place in the subsurface beyond the extraction zone. The extraction zone can include points in the subsurface at which a fluid element will eventually travel into an extraction well or other facility for removing the fluid element from the subsurface. The contaminants extracted may either be in a phase-separated state or in a solubilized or emulsified state. By creating a zone of chemical oxidation of the contaminants beyond the localized extraction zone, the risks associated with incomplete extraction of contaminants, such as LNAPLs or DNAPLs, inherent in traditional SEAR (surfactant-enhanced aquifer remediation) applications are minimized or eliminated. That is, in a process according the invention, a zone of chemical oxidation (oxidation zone) surrounding the extraction zone serves to destroy any contaminant that migrates out of the extraction zone, and thus prevents the spread of contaminant. Thus, the simultaneous use of the S-ISCO (surfactant enhanced in-situ chemical oxidation) process with extraction of the solubilized or emulsified LNAPLs and/or DNAPLs minimizes the risk from migration of NAPLs.

At the same time, by employing liquid extraction using single and/or dual phase pumping systems, for example, of the types that are commonly known in the art, the amount of oxidant chemical required may be less than that when ISCO (in-situ chemical oxidation) or S-ISCO (surfactant enhanced in-situ chemical oxidation) is used alone. At sites with large quantities of LNAPLs and/or DNAPLs, the cost of liquid extraction of contaminants, such as LNAPLs and/or DNAPLs, coupled with ISCO or S-ISCO may be less than using ISCO or S-ISCO alone. That is, the cost of extraction and subsequent on site treatment or off-site disposal of the contaminants may be offset by the savings represented by the decrease in the quantity of oxidant and/or other chemicals required. Thus, sites containing large quantities of contaminants, such as LNAPLs or DNAPLs, can be cost-effectively treated.

A method for reducing the concentration of a contaminant, such as a Light Non-Aqueous Phase (LNAPL) contaminant, at a site in a soil can include the following. A remediation zone including the contaminant, e.g., the LNAPL contaminant, can be selected. An oxidant that produces a gas phase can be introduced into a subsurface containing the soil to establish an oxidation zone. The concentration distribution of oxidant in the subsurface can be identified to determine the extent of the oxidation zone. Under, inside, upgradient, or downgradient of the oxidation zone, the contaminant, e.g., the LNAPL contaminant, can be induced to flow toward an extraction well to establish an extraction zone. The contaminant, e.g., the LNAPL contaminant, can be further induced to flow to an extraction zone by increasing contaminant solubility, mobility, or solubilization and mobility using surfactants, cosolvents, or mixtures of cosolvents and surfactants. The extraction zone can include points in the subsurface at which a fluid element will eventually travel into the extraction well. The oxidation zone can surround the contaminant, e.g., the LNAPL contaminant, extraction zone. The oxidation zone can include oxidant at a concentration sufficient to destroy contaminants moving into the oxidation zone.

Extraction of the contaminant can be performed other than through using an extraction well. For example, it may be useful to dig a trench into which contaminant can flow, so that the contaminant can then be removed from the trench.

The oxidation zone can prevent the spread of contaminant beyond the remediation and extraction zone. With a method according to the invention, the amount of contaminant in the soil can be substantially reduced.

A method for determining a subsurface contaminant remediation protocol can include the following. A soil sample, groundwater and contaminants can be collected from the subsurface. At least one target contaminant can be identified for concentration reduction. A surfactant, cosolvent, or mixture of cosolvents and surfactants can be identified to solubilize, mobilize, or solubilize and mobilize contaminants. An oxidant can be selected for injection into the subsurface to oxidize the target contaminant. The oxidant can include an oxidant that generates a gas phase upon its decomposition in the subsurface, the oxidant can be added as a gas, or the oxidant can be added as a dissolved gas. Further, in addition the added oxidant, dissolved gas under pressure can be added to the subsurface to generate a gas phase. The behavior of the gas phase, in addition to the cosolvent-surfactant mixture or surfactant alone leads to enhanced extraction of the contaminant. Further, a dissolved gas under pressure can be added to the subsurface to generate a gas phase in addition to a cosolvent-surfactant mixture or surfactant, which leads to enhanced extraction of the contaminant. The spatial concentration distribution of the target contaminant can be determined. A hydrogeological property of the subsurface can be determined. The determined spatial concentration distribution of the target contaminant and the hydrogeological property can be used to determine a target depth for the oxidant, gas phase generating oxidant, or pressurized dissolved gas in liquid, cosolvent-surfactant or surfactant and injection site(s) of the above injectants, and an extraction site for the contaminant.

A method for reducing the concentration of a contaminant at a site in a subsurface can include the following. The contaminant can include a non-aqueous phase liquid (NAPL), a dense non-aqueous phase liquid (DNAPL), and/or a light non-aqueous phase liquid (LNAPL). An extraction well can be provided in the subsurface. An injection fluid can be injected at an injection locus into the subsurface. The injection fluid can include hydrogen peroxide and/or another oxidant, or another gas phase generating oxidant or pressure dissolved gas in a liquid. The hydrogen peroxide and/or the other oxidant or dissolved gas can be allowed to decompose to liberate oxygen or dissolved gas in the subsurface. The other oxidant can be, for example, ozone, a persulfate, sodium persulfate, or a percarbonate. The injection fluid can include a liquid, e.g., water, and a dissolved gas, e.g., oxygen and/or carbon dioxide, and the dissolved gas can effervesce as a liberated gas upon a decrease of pressure on the injection fluid in the subsurface. The injection fluid can include a compressed gas and/or a supercritical fluid under a pressure greater than atmospheric. An injected gas can include, for example, oxygen, carbon dioxide, nitrogen, air, an inert gas, helium, argon, another gas, or combinations of these. The injection fluid can include a surfactant and/or a cosolvent, for example, the injection fluid can include VeruSOL. The injection fluid can include an alkali carbonate or bicarbonate, such as sodium bicarbonate. The injection fluid can include an activator, for example, a metal activator, a chelated metal activator, a chelated iron activator, Fe-NTA, Fe(II)-EDTA, Fe(III)-EDTA, Fe(II)-citric acid, or Fe(III)-citric acid. The injection fluid can include an antioxidant. The oxygen and/or the gas produced from reaction of the oxygen, hydrogen peroxide, and/or other oxidant with the contaminant, e.g., carbon dioxide, can be allowed to impose pressure to force the contaminant to flow through the subsurface toward the extraction well. The contaminant can be removed from the extraction well to a surface above the subsurface. The contaminant can then be stored, for example, in a storage tank, or can be disposed of, for example, in a waste destruction facility.

A wide range of configurations can be used to implement facilitated remediation by extraction aided by gas pressure in conjunction with ISCO or S-ISCO. Several of these are described below. The selection of a configuration for remediation of a site can be guided by considerations of, for example, the nature of the contaminant, hydrogeology of the site, economics of procedures such as well drilling and waste disposal, and costs of chemicals such as oxidants, cosolvents, and surfactants.

Remediation Configurations
Central Extraction—Surrounding Oxidant Injection

In an embodiment, an extraction well can be placed at a contaminated site for the purpose of extracting contaminants, such as LNAPLs and DNAPLs. The location of the extraction well can be determined based on several considerations, including geology, hydrology, including groundwater flow, and distribution of contaminant. Wells or injection points for injecting oxidant, or a mixture of oxidants, cosolvents, and/or surfactants can then be placed at points in a ring around the extraction well for the purpose of providing an oxidation zone beyond which mobilized contaminant cannot spread.

In this text, the term "oxidant" includes all oxidizing compounds or compounds that decompose or react to form an oxidizing compound. For example, the term "oxidant" includes solid, liquid, or gaseous compounds that can decompose to liberate oxygen or an oxidizing species. For example, the term "oxidant" includes compounds such as persulfates, percarbonates, peroxides, hydrogen peroxide, and permanganates. For example, the term "oxidant" also includes oxidizing gases, such as oxygen, ozone, and air. For example, the term "oxidant" also includes dissolved gases, such as oxygen or ozone, dissolved in an aqueous or non-aqueous liquid.

Oxidant can be injected through the injection wells into the subsurface. For example, this can be done as a first step, so that an oxidation zone for containing the spread of contaminant is established before any contaminant is mobilized. An initial injection of oxidant prior to extraction may be sufficient, or oxidant may be injected continuously during extraction. The injection wells can be drilled and distribution pipes inserted, so that injected oxidant is released at several depths, to form an oxidation zone, for example, a curtain of oxidant that extends from the surface downward. Migrating contaminant can be destroyed by this curtain of oxidant, so that it cannot leave the site. For example, the injection wells can be designed, so that the curtain of oxidant extends down to strata that are impermeable or have low permeability with respect to a targeted contaminant, for example, a DNAPL. Alternatively, the injection wells can be designed, so that the oxidant spreads in a layer underneath the contaminant site and any downward migrating contaminant will be destroyed once it reaches this underlying layer of oxidant. The oxidant zone can be created by injection wells screened at specific depth intervals and/or multiple depth intervals, and strategically placed to maximize the effectiveness of the oxidation zone in treating any contaminant not extracted in the extraction zone. The oxidant zone and the extraction zone can be created using injection and extraction trenches, emplaced fractures in the subsurface, and/or injection into fractures in bedrock. The oxidation zone is considered to enclose the extraction zone in the subsurface either if it forms a continuous shell in the subsurface which isolates the extraction zone from other points in the subsurface, or if the oxidation zone together with a layer of subsurface that is impermeable to contaminant that can reach that layer isolates the extraction zone from other points in the subsurface.

In another approach, oxidant can be initially injected through a central well, to establish an oxidation zone extending outward from the central well. Once this oxidation zone is established, contaminant can be extracted through the same central well. The extraction can be also done in a trench or a barrier trench and recovery system.

Contaminants, along with other subsurface fluids, such as groundwater, can be removed by, for example, applying a vacuum to the extraction well or activating a pump at the bottom of or at some other location in the extraction well. If contaminant is mobilized and, instead of entering the extraction well, migrates to the periphery of the site, the contaminant can be oxidized by the oxidation zone established by the injection of oxidant, either through surrounding injection wells or previously through a central well.

Extraction of contaminant can be promoted by, for example, introducing surfactants or cosolvents into the subsurface. Such surfactants or cosolvents can promote solubilization, emulsification, or mobilization of non-aqueous phase liquids (NAPLs) such LNAPLs and DNAPLs that are adsorbed onto solid surfaces or present in a separate phase, so that NAPL contaminants become more mobile and more readily migrate to the extraction well. Surfactants and oxidants can be, for example, injected through the extraction well prior to extraction, or can be injected in separate wells, either prior to extraction or continuously and simultaneously with extraction. For example, wells for injecting surfactant and/or cosolvents can be placed in a ring around the extraction well and within the ring formed by the oxidant injection wells. If, instead of migrating to the extraction well, NAPL contaminants migrate to the periphery of the site, they can be oxidized and destroyed at the oxidation zone.

In addition to promoting the extraction of contaminants, such as LNAPLs and/or DNAPLs, by injecting surfactants and/or cosolvents to solubilize and/or emulsify the contaminants, a variety of techniques, such as those using foaming, floatation, hydrological, thermal, hydrothermal, and/or hydrochemical means exist to extract contaminants such as LNAPLs and/or DNAPLs. In some cases, it may be preferable to modify the density of solubilized and/or emulsified contaminants, such as LNAPLs and/or DNAPLs, for example, by the injection of chemicals used for ISCO or S-ISCO or other chemicals, such as salts, to facilitate extraction of the contaminants from the subsurface.

Central Extraction—Downgradient Oxidant Injection

If a site has a pronounced groundwater flow, contaminant may essentially only migrate in the direction of groundwater flow, that is, in the downgradient direction. In this case, it may be sufficient to place oxidant injection wells downgradient of the extraction well and any separate surfactant or cosolvent injection wells. That is, instead of forming an oxidation zone that completely rings the extraction well and any cosolvent injection wells, it may be sufficient to establish an oxidation zone located downstream of the extraction well and any cosolvent injection wells. In other words, the oxidation zone can be located such that it intercepts the streamlines passing through points in the subsurface located in the extraction zone, downgradient of the extraction zone.

Circumferential Extraction

For certain contaminated sites, more than one extraction well may be required. For example, a ring of extraction wells located around the region of greatest contamination may serve to intercept migrating contaminant, and help prevent it from spreading further. However, such a ring of extraction wells alone may not suffice to prevent contaminant from migrating and contaminating a greater area.

However, an oxidation zone established by a ring of oxidant injection wells surrounding the ring of extraction wells can serve to destroy migrating contaminant and to prevent the contamination from spreading beyond the oxidation zone.

Alternatively, an oxidant injection well or several oxidant injection wells can be centrally located and surrounded by a ring of extraction wells. The oxidant injection well or wells can then introduce oxidant into the subsurface, which can spread to form an oxidation zone extending beyond the ring of extraction wells. Then, when contaminant is extracted through the extraction wells, the oxidation zone extending beyond the extraction wells can serve to prevent contaminant from migrating beyond the oxidation zone, and thus prevent the contaminant from spreading.

To promote mobilization of contaminant within the oxidation zone, so that the contaminant can be more readily extracted and/or oxidized, surfactant and/or cosolvent can be injected through one or more wells within the oxidation perimeter. For example, surfactant and/or cosolvent can be injected into the subsurface through a central well located within the ring of extraction wells.

The design of the remediation system can be modified if pronounced groundwater flow exists at the site, so that contaminant moves in essentially one direction, i.e., downgradient with the groundwater. For example, a line of wells for injecting surfactant and/or cosolvent can be placed upgradient of the contaminated region, so as to promote the mobilization and downgradient migration of contaminants, such as LNAPLs and DNAPLs. For example, this line of wells for injecting surfactant and/or cosolvent can be placed to lie perpendicular to the streamlines of flowing groundwater. A second line of extraction wells can be placed downgradient of the contaminated region, so that a fraction, perhaps the greatest part, of the mobilized contaminant is removed. For example, this line of extraction wells can be placed to lie perpendicular to the streamlines of flowing groundwater. A third line of oxidant injection wells can be placed downgradient of the contaminated region and of the line of extraction wells. For example, this line of oxidant injection wells can be placed to lie perpendicular to the streamlines of flowing groundwater. An oxidation zone established by the line of oxidant injection wells can destroy contaminant that is not removed by the extraction wells before the contaminant migrates any further downgradient.

Figure 1:
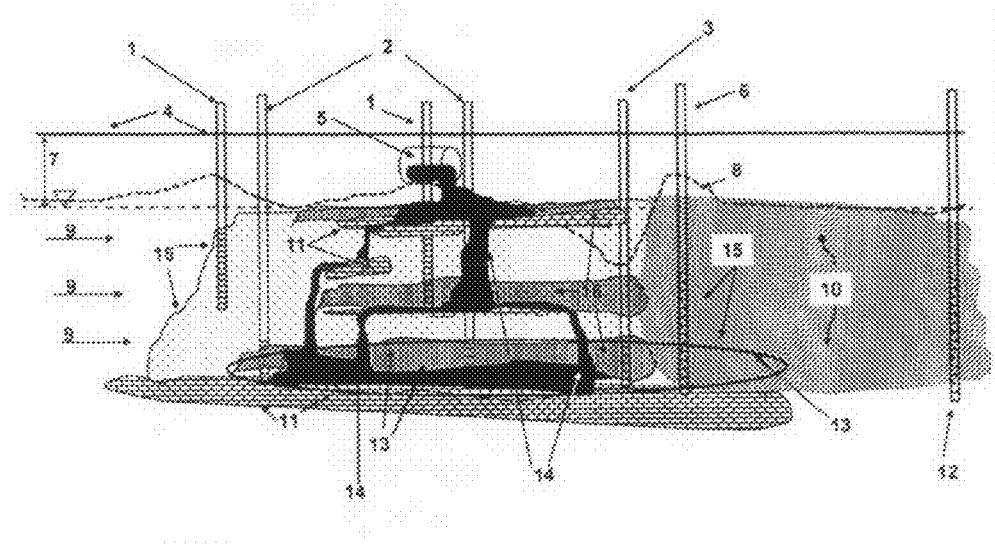
FIG. 1 is a cartoon depicting a process of simultaneous S-ISCO™ (surfactant enhanced in situ oxidation) and DNAPL extraction (S-ISCO-DE).

Establishment of Zones of Dominant Solubilization and Zones of Dominant Oxidation FIG. 1 describes simultaneous S-ISCO™ and DNAPL extraction (S-ISCO-DE). The following are present. A S-ISCO injection well 1 can be used to inject oxidant, surfactant and/or cosolvent, and/or other materials into the subsurface. For example, the injected material can induces a rate of solubilization about equal to the rate of oxidation of contaminant. An enhanced S-ISCO injection well 2, can induce a rate of solubilization greater than the rate of oxidation. An extraction well 3 can be used to extract contaminant and other matter, which can be pumped to a facility for treatment or recycling. The surface grade level 4 is shown. A source of DNAPL contaminant 5 can be, for example, a buried drum. An oxidant injection well 6 can be used to induce a rate of oxidation greater than the rate of solubilization and can serve to establish an oxidation perimeter. An unsaturated zone 7 can be present in the subsurface. It may be necessary to consider the groundwater elevation 8 and the groundwater flow 9 in designing and conducting treatment (remediation). A chemical oxidation zone 10 (diagonal lines) is shown. A continuous low permeability lens 11 horizontal brick pattern may be present in the subsurface. A monitoring well 12 can be used, for example, to determine the concentration of contaminant, oxidant, surfactant, and/or cosolvent before and during treatment. A zone of surfactant/cosolvent flushing 13 (oval shown by a black line) can be established. A DNAPL contaminated zone where DNAPL concentration is too low to economically flush 14 (solid black area) or where the risk of undesired mobilization caused by flushing alone that results in the spread of contaminant 15 (dotted area) would be too great may be present. A zone 16 (vertical brick pattern) in which the DNAPL contaminant is hydraulically captured by the extraction well 3, i.e., an extraction zone, and/or is oxidized can be established.

FIG. 1 illustrates an example of a contaminated site with a pronounced groundwater flow. Wells for injecting oxidant and surfactant and/or cosolvent can be placed within the region of greatest contamination and upgradient of the region of greatest contamination, e.g., enhanced S-ISCO injection wells 2. The ratio of the injection flow rate of oxidant to that of surfactant and/or cosolvent can be adjusted, so that solubilization dominates, that is, more contaminant is mobilized than is oxidized. This differs from a standard S-ISCO approach, in which the ratio of the injection flow rate of oxidant to surfactant and/or cosolvent is set so that essentially all mobilized contaminant is oxidized. In the remediation design illustrated by FIG. 1, it can be appropriate for more contaminant to be mobilized upgradient of and within the region of greatest contamination, because the mobilized contaminant is later removed further downgradient, as now described. An extraction well 3 located downgradient of the region of greatest contamination can serve to remove some, possibly the majority, of the mobilized contaminant.

An oxidation zone can be established by injecting oxidant through an oxidant injection well 6 located downgradient of the extraction well 3. In applying ISCO, only oxidant (with any carrier fluid, such as water) is injected through the oxidant injection well 6. The injected oxidant serves to destroy contaminant that migrates past the extraction well. Depending on the identity and concentration of the contaminant and the oxidant, the contaminant can be destroyed within a short distance of the oxidant injection well 6. Or the oxidant can travel downgradient with the contaminant, destroying the contaminant in a chemical oxidation zone 10 extending downgradient from the oxidant injection well 6. In either case, the contaminant is destroyed before it migrates too far downgradient from the region of greatest contamination, so that the contamination does not spread.

In applying S-ISCO, surfactant and/or cosolvent can be injected along with oxidant through the oxidant injection well 6. The injection of surfactant and/or cosolvent may be useful to maintain migrating contaminant in a solubilized or emulsified state and thereby promote the reaction of contaminant with oxidant. For example, the surfactant and/or cosolvent injected upgradient in wells 2 may be degraded by the oxidant present, so that a supplemental injection of surfactant and/or cosolvent at oxidant injection well 6 is advantageous. However, the ratio of the flow rate of oxidant to the flow rate of surfactant and/or cosolvent injected at oxidant injection well 6 can be selected, so that the rate of oxidation dominates over the rate of mobilization in the chemical oxidation zone downgradient of the oxidant injection well 6. In this way, the contaminant is destroyed in the chemical oxidation zone and the injected surfactant and/or cosolvent is destroyed in the chemical oxidation zone, so that contaminant and excess surfactant and/or cosolvent does not spread to pollute the environment.

In other words, by using the approach of extraction in conjunction with ISCO or S-ISCO, a local rate of solubilization and/or emulsification of a contaminant, such as LNAPL and/or DNAPL, can greatly exceed the local rate of chemical oxidation, provided that the excess LNAPL and DNAPL solubilized and/or emulsified is captured and removed from the subsurface by extraction and that cross- and/or downgradient zones of chemical oxidation, e.g., oxidation zones, have been created in the subsurface to ensure complete oxidation of any solubilized chemicals not extracted.

The overall rate of oxidation can be controlled by controlling the concentration of oxidant in the subsurface. For example, if a greater mass of oxidant is introduced into a given volume of subsurface, then the concentration of oxidant in that volume will be greater and the rate of oxidation will be faster. On the other hand, if a lesser mass of oxidant is introduced into a given volume of subsurface, then the concentration of oxidant in that volume will be lesser and the rate of oxidation will be slower. The overall oxidation rate can be controlled by selection of the specific oxidant used, as well as the concentration of the oxidant.

Selection of a Remediation Configuration

Consideration of factors such as the nature of the contaminant, distribution of the contaminant, geology, and hydrogeology, e.g., groundwater flow, of a site to be remediated can indicate the most appropriate configuration of an oxidant injection well(s), surfactant injection well(s), and/or extraction well(s). Selection of an appropriate configuration will prevent the spread of contaminant beyond a user-selected remediation zone in the subsurface. For example, if the oxidant zone or a combination of the oxidant zone and a geological feature, such as a stratum impermeable to the identified contaminant that completely separates the remediation zone from the rest of the subsurface, i.e., the oxidation zone encloses the extraction zone in the subsurface, the oxidation zone can prevent the spread of the targeted contaminant beyond the remediation zone. Alternatively, if the groundwater flow is such that essentially all the contaminant flows in one direction away from the contaminated site, then an oxidation zone can be established that intercepts the flowing groundwater and contaminant downstream of the contaminated site, and thereby prevent the spread of contaminant beyond a remediation zone established by the groundwater flow and the oxidation zone. Alternatively, the geology and hydrogeology surrounding a contaminated site may be such that contaminant does not migrate in one direction, but is still limited to migrate in certain directions without migrating in other directions. Such a more complex pattern of contaminant migration can be considered by a user in selecting a remediation zone and a configuration of extraction well(s), oxidant injection well(s), and surfactant injection well(s), so that contaminant does not migrate beyond the remediation zone, while realizing savings by not placing extraction, oxidant injection, and/or surfactant injection well(s) in areas through which the contaminant will not migrate. For example, oxidant zone(s) can be established to intersect all streamlines on which contaminant is present that originated from the contaminated site.

A user's selection of a remediation zone and configuration for remediation will be governed by a number of factors, that may include distribution of contaminant, nature of the contaminant (e.g., solubility in water), geology, hydrogeology, cost of well drilling, cost of chemicals such as oxidants and/or surfactants, intended future use of the contaminated site once remediated, property rights, state and federal environmental regulations, and potential liability if the contaminant spreads beyond property controlled by the individual or organization responsible for the cleanup (e.g., possibly greater if a residential area surrounds the contaminated site than if an industrial area surrounds the contaminated site). In certain cases, a user may find it necessary to reduce any further spread of contaminant to a minimum, and thus select a small remediation zone around the contaminated site and completely surround the site with an oxidant zone to prevent the spread of contaminant beyond the remediation zone. In other cases, a user may find it acceptable to allow some further spread of the contaminant if doing so will reduce the expense of remediation. For example, if the groundwater flow is such that streamlines passing through the contaminated site converge at a point downgradient of the contaminated site, it may be cost effective and environmentally acceptable to provide an oxidant zone at the point where the streamlines converge.

In all remediation approaches using extraction wells in conjunction with ISCO or S-ISCO, monitoring wells can be used. For example, monitoring wells can be used to identify the extent of an oxidation zone created by injection of oxidant into the subsurface. For example, as illustrated in FIG. 1, a monitoring well 12 can be located within or downgradient of a chemical oxidation zone extending downgradient from an oxidant injection well 6. The monitoring well 12 can be used to verify whether the concentration of contaminant has been reduced to an acceptable level and whether the concentrations of injected chemicals such as oxidant, surfactant, and/or cosolvent are at or below acceptable levels. Monitoring wells can also be used, for example, to determine the flow of groundwater, for example, by injecting tracer chemicals, and to determine progress in remediating contamination at the site.

For example, confirmation that a zone of either ISCO or S-ISCO exists in the subsurface can be made by monitoring physical and/or chemical characteristics of soil and groundwater in and around the subsurface zone where the solubilized or emulsified LNAPLs or DNAPLs are to be extracted. Physical characteristics to be monitored can include pH, temperature, specific conductance or electrolytic conductivity, turbidity, dissolved oxygen, surface tension (or interfacial tension), particle size distribution of emulsions, density, and viscosity. Chemical characteristics to be monitored can include, for example, oxidation reduction potential, presence or concentration of inorganic compounds or ions, such as sodium, potassium, ammonium, chloride, persulfate, sulfate, permanganate, manganese, radical scavenging species, inorganic carbon species, nitrate, nitrite, phosphorous species, activators, antioxidants, radical scavengers, stabilizers, metal species, and iron species. Organic chemical compound characteristics to be monitored can include, for example, surfactants, cosolvents, priority pollutants, organic carbon species, total petroleum hydrocarbon species, LNAPL and DNAPL chemical constituents, chelates, activators, antioxidants, radical scavengers, and stabilizers. Subsurface monitoring can be used to confirm that a zone of chemical oxidation, e.g., an oxidation zone, exists in the subsurface in the intended or actual remediation zone, such as in localized area(s) for extraction, as well as cross- and down-gradient of the localized extraction zone. For example, after such a zone of chemical oxidation is confirmed, extraction of contaminant and/or injection of concentrations of surfactants and/or cosolvents for solubilization and/or emulsification of the LNAPL or DNAPL can commence. The existence of a confirmed zone(s) of chemical oxidation can ensure that any solubilized or emulsified LNAPLs and/or DNAPLs not captured by extraction are treated, i.e., destroyed, in the chemical oxidation zone, e.g., at the oxidation zone.

When surfactants and/or cosolvents are injected into the subsurface to promote the extraction and/or oxidation of contaminants, such as LNAPLs and/or DNAPLs, the surfactants and/or cosolvents can be injected in a range of low concentrations, so that above ground recycling of surfactants and/or cosolvents extracted is not required. For example, such a low range of surfactant and/or cosolvent concentration can range from about 0.05 weight percent (wt %) to about 1 wt %. However, at certain contaminated sites, for example, certain sites with high concentrations of LNAPLs and/or DNAPLs, pooled DNAPLs, or LNAPLs floating on the water table, increasing the concentration of injected surfactants and/or cosolvents up to about 5% may be used to more cost-effectively extract the contaminant than if the surfactants and/or cosolvents were injected at lower concentration. For example, any extracted surfactants and/or cosolvents may be treated or recycled above ground.

ISCO or S-ISCO can be combined with a traditional SEAR method using a water in oil system, for example, a Winsor type 2 system, to remediate a contaminated site. For example, where NAPL mobilization and extraction is desired, with or without above ground treatment and recycling of injected surfactants and/or cosolvents, ISCO or S-ISCO can be used cross- and/or down-gradient from the SEAR treatment zone to ensure that mobilized NAPLs that are not extracted and/or surfactant and/or cosolvent mixtures are destroyed by chemical oxidants. This enables a safer application of SEAR, with a reduction of potential environmental and health risks associated with using SEAR alone. Such an application of ISCO or S-ISCO in conjunction with SEAR can involve the installation of ISCO or S-ISCO injections immediately down-gradient from the SEAR application. Alternatively, such an application of ISCO or S-ISCO in conjunction with SEAR can involve injections of ISCO or SISCO chemicals to establish an oxidation zone downgradient from the SEAR application zone. The specific chemical oxidants, surfactants, and/or cosolvents used to destroy any mobilized contaminants, such as LNAPLs and/or DNAPLs, and/or surfactants and/or cosolvents associated with the SEAR process that are not recovered by extraction can be selected through prior laboratory experimentation. For example, surfactants and/or cosolvents can be selected to be effective at mobilizing the target contaminant(s).

Surfactants and/or cosolvents can be selected to be environmentally harmless and/or biodegradable. Oxidants can be selected to destroy the target contaminant(s) and other SEAR chemicals used, such as surfactants and/or cosolvents, and harmful degradation products of contaminants, surfactants and/or cosolvents. Once the SEAR process is completed, ISCO or S-ISCO treatment can be applied within the zone of former SEAR treatment to ensure that contaminants are eliminated or reduced to an acceptable level.

ISCO or S-ISCO can be applied at sites where SEAR has been used in the past, and contamination still remains as a result of incomplete treatment and/or undesirable by-products from the SEAR process remain.

Control Over Surfactant Oxidant Systems for Remediation

An amount of surfactant or surfactant-cosolvent mixture can be introduced into a subsurface, for example, rock, soil, or groundwater, including a contaminant, for example, a NAPL, to form a Winsor Type I system. In order to form a Winsor Type I system, the amount of surfactant or surfactant-cosolvent mixture added is controlled and restricted; that is, not so much of a surfactant or surfactant-cosolvent mixture is added to induce the formation of a Winsor Type II system, but enough to result in increased solubilization of the NAPL above the aqueous critical micelle concentration. Thus, the formation of a Winsor Type II system and the mobilization of contaminant, for example, NAPL, associated with a Winsor Type II system, is avoided or minimized. By avoiding or minimizing the mobilization of contaminant, the problem of contaminant migrating to areas not being treated can be avoided. For example, sufficient surfactant can be injected into a region that serves as an oxidation zone to increase the amount of a NAPL contaminant in the aqueous phase, for the purpose of increasing the rate of oxidation of the contaminant. At the same time, the amount of surfactant injected can be kept sufficiently small so that a Winsor Type I, and not a Winsor Type II system is formed. By forming a Winsor Type I system in the oxidation zone, mobilization of contaminant, such as a NAPL, beyond the oxidation zone is minimized.

Contaminant in a subsurface can be locally mobilized in a controlled manner; then, the mobilized contaminant can be oxidized. For example, at a site contaminated with NAPLs, the NAPLs may accumulate in sufficient thicknesses that the relative permeability to water in the NAPL accumulation zone is very low and injected chemicals simply pass over, under or around the NAPL accumulation zone, leaving the area untreated. A Winsor Type II or Type III system can be locally formed, for example, near such a NAPL accumulation zone in the subsurface to mobilize the NAPLs to travel into subsurface zones where they are more available to and have greater contact with oxidant chemicals in the aqueous phase. The emulsion then can be broken, for example, with an oxidant or other emulsion breaker, to create, for example, a Winsor Type I system to make the NAPL more available to react with the oxidant solution. For example, a Winsor Type III system can mobilize a contaminant phase, for example, a NAPL phase, in the microemulsion. For example, when the NAPL content of soil in a subsurface is low, a Winsor Type III middle phase microemulsion can be formed to mobilize the NAPL into a bulk pore space and then oxidize the emulsified NAPL in the bulk pore space, for example, by chemical oxidation. For example, surfactant can be injected into the subsurface to form a Winsor Type II or Type III system in the vicinity of the extraction well. The Winsor Type II or Type III can effectively mobilize the NAPL to enhance its extraction by the well from the subsurface.

S-ISCO Ordering of Surfactant and Oxidant Injection

In implementing S-ISCO, the surfactant or surfactant-cosolvent mixture can be introduced sequentially or simultaneously (together) into a subsurface. For example, the surfactant or surfactant-cosolvent mixture can first be introduced, then the oxidant and/or other injectants can be introduced. Alternatively, the oxidant can first be introduced, then the surfactant or surfactant-cosolvent mixture can be introduced. Alternatively, the oxidant and the surfactant or surfactant-cosolvent mixture can be introduced simultaneously. Simultaneously can mean that the oxidant and the surfactant and/or cosolvent are introduced within 6 months of each other, within 2 months of each other, within 1 month of each other, within 1 week of each other, within 1 day of each other, within one hour of each other, or together, for example, as a mixture of oxidant with surfactant and/or cosolvent. In each case, the oxidant is present in sufficient amounts at the right time, together with the surfactant, to oxidize contaminants as they are solubilized or mobilized by surfactant or cosolvent-surfactant mixture.

Form of Injected Treatment Chemicals

The introduced compositions, which can include oxidant, surfactant, activator, cosolvent, and/or salts, can be introduced into the subsurface in the solid phase. For example, the location where the compositions are introduced can be selected so that groundwater can dissolve the introduced compositions and convey them to where the contaminant is. Alternatively, the introduced compositions such as oxidant, surfactant, activator, cosolvent, and salts can be introduced into the subsurface as an aqueous solution or aqueous solutions. Alternatively, some compositions can be introduced in the solid phase and some can be introduced in aqueous solution.

Physical Injection Parameters: Delivery of Treatment Chemicals to Contaminant

In an embodiment of the invention, the contaminated zone to be treated can be the subsurface. Alternatively, the contaminated zone to be treated can be above ground, for example, in treatment cells, tanks, windrows, or other above-ground treatment configurations.

In an embodiment of the invention, the introduced compositions may be applied to the subsurface using injection wells, point injection systems, such as auger, direct push or other hydraulic or percussion methods, trenches, ditches, and/or by using manual or automated methods. In an embodiment of the invention, the introduced compositions may be applied to the subsurface using emplaced fractures using hydraulic or sonic methods or directly into fractures and/or fracture networks that exist in bedrock.

An embodiment of the invention involves the use of controlling the specific gravity of the introduced compositions, consisting of oxidants, activating solutions, salts, surfactants, and/or surfactant-cosolvent mixtures. By controlling the specific gravity of the injected solutions, greater control of the vertical interval of the volume of soil treated can be achieved. Sites with high concentrations of NAPL or sorbed organic chemicals in soils generally require higher concentrations of oxidants than needed at sites with lower concentration of contaminants. Injecting oxidant/activator/surfactant chemicals into the subsurface at sites with a high demand for these injected chemicals can result in solutions with densities great enough to induce downward density driven flow caused by gravitational effects. Variation of the concentration of salts associated with either the oxidant or externally added salts affects the density, which affects the vertical interval of soil contacted by the injected liquids.

Controlling the density of the injected liquids enables a controlled and deliberate treatment of contaminated intervals in the subsurface.

The injection flow rate is another parameter which can be controlled to deliver treatment chemicals, e.g., oxidant, activator, and surfactant, to where chemicals of concern (COCs) reside.

For example, if dense non-aqueous phase liquids (DNAPLs) are to be targeted, the density of the injected liquids can be selected to be from about as great to greater than the density of water. For example, the density of the injected liquids can be selected to be in the range of from about 1.0 gram/cm$^3$ to about 1.5 gram/cm$^3$.

For example, shallow contamination near the water table can be effectively targeted by using persulfate concentrations in the, say, 10 g/L (grams per liter) to 15 g/L range and moderately high injection flowrates, e.g., up to 30 gpm (gallons per minute) per injection location, dependent on the geometry of the injection trench or wells. For intermediate depth locations, persulfate concentrations up to, say, 25 g/L can be used with, e.g., up to 20 gpm per injection, dependent on the geometry of the injection trench or wells. For deeper DNAPL contamination, persulfate concentrations up to 100 g/L can be used dependent on the nature of the DNAPL distributions and concentrations. Injection flowrates for deep DNAPL applications can be up to, say, 20 gpm per well, if injected above the lower permeability layers and up to, say, 10 gpm per well, if injected in the lower permeability unit. Unlike permanganate, persulfate forms no significant solid phase precipitates.

In an embodiment of S-ISCO remediation, a formulation can be introduced into the subsurface above the water table, that is, into the unsaturated or vadose zone. The introduced composition can include cosolvent, surfactant, or a cosolvent/surfactant mixture, can include an oxidant, and can optionally further include an activator. The density of the introduced composition can be adjusted to be less than that of water. Introducing such a composition into the subsurface above the water table can be used to control the volatilization of volatile inorganic and/or organic chemicals from the saturated zone into the unsaturated zone in order to prevent or minimize the risk of exposure of people to vapors of these volatile inorganic and/or organic chemicals.

Composition of Injected Materials: Surfactants, Cosolvents

Surfactant or surfactant-cosolvent mixtures to solubilize NAPL components and desorb contaminants of concern (COCs) from site soils or from NAPL in water mixtures can be screened for use in a combined surfactant-oxidant treatment. For example, blends of biodegradable *citrus*-based solvents (for example, d-limonene) and degradable surfactants derived from natural oils and products can be used.

For example, a composition of surfactant and cosolvent can include at least one *citrus* terpene and at least one surfactant. A *citrus* terpene may be, for example, CAS No. 94266-47-4, *citrus* peels extract (*citrus* spp.), *citrus* extract, Curacao peel extract (*Citrus aurantium* L.), EINECS No. 304-454-3, FEMA No. 2318, or FEMA No. 2344. A surfactant may be a nonionic surfactant. For example, a surfactant may be an ethoxylated castor oil, an ethoxylated coconut fatty acid, or an amidified, ethoxylated coconut fatty acid. An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE (20) castor oil; POE (20) castor oil (ether, ester); POE (3) castor oil, POE (40) castor oil, POE (50) castor oil, POE (60) castor oil, or polyoxyethylene (20) castor oil (ether, ester). An ethoxylated coconut fatty acid can include, for example, CAS No. 39287-84-8, CAS No. 61791-29-5, CAS No. 68921-12-O, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate. An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

Examples of cosolvents which preferentially partition into the NAPL phase include higher molecular weight miscible alcohols such as isopropyl and tert-butyl alcohol. Alcohols with a limited aqueous solubility such as butanol, pentanol, hexanol, and heptanol can be blended with the water miscible alcohols to improve the overall phase behavior. Given a sufficiently high initial cosolvent concentration in the aqueous phase (the flooding fluid), large amounts of cosolvent partition into the NAPL. As a result of this partitioning, the NAPL phase expands, and formerly discontinuous NAPL ganglia can become continuous, and hence mobile. This expanding NAPL phase behavior, along with large interfacial tension reductions, allows the NAPL phase to concentrate at the leading edge of the cosolvent slug, thereby increasing the mobility of the NAPL. Under certain conditions, a highly efficient piston-like displacement of the NAPL is possible. Because the cosolvent also has the effect of increasing the NAPL solubility in the aqueous phase, small fractions of the NAPL which are not mobilized by the above mechanism are dissolved by the cosolvent slug.

Activation of Oxidant

An activator can be, for example, a chemical molecule or compound, or another external agent or condition, such as heat, temperature, or pH, that increases the rate of or hastens a chemical reaction. The activator may or may not be transformed during the chemical reaction that it hastens. Examples of activators which are chemical compounds include a metal, a transition metal, a chelated metal, a complexed metal, a metallorganic complex, and hydrogen peroxide. Examples of activators which are other external agents or conditions include heat, temperature, and high pH. Preferred activators include Fe(II), Fe(III), Fe(II)-EDTA, Fe(III)-EDTA, Fe(II)-EDDS, Fe(III)-EDDS, Fe(II)-citric acid, Fe(III)-citric acid, hydrogen peroxide, high pH, and heat.

Non-thermal ISCO using persulfate requires activation by ferrous ions, Hoag, G. et al. (2000) (ref. 12) but preferentially chelated metals Brown, R. et al. (2002), Hoag, G. and Mao, F. (2004), Liang, C. et al. (2004) (ref. 13). Chelated iron has been demonstrated to prolong the activation of persulfate enabling activation to take place at substantial distances from injection wells.

Several practical sources of Fe(II) or Fe(III) can be considered for activation of persulfate. Iron present in the soil minerals that can be leached by injection of a free-chelate (a chelate not complexed with iron, but usually $Na^+$ and $H^+$) can be a source. Injection of soluble iron as part of a chelate complex, such as Fe(II)-EDTA, Fe(II)-NTA or Fe(II)-Citric Acid (other Fe-chelates are available) can be a source. Indigenous dissolved iron resulting from reducing conditions present in the subsurface (common at many MGP sites) can be a source. For the Pilot Test, discussed as an example below, Fe(II)-EDTA was used.

An example of an oxidant is persulfate, e.g., sodium persulfate, of an activator is Fe(II)-EDTA, of a surfactant is Alfoterra 53, and of a cosolvent-surfactant mixture is a mixture of d-limonene and biodegradable surfactants, for example, *Citrus* Burst 3. *Citrus* Burst 3 includes a surfactant blend of ethoxylated monoethanolamides of fatty acids of coconut oil and polyoxyethylene castor oil and d-limonene.

An embodiment of the invention is the simultaneous or sequential use of the oxidant persulfate, and an activator to raise the pH of the groundwater to above 10.5 by the addition of CaO, $Ca(OH)_2$, NaOH, or KOH, an example of a cosolvent-surfactant is *Citrus* Burst 3.

Testing for Remediation Configuration Development

Several surfactants, cosolvents, or surfactant-cosolvent mixtures for dissolution and/or desorption of a given NAPL or sorbed organic chemical (or mixture of chemicals) can be screened to develop a customized and optimal surfactant, cosolvent, or surfactant-cosolvent mixture to dissolve either some or all of the NAPLs or sorbed chemicals. In order to dissolve some or all of the NAPLs or sorbed chemicals, a surfactant or mixture of surfactants alone, a cosolvent or mixture of cosolvents alone, or a mixture of surfactants and cosolvents can be used. For example, certain volatile constituents in the NAPLs may pose a health or ecological risk at a particular site, that is, be contaminants of concern (COCs), but the NAPLs may contain many other compounds that do not result in risks. This invention presents methods to screen different types of surfactants, cosolvents, and cosolvent-surfactant mixtures to obtain an optimal dissolution or desorption of the contaminants of concern, resulting in the oxidation predominantly only of those compounds that need to be treated to reduce risk or reach remediation goals for a given site.

The surfactants and/or cosolvents can be chosen to selectively solubilize contaminants, for example, certain NAPLs, that pose a risk to public health and/or the environment, without solubilizing other compounds. Similarly, by choosing an oxidant that is capable of only oxidizing certain classes of compounds, one can select an oxidant that only treats selected solubilized target compounds. For example, persulfate that is not activated effectively treats volatile organic compounds (VOCs) but does not effectively treat other compounds such as certain hydrocarbons including some PAHs. Additionally, permanganate can effectively treat chloroethene compounds, but does not effectively treat certain chloroethane compounds. The method of screening surfactants and cosolvents to determine which compounds in the NAPL, solid, or sorbed phases can be dissolved or emulsified in an oil in water emulsion or soluble micelle, then selecting an oxidant that is also selective in terms of what compounds are treated creates a system not previously discovered that is a powerful tool to cost-effectively treat sites, where simple injection of a surfactant or surfactant-cosolvent mixture alone or oxidant alone would be slower, ineffective or not cost-effective. Thus, the new approach presented in this application enables more efficient, effective, and optimal treatment of contaminated soils, for example, soils contaminated with NAPLs and/or other organic chemicals, for example, benzene, toluene, ethyl benzene, xylene, and polyaromatic hydrocarbons.

The oxidant and surfactant or surfactant-cosolvent mixture can be selected so that the oxidant does not substantially react with the surfactant or cosolvent. Alternatively, the oxidant and surfactant or surfactant-cosolvent mixture can be selected so that the surfactant can function to solubilize contaminant, for example, NAPL, even if the oxidant reacts with the surfactant or cosolvent. Alternatively, the oxidant and surfactant or surfactant-cosolvent mixture can be selected so that the oxidant reacts with the surfactant so as to promote the destruction of contaminant, for example, NAPL. For example, the oxidant may react with the surfactant to alter the chemistry of the surfactant, so that the altered surfactant selectively solubilizes certain contaminants. For example, an oxidant can be chosen that controls the interfacial tension of the resultant soil NAPL/water interface and promotes selective solubilization of surface contaminants.

Field applications of S-ISCO technologies at sites with organic contaminants in either or both of the LNAPL and DNAPL phases or with sorbed phases are dependent on several factors for successful achievement of removal of the NAPL or sorbed phases with this new method and process. These factors can include the following:

1) Effective delivery of injected oxidants, activating solutions, and surfactants or surfactant-cosolvent mixture into the subsurface.
2) Travel of oxidant, activator, and surfactant solutions to the desired treatment interval in the soil.
3) Selection of surfactants or cosolvent-surfactant mixtures and oxidants to ensure coelution of the surfactants or cosolvent-surfactant mixtures and oxidants enabling travel of the injected species to the desired treatment interval in the soil.
4) Desorption and apparent solubilization of residual NAPL phases into the aqueous phase for destruction by the oxidant and radical species.
5) Reactions of oxidant and radical species with target mobilized contaminants of concern (COCs).
6) Production of by-products from oxidation and any other injected solutions, including organic or metal species that are below concentrations of regulatory thresholds.
7) Oxidation or natural or enhanced biodegradation of the surfactant or surfactant-cosolvent mixture.
8) Adequate monitoring of COCs, injected oxidant and activator solutions, essential geochemical parameters and any other environmental media potentially affected by the treatment.

The method of using this new S-ISCO technology may involve separate screening and testing of the surfactant and cosolvents, separate testing of optimal oxidant (to meet site needs) and then testing the technologies together. This work can be done in the laboratory environment or in a combination of the laboratory environment and during field testing. This method can involve following steps.

Collection of site soils and groundwater representative of the highly contaminated soils targeted for S-ISCO treatment. In some cases it may be desirable to add NAPL from the site to the test soils. (One objective of this step is to provide information concerning potential remedies for a range of soil contaminant conditions, including conditions approaching the most contaminated on the site.)

Aqueous phase screening can be used for the selection of appropriate oxidants with and without activators or cosolvents for the destruction of selected COCs in collected groundwater from the site.

A catalyst is a substance that increases or hastens the rate of a chemical reaction, but which is not physically or chemically changed during the reaction. For example, a preferred oxidant to use is persulfate, e.g., sodium persulfate. Attributed to its relatively high stability under normal subsurface conditions, persulfate more effectively travels through the subsurface into the target contaminant zone, in comparison to hydrogen peroxide associated with Fenton's or Modified Fenton's Chemistry. Other oxidants include ozone and permanganate, percarbonates, hydrogen peroxide, and various hydrogen peroxide or Fenton's Reagent mixtures. A control system should be run to compare the treatment conditions to those with no treatment. Additionally, tests of the stability of the surfactant or surfactant-cosolvent mixture can be necessary to ensure that the oxidant does not immediately, or too quickly, oxidize the surfactant or cosolvent-surfactant mixture rendering it useless for subsequent dissolution.

Soil slurry tests can be run on selected combinations of surfactant or surfactant-cosolvent mixtures to determine the solubilization of specific COCs relative to site cleanup criteria. Additionally, soil slurry tests can be run to screen and determine optimal dosing of chemical oxidants for both dosing requirements and COCs treated. The technology of combining enhanced solubilization by surfactants or surfactant-cosolvent mixtures with chemical oxidation is a more aggressive approach to desorb residual tars, oils, and other NAPLs from the soils and simultaneously oxidize the desorbed COCs with the chosen chemical oxidant. A soil slurry control system can be run to compare the treatment conditions with no treatment.

Soil column tests can be run to closely simulate treatment performance and COC destruction using soil cores obtained from the most highly contaminated soils associated with the proposed surface enhanced in situ chemical oxidation (S-ISCO™) treatment areas of a site. Results from soil column tests can be used to identify the treatment conditions and concentrations of chemicals to be evaluated. The soil column tests can consist of using one oxidant alone or a mixture of oxidants simultaneously with a surfactant or a mixture of surfactants or a cosolvent-surfactant mixture; various configurations or concentrations of oxidants or mixtures of oxidants used alone or simultaneously with a surfactant or a cosolvent-surfactant mixture can be selected for study based on soil slurry tests. Different activation methods can additionally be tested using soil column testing. By monitoring surfactant concentrations and/or interfacial tension in the effluent of the soil columns, the reactivity of the surfactant and cosolvents with the oxidants can be determined to determine compatibility of oxidants with surfactants and cosolvents. Monitoring of COC concentrations in the effluent of the column can also determine the ability of the oxidant to destroy the cosolvent-surfactant or surfactant micelles or emulsions and react with the COCs.

Data analysis of processes monitored, as described above, enables design criteria for the development of pilot- and full-scale implementation of the S-ISCO technology to be implemented in the field. Design parameters include moles of oxidant used in the tests per mole of COCs destroyed, moles of oxidant used per mass of soil treated, moles of surfactant utilized per mole of COC solubilized, moles of surfactant or of cosolvent-surfactant mixture destroyed per unit contact time in the batch or column test, rates of COC destruction, rates of oxidant utilization, and loading rates of chemicals.

Methods for Determining Contaminant Remediation Protocols

A method for determining a contaminant remediation protocol, for example, of a protocol for remediating soil in a subsurface contaminated with NAPL or other organic chemicals, can include the following steps. Site soil samples can be collected under zero headspace conditions (e.g., if volatile chemicals are present); for example, samples representative of the most highly contaminated soils can be collected. The samples can be homogenized for further analysis. A target contaminant or target contaminants in the soil can be identified. The demand of a sample of oxidant per unit soil mass can be determined; for example, the demand of a soil sample for a persulfate oxidant, such as sodium persulfate, can be determined. An oxidant is, for example, a chemical or agent that removes electrons from a compound or element, increases the valence state of an element, or takes away hydrogen by the addition of oxygen. A suitable oxidant and/or a suitable mixture of an oxidant and an activator for oxidizing the target contaminant can be selected. Suitable surfactants, mixtures of surfactants, and/or mixtures of surfactants, cosolvents, and/or solvents capable of solubilizing and/or desorbing the target contaminant or contaminants can be identified; for example, suitable biodegradable surfactants can be tested. Suitable solvents capable of solubilizing and/or desorbing the target contaminant or contaminants can be identified; for example, suitable biodegradable solvents such as d-limonene can be tested. Various concentrations of cosolvent-surfactant mixtures or surfactants alone can be added to water or groundwater from a site along with controlled quantities of NAPLs. Relationships of the extent of dissolution of the NAPL compounds with the varying concentrations of the cosolvent-surfactant mixtures or surfactants can be established by measuring the concentrations of the NAPL compounds that enter the aqueous phase. Relationships between the interfacial tension and solubilized NAPL compounds and their molecular properties, such as the octanol-water partition coefficient ($K_{ow}$) can also be established that enable optimal design of the dissolution portion of the S-ISCO process. Various concentrations of cosolvent-surfactant mixtures or surfactants alone can be added to water or groundwater from a site along with controlled quantities of contaminated soils from the site. Relationships of the extent of solubilization of the sorbed COC compounds with the varying concentrations of the cosolvent-surfactant mixtures or surfactants can be established by measuring the concentrations of the sorbed COCs that enter the aqueous phase. Relationships between the interfacial tension and desorbed and solubilized compounds and their molecular properties, such as the octanol water partition coefficient ($K_{ow}$), can also be established that enable optimal design of the dissolution portion of the S-ISCO process. The simultaneous use of oxidants and surfactants or cosolvent-surfactant mixtures in decontaminating soil can be tested. For example, the effect of the oxidant on the solubilization characteristics of the surfactant can be evaluated, to ensure that the oxidant and surfactant can function together to solubilize and oxidize the contaminant. The quantity of surfactant for injection into the subsurface can be chosen to form a Winsor I system or a microemulsion.

For example, the type and quantity of surfactants and optionally of cosolvent required to solubilize the target contaminant can be determined in a batch experiment.

It can be important that the oxidant not react with the surfactant so fast that the surfactant is consumed before the surfactant can solubilize the contaminant. On the other hand, the surfactant should not reside in the subsurface indefinitely, to avoid being a contaminant itself. This degradation can be caused by living organisms, such as bacterial, through a biodegradation process. On the other hand, the surfactant can be selected to slowly react with the oxidant, so that the oxidant survives sufficiently long to solubilize the contaminant for the purpose of enhancing its oxidation, but once the contaminant has been oxidized, the surfactant itself is oxidized by the remaining oxidant.

At the oxidation zone, it may be acceptable for the oxidant to rapidly degrade the surfactant. If the surfactant is degraded, oxidation of the contaminant may be slowed, because only a small amount of contaminant is in the aqueous phase. However, at the same time, the contaminant may be effectively immobilized. This immobilization can prevent the contaminant from passing through the oxidation zone. Thus, even if the oxidant rapidly degrades the surfactant, the objective of preventing the contaminant from spreading beyond the oxidation zone may still be achieved.

Experimentation on the effects of various oxidants, combinations of oxidants, and activators on the stability and activity of cosolvent-surfactant mixtures and surfactants can be readily conducted to provide information to optimize S-ISCO treatment conditions. Testing of the sorption or reaction of the surfactant or surfactant-cosolvent mixture can be conducted to determine the transport and fate properties of the surfactant or surfactant-cosolvent mixture in soils, rock and groundwater. Testing is conducted in batch aqueous or soil slurry tests in which individual cosolvent-surfactant mixtures or surfactants at specified initial concentrations are mixed together with individual oxidants or mixtures of oxidants and activators. The duration of the tests is a minimum of 10 days and as long as 120 days, dependent on the stability of the oxidant-surfactant system needed for a particular application.

Selection of Surfactant System

Development of a surfactant system for use in S-ISCO remediation can include preparing a series of surfactants or surfactant-cosolvent mixtures. One characteristic of a surfactant-cosolvent mixture is the ratio of the number of ethylene oxide groups to propylene oxide groups (EO/PO ratio) in the backbones of the constituent molecules. The surfactant-cosolvent mixtures in the series can have a range of EO/PO ratios. The EO/PO ratio of a mixture can be determined from knowledge of the EO/PO ratios of the constituent molecules and the molar fraction of each type of constituent molecule in the mixture. The hydrophobicity of the surfactant-cosolvent mixture can be tailored by adjusting the EO/PO ratio through varying the types of surfactant and cosolvent molecules in the mixture, or by varying the concentrations of the types of surfactant and cosolvent molecules in the mixture.

The hydrophilic-lipophilic balance (HLB) is a characteristic of a surfactant. An HLB of less than 10 indicates a surfactant in which the oleophilic (hydrophobic) property is stronger than the hydrophilic property of the surfactant. An HLB of greater than 10 indicates a surfactant in which the hydrophilic property is stronger than the oleophilic (hydrophobic) property of the surfactant.

A characteristic of organic chemicals is a characteristic known as the octanol-water partition coefficient ($K_{ow}$). The $K_{ow}$ can be determined, for example, in a batch test in which the concentrations of an organic molecular species (such as COCs) in the octanol phase and the concentration of the molecular species in the water phase are measured. The partitioning of the organic species between the octanol and water phases is a property of organic chemicals reported in the literature from both experimental measurements and theoretical approximations. Relationships between the octanol-water partition coefficients of particular COCs and their solubilization in cosolvent-surfactant or surfactant systems is important in the evaluation and optimal design of the S-ISCO process.

The surfactant mixtures in the series can have various HLB value distributions. For example, a surfactant mixture can have a narrow HLB value distribution and can have a either high average HLB values, for example 12 to 15, or low average HLB values 10 to 12. Alternatively, a surfactant-cosolvent mixture can have a broad HLB value distribution with HLB values variable depending on the particular NAPL or sorbed chemical species requiring treatment.

The surfactant mixtures in the series can have various molecular weight distributions. For example, a surfactant mixture can have a narrow molecular weight distribution and can have a low or a high average molecular weight. Alternatively, a surfactant-cosolvent mixture can have a broad molecular weight distribution.

A study included preparation of a series of surfactant-cosolvent mixtures in which the EO/PO ratio and average molecular weight were varied for different COCs (Diallo et al. (1994)). Batch testing was performed on the ability of a surfactant-cosolvent mixture to solubilize a hydrocarbon, e.g., a contaminant targeted for remediation. It was observed that as the HLB of the surfactant increased that the solubilization of COC increased through a maximum, then decreased as the HLB further increased.

Thus for a given molecular contaminant species there is an optimal value of HLB for the surfactant to solubilize it. For a distribution of contaminant molecules there is an optimal distribution of HLB values. Thus, an aspect of the method presented here is determining an optimal surfactant or cosolvent-surfactant mixture, based on the HLB for which solubilization is maximized for subsequent or simultaneous oxidation of the solubilized species. An advantage of this approach is that, should circumstances require, e.g., a change in government regulations or cost of a particular surfactant, a different surfactant having a similar HLB can be substituted for a surfactant in a treatment composition.

The ability to tailor the EO/PO ratio and the molecular weight distribution of molecules in the surfactant-cosolvent mixture and thereby adjust the HLB of the surfactant allows the surfactant-cosolvent mixture to be optimized for a targeted contaminant and for sequential or simultaneous oxidation.

The transport properties of the surfactant or surfactant-cosolvent mixture in the soil of the site to be remediated can also be tested, for example, in soil-column tests. Characteristics of the soil, for example, surface chemistry, clay mineralogy, and/or pH may affect the transport properties of the surfactant or surfactant-cosolvent mixture through the soil. The results of testing of transport properties, or observations of transport properties in the field of the surfactant or surfactant-cosolvent mixture may indicate further tailoring of the hydrophilic characteristics of the surfactant. It may be indicated to trade-off some of the desired solubilization characteristics for required transport characteristics in developing a surfactant or surfactant-cosolvent mixture that is optimal for the site to be remediated.

Testing of Compositions for Injection

Testing of oxidants, surfactants, activators, cosolvents and/or solvents can be conducted with the contaminant in the non-aqueous phase and/or sorbed phase in aqueous solution, or with the contaminant in a soil slurry or soil column. A soil slurry or soil column can use a standard soil or actual soil from a contaminated site. An actual soil can be homogenized for use in a soil slurry or soil column. Alternatively, an intact soil core obtained from a contaminated site can be used in closely simulating the effect of introduction of oxidant, surfactant, and/or solvent for treatment.

Testing of oxidants, surfactants, activators, cosolvents, and/or solvents can be conducted with the contaminant in a batch experiment, with or without soil.

The range of quantity of surfactant that can form a Winsor Type I, II, or III system or a microemulsion in the subsurface can be identified.

Various techniques can be used in conjunction with surfactant enhanced in situ chemical oxidation (S-ISCO) treatment, for example, use of macro-molecules or cyclodextrins, steam injection, sparging, venting, and in-well aeration.

An aspect of the control that can be achieved by use of an embodiment of the invention for site remediation is direction of antioxidant to a target region of contaminant. The density of the injected solution can be modified, so that the oxidant reaches and remains at the level in the subsurface of the target region of contaminant. Additional factors such as subsurface porosity and groundwater flow can be considered to locate wells for injecting solution containing oxidant, so that oxidant flows to the target region of contaminant.

In an embodiment, the consumption of oxidant can be further controlled by including an antioxidant in the injected solution. For example, an antioxidant can be used to delay the reaction of an oxidant. Such control may prove important when, for example, the injected oxidant must flow through a region of organic matter which is not a contaminant and with which the oxidant should not react. Avoiding oxidizing this non-contaminant organic matter may be important to maximize the efficiency of use of the oxidant to eliminate the contaminant. That is, if the oxidant does not react with non-contaminant organic matter, then more oxidant remains for reaction with the contaminant. Furthermore, avoiding oxidizing non-contaminant organic matter may be important in its own right. For example, topsoil or compost may be desirable organic matter in or on soil that should be retained. The antioxidants used may be natural compounds or derivatives of natural compounds. By using such natural antioxidants, their isomers, and/or their derivatives, the impact on the environment by introduction of antioxidant chemicals is expected to be minimized. For example, natural processes in the environment may degrade and eliminate natural antioxidants, so that they do not then burden the environment. The use of natural antioxidants is consistent with the approach of using biodegradable surfactants, cosolvents, and solvents. An example of a natural antioxidant is a flavonoid. Examples of flavonoids are quercetin, glabridin, red clover, Isoflavin Beta (a mixture of isoflavones available from Campinas of Sao Paulo, Brazil). Other examples of natural antioxidants that can be used as antioxidants in the present method of soil remediation include beta carotene, ascorbic acid (vitamin C), and tocopherol (vitamin E) and their isomers and derivatives. Non-naturally occurring antioxidants, such as beta hydroxy toluene (BHT) and beta hydroxy anisole (BHA) can also be used as antioxidants in the present method of soil remediation.

Citrus Burst 1, Citrus Burst 2, Citrus Burst 3, and E-Z Mulse are manufactured by Florida Chemical.

Example 1: Remediation of Manufactured Gas Plant (MGP) DNAPLS

In an embodiment, surfactants or cosolvent-surfactant mixtures are simultaneously or sequentially used with activated persulfate (e.g., activated with Fe(II)-EDTA) for the treatment of former manufactured gas plant (MGP) sites. In an embodiment, site-specific use can be made of surfactants or cosolvent-surfactant mixtures for selective dissolution or desorption of NAPL constituents exceeding site cleanup criteria with simultaneous oxidation by a chemical oxidant that has capabilities to oxidize the compounds, so that site cleanup criteria are achieved. In an embodiment, site-specific use can be made of surfactants or cosolvent-surfactant mixtures for selective mobilization of NAPL constituents using a Winsor Type II or III system with simultaneous or sequential oxidation by a chemical oxidant that has capabilities to oxidize the compounds, so that site cleanup criteria are achieved.

To test the remediation capability of methods of the present invention, a former Manufactured Gas Plant (MGP) site DNAPL was obtained from a site to conduct dissolution experiments with Citrus Burst-3. An aliquot of the DNAPL was mixed with a suitable quantity of water to determine the equilibrium solubility of the individual compounds in the presence of the MGP DNAPL. Experimental conditions for these dissolution tests are reported in Table 1.

TABLE 1

Experimental Conditions for MGP DNAPL Dissolution Experiments

| Exp. No. | Water g Total | DNAPL g | Citrus Burst-3 g | Citrus Burst-3 g/L | $DNAPL_{max}$ g/L | NaCl g | NaCl g/L |
|---|---|---|---|---|---|---|---|
| 1 | 60 | 2 | 0.05 | 0.8 | 33.3 | 3 | 50 |
| 2 | 60 | 2 | 0.1 | 1.7 | 33.3 | 3 | 50 |
| 3 | 60 | 2 | 0.25 | 4.2 | 33.3 | 3 | 50 |
| 4 | 60 | 2 | 0.5 | 8.3 | 33.3 | 3 | 50 |
| 5 | 60 | 2 | 1 | 16.7 | 33.3 | 3 | 50 |
| 6 | 60 | 2 | 2.5 | 41.7 | 33.3 | 3 | 50 |
| 7 | 60 | 2 | 5 | 83.3 | 33.3 | 3 | 50 |
| 8 | 60 | 2 | 0 | 0.0 | 33.3 | 3 | 50 |
| 9 | 60 | 2 | 0 | 0.0 | 33.3 | 3 | 50 |

The data collected following the conditions presented in Table 1 were obtained at 25° C. with 60 rpm shaker table mixing for 48 hours. After the shaker was shut off, the samples sat quietly for 5 minutes before the supernatant was analyzed. $DNAPL_{max}$ represents the maximum concentration of DNAPL that may dissolve, given the mass of DNAPL and the volume of water.

The observed solubilities of the MGP DNAPL compounds in the aqueous phase are quite low and will be the basis to compare enhanced dissolution using Citrus Burst-3. After 48 hours of slowly mixing the DNAPL and water mixtures (with and without Citrus Burst-3), the samples were allowed to sit for 5 minutes and then samples of the solubilized fraction of the mixture were collected and analyzed for VOCs and SVOCs using USEPA Methods 8260 and 8270, respectively. Samples from experiment number 1, 3, 5, 7 and 8 (control) were analyzed. Additionally, measurements of interfacial tension (IFT) were conducted on the samples after the 48 hour period.

Figure 2:
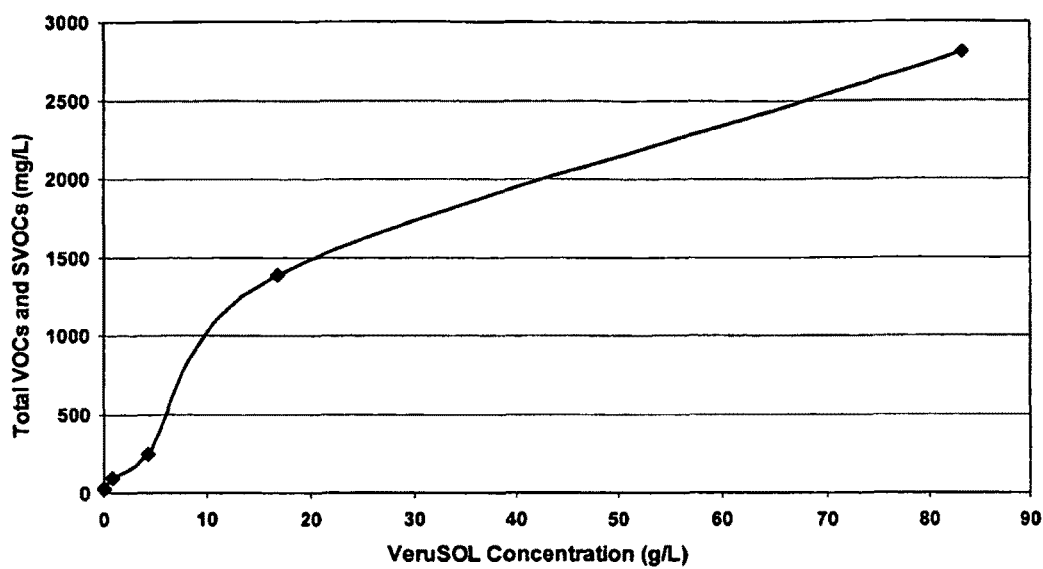
FIG. 2 is a graph depicting the concentration of dissolved VOCs and SVOCs together as a function of VeruSOL™ (*Citrus* Burst 3) concentration. The relationship between the dose of VeruSOL™ and solubilized Total VOCs and SVOCs from an MGP DNAPL is shown in FIG. 2. This relationship indicates that as the concentration of VeruSOL™ is increased the total VOC and SVOCs concentration dissolved and emulsified as a result of the VeruSOL™ increases as well.
Figure 3:
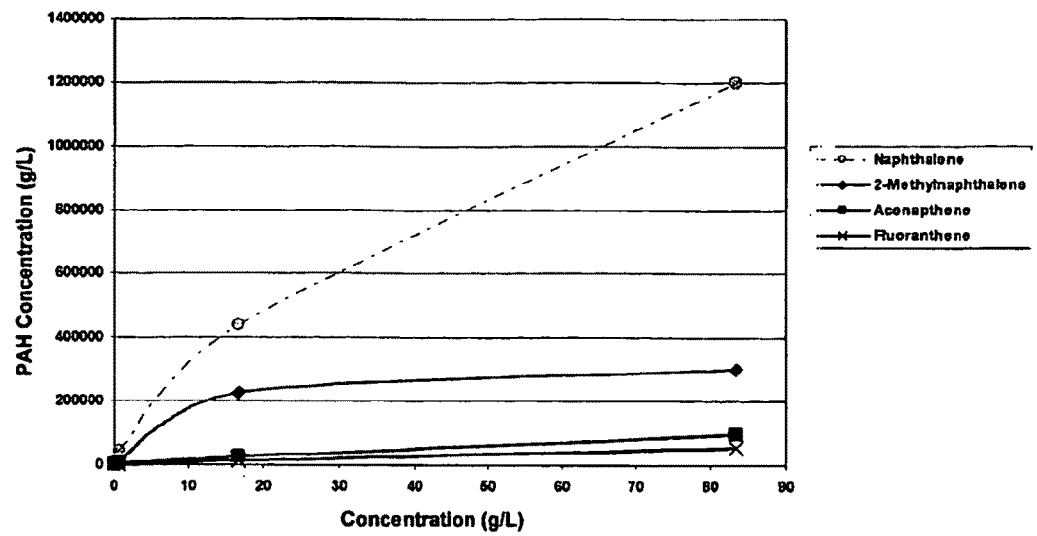
FIG. 3 is a graph depicting the solubility of selected PAH compounds as a function of *Citrus* Burst 3 concentration. As the concentration of VeruSOL™ is increased, similarly, the concentrations of naphthalene, 2-methylnaphthalene, acenapthene, and fluoranthene increases as well. Naphthalene concentrations increase the most; the naphthalene makes up approximately 40 percent of the MGP DNAPL.
Figure 4:
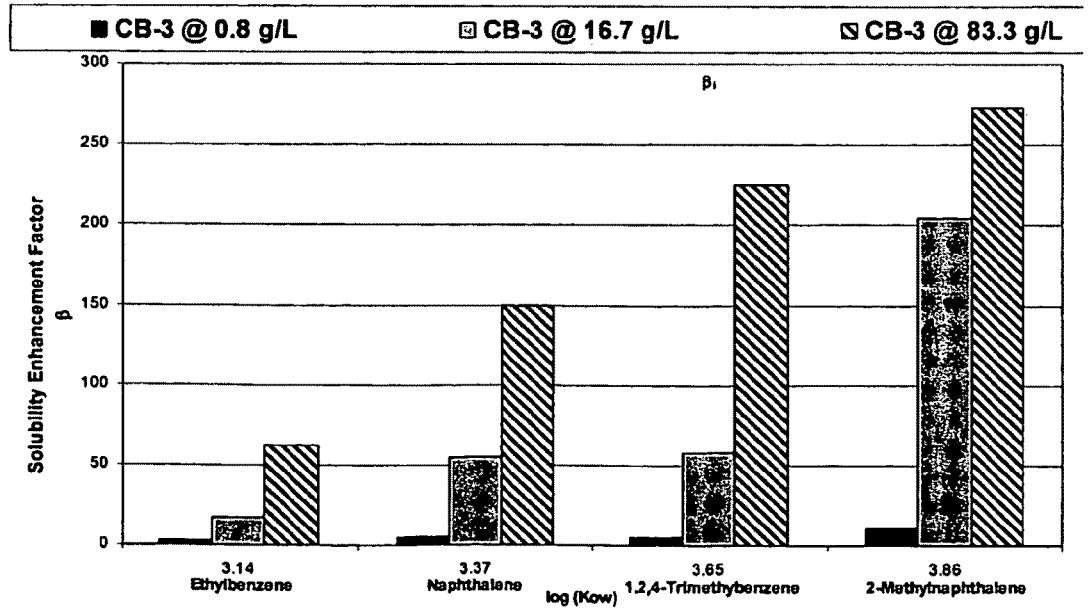
FIG. 4 is a bar graph depicting solubility enhancement factors for several different molecules having different octanol-water partition coefficients at three different concentrations of *Citrus* Burst 3.

The ability of increasing concentrations of Citrus-Burst-3 to dissolve the MGP DNAPL is evident in FIG. 2 for Total VOCs and SVOCs and in FIG. 3 for selected individual Polycyclic Aromatic Hydrocarbon (PAH) compounds. Once the concentrations of the VOCs and SVOCs compounds in the solubilized phase were measured, the solubility enhancement factors, $\beta$, were calculated for selected MGP compounds at each Citrus Burst concentration. $\beta$ is the ratio of the concentration in mg/L of the individual VOC compound dissolved with the CB-3 divided by the solubility of the same individual VOC or SVOC compound dissolved in the presence of the MGP DNAPL without the cosolvent surfactant. The results of this test are found in FIG. 4 and the Table 2, below.

TABLE 2

| COC | log Kow | Solubility Enhancement Factor | | |
|---|---|---|---|---|
| | | 0.8 g/L CB-3 | 16.7 g/L CB-3 | 83.3 g/L CB-3 |
| Ethylbenzene | 3.1 | 2.1 | 16.9 | 62.3 |
| Naphthalene | 3.4 | 5.0 | 55.0 | 150.0 |
| 1,2,4-Trimethybenzene | 3.7 | 4.9 | 58.3 | 225.0 |
| 2-Methylnaphthalene | 3.9 | 10.9 | 204.5 | 272.7 |

Figure 5:
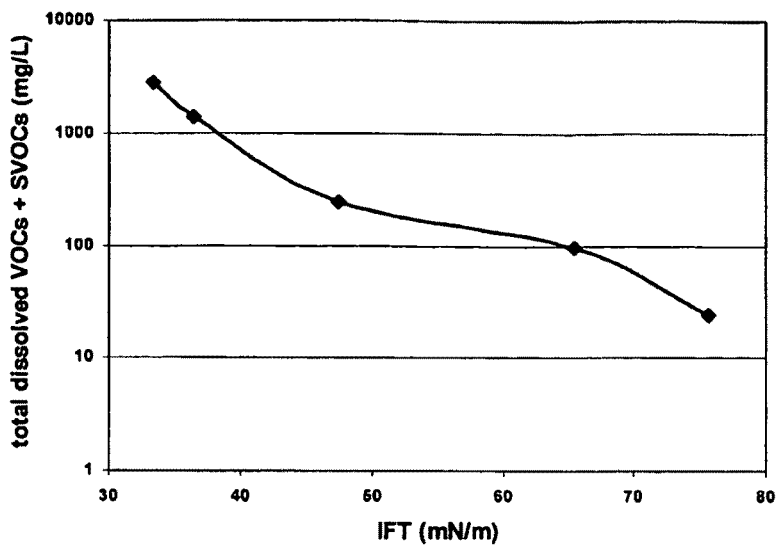
FIG. 5 is a semilog plot depicting the total concentration of dissolved VOCs and SVOCs as a function of interfacial surface tension.

The β values varied from a low of 2.1 for ethylbenzene at a *Citrus* Burst concentration of 0.8 g/L, to a high of 272.7 for 2-methyl naphthalene at a *Citrus* Burst concentration of 83.3 g/L. A log-normal plot of the total VOCs dissolved using various doses of *Citrus*-Burst 3 versus the interfacial tension measurement (IFT) taken in each vial after 48 hours of contact can be found in FIG. 5. For example, it can be readily observed from FIG. 4 that IFT measurements can be used to easily determine the solubility potential of the cosolvent-surfactant mixture with MGP DNAPLs. The highly linear log-normal relationship of the logarithm of the octanol water partition coefficient ($\log(K_{ow})$) and the solubility enhancement factor, β, for each of the tested *Citrus* Burst-3 concentrations allows prediction of the solubility behavior of many organic compounds using the relationship. These types of experiments and relationships can be used to screen and determine optimal types and concentrations of surfactants and cosolvent-surfactant mixtures that can be used to optimize dissolution of MGP DNAPL organic compounds useful in the S-ISCO process.

Example 2: Remediation of Chlorinated Solvent

An embodiment of the invention is the simultaneous or sequential use of cosolvent-surfactant mixtures, for example, *Citrus* Burst 3 with activated persulfate (activated at a high pH with NaOH) for the treatment of sites contaminated with chlorinated solvents and other chlorinated or halogenated compounds.

In order to test the treatment of chlorinated compounds, a chlorinated solvent DNAPL was obtained from a site consisting of chlorinated solvents and chlorinated semi-volatile compounds. Composition of the chlorinated solvent DNAPL is presented based on determinations using USEPA Methods 8260 and 8270. An aliquot of the DNAPL was mixed with a suitable quantity of deionized water to determine the equilibrium solubility of the individual compounds in the presence of the DNAPL. Experimental conditions for these dissolution tests are reported in Table 3.

TABLE 3

Experimental Conditions for Chlorinated DNAPL Dissolution Experiments

| Exp. No. | Water g Total | DNAPL g | Citrus Burst-3 g | Citrus Burst-3 g/L | $DNAPL_{max}$ g/L | NaCl g | NaCl g/L |
|---|---|---|---|---|---|---|---|
| 1 | 60 | 2 | 0.05 | 0.8 | 33.3 | 3 | 50 |
| 2 | 60 | 2 | 0.1 | 1.7 | 33.3 | 3 | 50 |
| 3 | 60 | 2 | 0.25 | 4.2 | 33.3 | 3 | 50 |
| 4 | 60 | 2 | 0.5 | 8.3 | 33.3 | 3 | 50 |
| 5 | 60 | 2 | 1 | 16.7 | 33.3 | 3 | 50 |
| 6 | 60 | 2 | 2.5 | 41.7 | 33.3 | 3 | 50 |
| 7 | 60 | 2 | 5 | 83.3 | 33.3 | 3 | 50 |
| 8 | 60 | 2 | 0 | 0.0 | 33.3 | 3 | 50 |
| 9 | 60 | 2 | 0 | 0.0 | 33.3 | 3 | 50 |

The data collected under the experimentation conditions presented in Table 3 were obtained at 25° C. with 60 rpm shaker table mixing for 48 hours. After the shaker was shut off, the samples sat quietly for 5 minutes before the supernatant was analyzed. $DNAPL_{max}$ represents the maximum concentration of DNAPL that may dissolve, given the mass of DNAPL and the volume of water.

Results of these analyses and the pure compound solubilities of the individual compounds are reported in Table 4.

TABLE 4

Chlorinated DNAPL Composition and Dissolution in Control Sample Without Cosolvent-Surfactant

| Compound | DNAPL Composition % | Observed Solubility in Control Sample (mg/L) | DNAPL Mol Fraction | Pure Compound Aqueous Solubility (mg/L) |
|---|---|---|---|---|
| Tetrachloroethene (PCE) | 67.68% | 140 | 0.194 | 800 |
| Carbon Tetrachloride (CTC) | 19.65% | 100 | 0.724 | 129 |
| Hexachlorobutadiene (HCBD) | 4.15% | NA | 0.006 | 0.005 |
| Hexachlorobenzene (HCB) | 0.93% | 1.4 | 0.024 | 3.2 |
| Hexachloroethane (HCE) | 7.42% | NA | 0.051 | 50 |
| Octachlorostyrene (OCS) | 0.16% | NA | 0.000 | insoluble |
| Octachloronaphthalene (OCN) | 0.01% | NA | 0.001 | insoluble |

Carbon tetrachloride and tetrachloroethylene comprised more than 87 percent of the DNAPL. Being a saturated compound, carbon tetrachloride is generally a pervasive and difficult to degrade compound once introduced to the subsurface. The observed solubilities of the DNAPL compounds in the aqueous phase are quite low and will be the basis to compare enhanced dissolution using *Citrus* Burst-3. After 48 hours of slowly mixing the DNAPL and water mixtures, the samples were allowed to sit for 5 minutes and then samples of the solubilized fraction of the mixture were collected and analyzed for VOCs using USEPA Method 8260. Samples from experiment number 1, 3, 5, 7, and 8 (control) were analyzed. Additionally, measurements of interfacial tension (IFT) were conducted on the samples after the 48-hour period.

Figure 6:
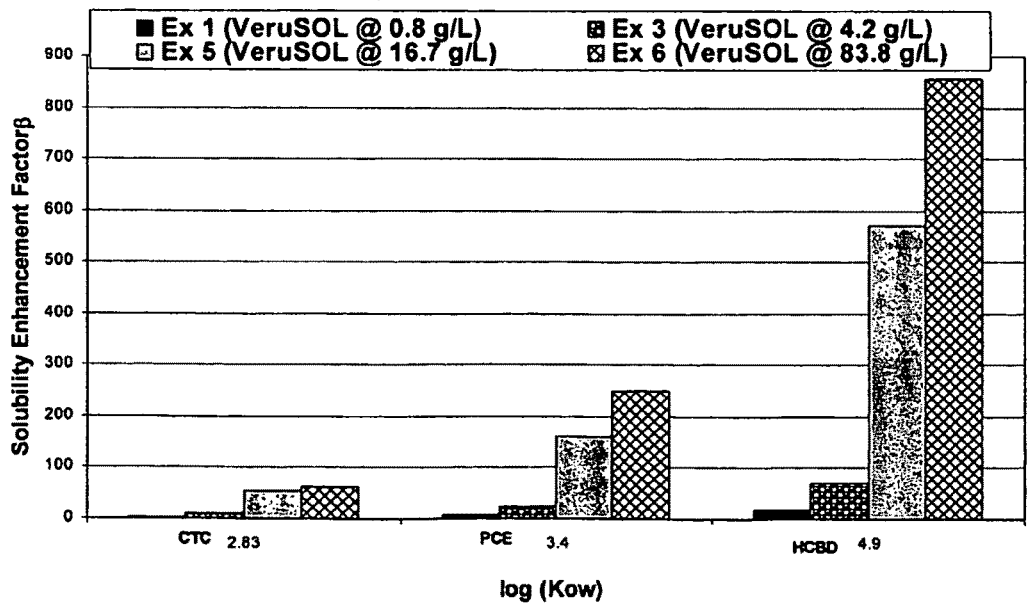
FIG. 6 is a bar graph depicting solubility enhancement factors for three different chlorinated molecules having different octanol-water partition coefficients at four different concentrations of VeruSOL™-3.

Once the concentrations of the VOC compounds in the solubilized phase were measured, the solubility enhancement factors, β, was calculated for each compound at each *Citrus* Burst concentration. β is the ratio of the concentration in mg/L of the individual VOC compound dissolved with the CB-3 divided by the solubility of the same individual VOC compound dissolved in the presence of the DNAPL without the cosolvent surfactant. The results of this test are found in FIG. 6 and is shown in Table 5, below.

TABLE 5

| VOC | log Kow | Solubility Enhancement Factor | | | |
|---|---|---|---|---|---|
| | | @0.8 g/L VeruSOL | @4.2 g/L VeruSOL | @16.7 g/L VeruSOL | @83.3 g/L VeruSOL |
| CTC | 2.83 | 2.79 | 9.29 | 54.29 | 62.86 |
| PCE | 3.40 | 7.50 | 24.00 | 160.00 | 250.00 |
| HCBD | 4.90 | 17.86 | 70.71 | 571.43 | 857.14 |

Figure 7:
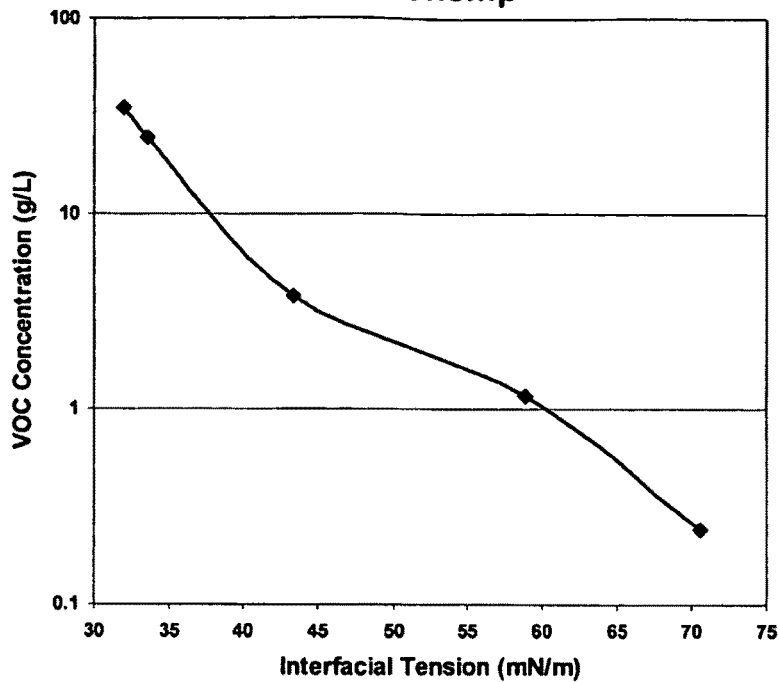
FIG. 7 is a semilog plot depicting the concentration of dissolved VOCs as a function of interfacial surface tension.

The β values varied from a low of 2.79 for carbon tetrachloride at a *Citrus* Burst concentration of 0.8 g/L, to a high of 857.14 for hexachlorobutadiene at a *Citrus* Burst concentration of 83.3 g/L. A log-normal plot of the total VOCs dissolved using various doses of *Citrus*-Burst 3 versus the interfacial tension measurement (IFT) taken in each vial after 48 hours of contact can be found in FIG. 7. For example, it can be readily observed from FIG. 6 that IFT measurements can be used to easily determine the solubility potential of the cosolvent-surfactant mixture. The highly linear log-normal relationship of the logarithm of the octanol-water partition coefficient ($\log(K_{ow})$) and the solubility enhancement factor, β, for each of the tested *Citrus* Burst-3 concentrations allows prediction of the solubility behavior of many organic compounds using the relationship. These types of experiments and relationships can be used to screen and determine optimal types and concentrations of surfactants and cosolvent-surfactant mixtures that can be used to optimize dissolution of NAPL organic compounds useful in the S-ISCO process.

Figure 8:
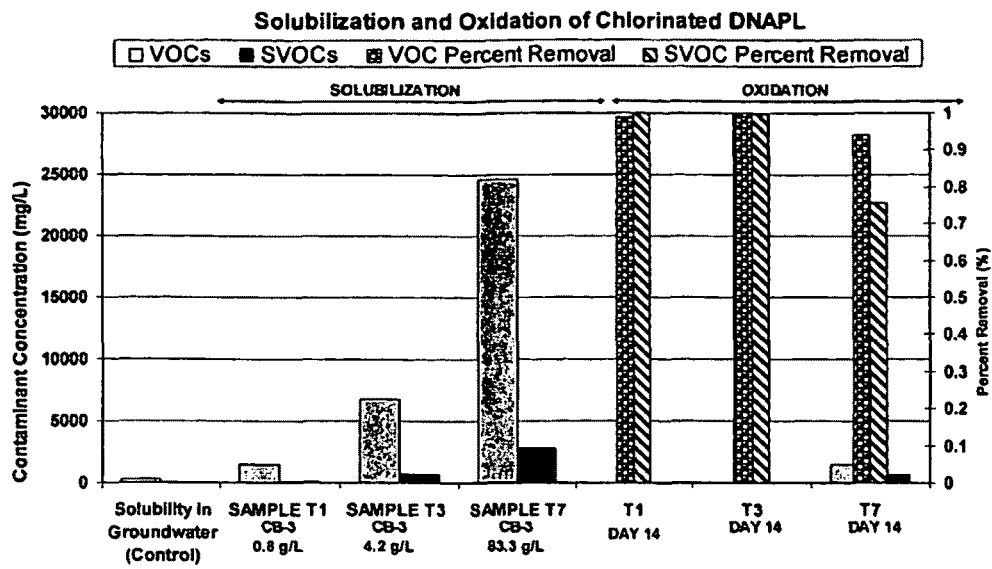
FIG. 8 is a bar graph depicting the concentration of VOC and SVOC contaminants upon solubilization and following oxidation. The percentages of VOC and SVOC contaminants removed are also depicted.

Aliquots of the *Citrus* Burst-3 enhanced solubilized DNAPL mixtures were added to aliquots of a sodium persulfate solution and the bulk solution pH adjusted to greater than 12 using NaOH. Prior to adding the sodium persulfate, initial VOC and SVOC concentrations of the solutions were determined using USEPA Methods, 8260 and 8270, respectively, as shown in Table 4. These solutions were slowly mixed at 60 rpm on an orbital shaker table for 14 days. After the 14 day mixing period the solutions were removed from the mixer and the VOC and SVOC concentrations were measured using USEPA Methods 8260 and 8270. The overall removal of VOCs and SVOCs was calculated for each treatment condition and the results can be found in FIG. 8. A few notes on FIG. 8 follow. Control consisted of solubilized DNAPL in water to reach saturation conditions. DNAPL is composed of Tetrachloroethene (PCE), Carbon Tetrachloride (CTC), Hexachlorobutadiene (HCBD), Hexachlorobenzene (HCB), Hexachloroethane (HCE), Octachlorostyrene (OCS), and Octachloronaphthalene (OCN). Aliquots of the CB-3 solubilized DNAPL chlorinated solvent (Samples T1-T3) were taken then oxidized using NaOH high pH activated persulfate. Percent removal of Total VOCs and Total SVOCs are presented after 14 days of oxidation.

The T1 and T3 samples, which initially had 0.8 g/L and 4.3 g/L, respectively of *Citrus*-Burst 3, had greater than 99 percent removals of VOCs and SVOCs after 14 days of treatment. The T7 sample that initially had a *Citrus* Burst-3 concentration 83.3 g/L and a much greater concentration of VOCs and SVOCs than the other vials, removed of VOCs and SVOCs were 94 percent and 76 percent, respectively. The initial IFT measurements for the T1, T3, and T7 tests prior to oxidation were 63.9 mN/m, 48.5 mN/m and 35.40 mN/m, respectively. Following the 14 day oxidation period, the final IFT readings for the T1, T3, and T7 tests were 74.4 mN/m, 73.1 mN/m and 35.40 mN/m, respectively. The alkaline persulfate substantially removed the dissolved VOCs and SVOCs from the T1 and T3 samples, as well as returning the IFT values to background conditions of water without any added cosolvent-surfactant. In the case of the T7 sample, the IFT values remained low while high removal percentages of the VOCs and SVOCs were observed. It is likely that additional time was required to destroy the remaining VOCs and SVOCs in the T7 vial and to increase the IFT to background conditions. Digital photographs were taken of the test vials before, during and after the 14 day treatment. It was evident after 14 days of treatment that the turbidity and red color (associated with the Suidan IV dyed DNAPL) were completely removed and the solutions returned to a clear condition. In the T7 sample, the red color was removed (indicative of most of the dissolved DNAPL removed) and much of the turbidity was reduced.

Example 3: Stability of Cosolvent-Surfactant Mixtures with Activated Persulfate

In this example, the stability of a cosolvent, surfactants and cosolvent-surfactant mixtures in the presence of persulfate activated using Fe(II)-EDTA and at high pH are presented. The ability of cosolvents, surfactants and cosolvent-surfactant mixtures to resist rapid destruction by oxidants is an important design parameter in the S-ISCO process.

First experiments were conducted using d-limonene as a cosolvent, a mixture of non-ionic surfactants (EZ-Mulse) and cosolvent-surfactant mixtures (*Citrus* Burst-1, *Citrus* Burst-2 and *Citrus* Burst-3).

Initial tests to evaluate the impacts of pH and alkaline activated persulfate were conducted using 1000 mg/L concentrations of the various cosolvent, surfactant or cosolvent-surfactant mixtures in water alone at: 1) controlled pH values of 7, 10, and 12 and controlled pH values with 25 g/L of sodium persulfate. The tests were conducted for 30 days. pH was controlled using NaOH.

Figure 9:
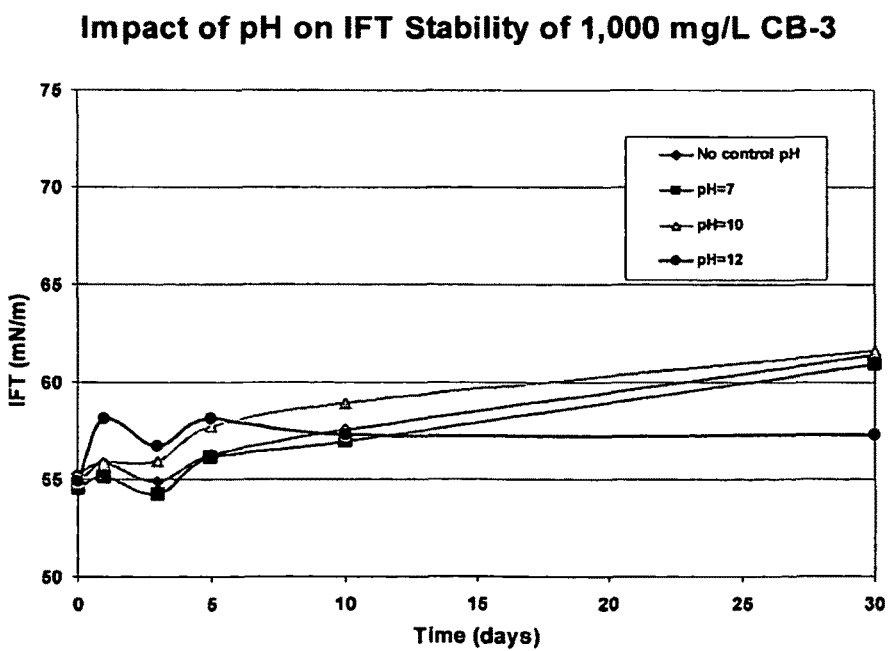
FIG. 9 is a graph depicting the interfacial surface tension as a function of time for solutions of *Citrus* Burst 3 in water at three different pH values.

In the absence of persulfate all mixtures exhibited only minor effects by the pH of the system. For example, in FIG. 9 the effects of pH on the IFT stability demonstrates that as the pH increased from 7 to 12, there was an increase in the IFT stability over a 30 day period. The maximum decrease of IFT was less than 15 percent over a 30 day period. All other cosolvent, surfactant or cosolvent-surfactant mixtures exhibited similar behavior.

Figure 10:
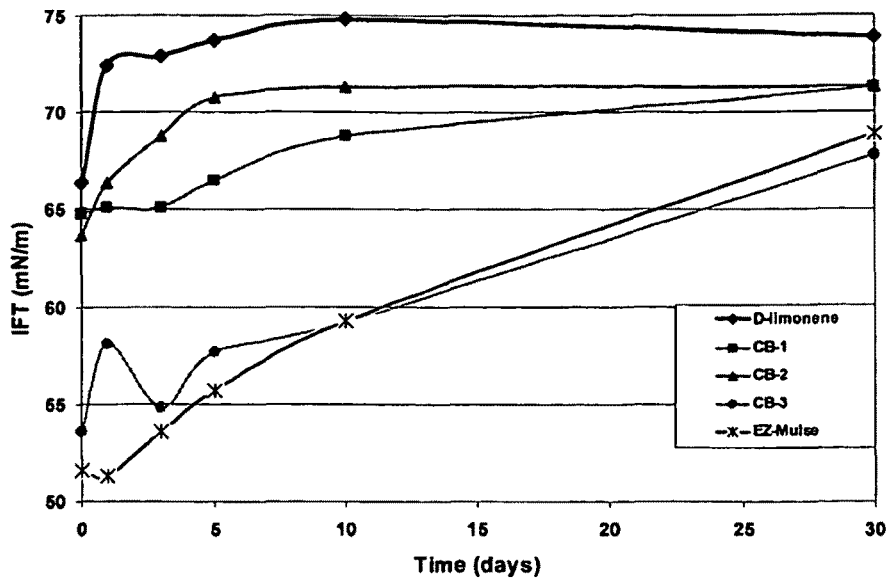
FIG. 10 is a graph depicting the interfacial surface tension as a function of time at a pH of 12 for solutions of several different cosolvents and surfactants (d-limonene, *Citrus*

The same experiments were repeated with 25 g/L of sodium persulfate added to evaluate the impacts of alkaline persulfate. For example, the effect of alkaline persulfate on IFT stability can be seen in FIG. 10, where the experimental conditions were as follows; pH=12, with 1000 mg/L of the individual cosolvent, surfactant or cosolvent-surfactant mixtures and initial sodium persulfate concentrations of 25 g/L. The initial IFT varied depending on the specific cosolvent, surfactant or cosolvent-surfactant mixture. The overall IFT values using *Citrus* Burst-3 and EZ-Mulse were lower than the other mixtures and remained lower for the duration of the test. After 30 days of exposure to persulfate the IFT values associated with *Citrus* Burst-3 and EZ-Mulse remained below background values. Test results at pH values of 7 and 10 exhibited nearly identical IFT stability responses as did the pH=12 tests. Thus, alkaline persulfate (pH>10) exhibits no significantly greater change in IFT stability that persulfate at neutral pH.

Similarly, experiments were conducted comparing IFT stability of *Citrus* Burst 2, *Citrus* Burst-3 and the surfactant Alfoterra 53 with sodium persulfate alone at 50 g/L and sodium persulfate at 50 g/L with 250 mg/L as Fe of Fe(II)-EDTA. These experiments were run for a 10 day period. In FIG. 11, it can be seen that the IFT initially increased with all systems tested, then generally stabilized after this initial period. All systems had a greater increase in IFT when the persulfate was activated with Fe(II)-EDTA, with the exception of *Citrus* Burst-3, which had only a minor change in IFT stability. Additional experiments were conducted on the IFT stability of *Citrus* Burst-3 at a concentration of 2000 mg/L using Fe(II)-EDTA activated persulfate. In this example, the initial Fe(II)-EDTA activator concentration was fixed at 250 mg/L as Fe and the sodium persulfate concentration was varied from 0 g/L to 25 g/L. Increasing the concentration of sodium persulfate, resulted in increases in the IFT over the 14 day test period as shown in FIG. 12. However, the IFT values remained at or below 60 mN/m with the 5 g/L and 10 g/L sodium persulfate concentrations. At the 25 g/L sodium persulfate concentration, the IFT value was measured at 66.2 mN/m after the 14 day test period.

Experiments were conducted on the effects of permanganate on the stability of IFT in systems with 2000 mg/L *Citrus* Burst-3 with varying concentrations of permanganate. Results from these experiments in FIG. 12 indicate that permanganate concentrations of 5 g/L and 10 g/L affected the IFT of these systems, but the IFT values remained below background conditions. When the permanganate concentration was increased to 25 g/L, the IFT values increased to background conditions after 5 days.

Similarly, experiments were conducted on the effects of hydrogen peroxide activated persulfate with increasing concentration of hydrogen peroxide at 0 percent, 1 percent, 2 percent and 3 percent hydrogen peroxide at sodium persulfate concentrations at 25 g/L and *Citrus* Burst-3 concentrations at 2000 mg/L. In FIG. 13, it can be seen that there are effects of hydrogen peroxide on IFT values, however, all IFT values remain below 60 mN/m. Increasing the hydrogen peroxide concentration above 2 percent had no significant impact on IFT values.

Exposing various specific cosolvents, surfactants or cosolvent-surfactant mixtures to various oxidant and oxidant-activator systems can be used as a screening and design method for the optimal development of surfactant and cosolvent-surfactant systems for specific and oxidant-activator systems. Using the experimental method described above for specific NAPL or sorbed phase contaminants and various specific cosolvents, surfactants or cosolvent-surfactant mixtures to various oxidant and oxidant-activator systems will lead to customized and optimized formulations of the S-ISCO process.

Example 4: Treatability Test for Soil Decontamination

Bench-scale tests are used to evaluate the efficiency of dissolving and oxidizing former Manufactured Gas Plant (MGP) site contaminants including polycyclic aromatic hydrocarbons (PAHs), total petroleum hydrocarbons (TPH), and volatile organic compounds (VOCs) in site soils and groundwater matrices with several selected chemical oxidation processes: 1) activated persulfate oxidation; 2) persulfate-hydrogen peroxide dual oxidant system; and 3) cosolvent-surfactant activated persulfate. All of the selected oxidation processes generate highly reactive free radicals in the systems and have a great capability of degrading the targeted contaminants of concern (COCs) at the site. Ferrous iron complexed with chelating agents including ethylene diamine tetra acetate (EDTA) and citric acid are used as the compounds to activate persulfate necessary to enhance oxidation strength by increasing the formation of free radicals. The dual oxidant persulfate-hydrogen peroxide system may promote a multi-radical attack, but requires low concentrations of hydrogen peroxide to minimize gas phase formation. Biodegradable cosolvent-surfactants are additionally investigated to determine their effect on increasing the rate of remediation achievable at the site.

To determine which process is more economically and technically effective in the remediation of the contaminated soils at the site, several experimental systems are evaluated and are discussed in the following sections.

Several tasks produce information regarding the reactivity and persistence of persulfate with the site soils, the reduction of COC concentrations in soils and groundwater by several activation methods, production of byproducts from activated persulfate oxidations, effects of cosolvent-surfactants on system performance and design parameters for both Pilot- and Full-Scale application of activated persulfate at the Site.

Task I-Determination of the Persulfate Soil Oxidant Demand (SOD)

The batch test persulfate SOD is determined on the homogenized contaminated soil. These data are used for the determination of oxidant concentrations and estimates of chemicals needed for the subsequent treatability tests. The batch test persulfate SOD is run using persulfate alone to identify the reactivity of the soil matrix and site groundwater with the oxidant.

Several initial $Na_2S_2O_8$ concentrations are used in the test to estimate the SOD as a function of initial persulfate concentration. A total of four persulfate doses are used to determine the SOD. Control tests use deionized (DI) water in place of $Na_2S_2O_8$. Contaminated site groundwater is also screened to determine the oxidant demand of the matrix. After preparation, amber glass bottles are capped and the contents slowly mixed on a shaker table. Samples for pH, ORP, residual persulfate concentration are collected from the bottles and analyzed just prior to the persulfate addition and then on days 1, 10, and 20.

The oxidant demand is calculated based on the persulfate concentrations, measured after 10 days using Equation 1, $$SOD = V(C_0 - C_s)/m_{soil} \qquad \text{(Eq. 1)}$$

where V=total volume of persulfate solution in the vials, $C_0$=initial persulfate concentration, $C_s$=persulfate concentration at the relatively steady state or the reaction period of $10_{th}$ day, and $m_{soil}$=the mass of dry soil in reactors. A relationship is developed relating the persulfate oxidant demand and initial concentration of persulfate used in the tests. Results of the SOD tests for the tested MGP site soils are found in FIG. 14.

Task II Batch and Column Cosolvent-Surfactant Screening

The cosolvent proposed for use in the treatability studies is d-limonene. This cosolvent is a 100 percent biodegradable, naturally occurring chemical and is a natural product derived from *citrus* crops. d-Limonene is not miscible with water and requires a surfactant to form an emulsion creating its apparent solubility in water. d-Limonene is available in a food grade form and is also used in many household cleaning chemicals. When mixed with surfactants, the emulsion has the ability to dissolve and displace oils and tars.

As part of Task II, several d-limonene and surfactant blends are screened for their ability to solubilize NAPLs and tars from an MGP Site. Several test surfactants and cosolvent-surfactant blends are mixed with NAPL phase and site groundwater. The phase behavior is monitored by the examination of the extent of NAPL solubilization, emulsion formation, critical micelle formation, and interfacial tension. FIG. 15 illustrates the use of this methodology of adding successively increasing concentrations of the surfactants and cosolvent-surfactant blends to the MGP DNAPL and water mixtures and recording interfacial tension (IFT) measurements. This procedure can be used to measure the critical micelle concentration if the system was solely in the aqueous phase. A log-normal plot can also be used to interpret the critical micelle concentration. In this case MGP DNAPL is present causing the CMC to be greater than in a pure aqueous system alone.

Soil column tests were run using homogeneous soil from an MGP site and spiking the soil with DNAPL from the MGP site to approximate residual saturation with respect to MGP DNAPL. Various surfactants and cosolvent-surfactant mixtures were flushed through replicate columns and various process parameters were measured in the column effluent, such as turbidity, oxidation-reduction potential, pH, electrolytic conductivity, temperature, dissolved oxygen. Additionally, VOCs and SVOCs were periodically monitored in the column effluent using USEPA Methods 8260 and 8270. Results from the column tests are shown in FIG. 16 in which the total effluent VOCs and SVOCs (in molar units) for each of the column run conditions, including a run in which Fe(II)-EDTA activated persulfate was flushed through a replicate spiked soil column. *Citrus* Burst-3 exhibited the greatest potential for solubilizing the MGP DNAPL compounds in comparison to the other tested surfactants and cosolvent-surfactant mixtures. The simultaneous addition of Fe(II)-EDTA activated persulfate to a column being flushed with *Citrus*-Burst-2 reduced total effluent COCs flushed from the column by 87 percent.

Task III Batch Aqueous and Soil Slurry Activated Persulfate

Experiments in this task relate the reduction of MGP COC concentrations in both aqueous and soil slurry batch systems. The initial persulfate concentration may be varied, based on the persulfate SOD tests, which are run first. Because the stability of the Fe(II)-chelates in the presence of persulfate determines the extent of reaction (i.e., zone of reaction influence at full-scale) in the subsurface at the site, it is important that the optimal chelate be used. Prior work has indicated the stability of EDTA is greater than that of citric acid in the neutral pH range (12). During all of the proposed tests as part of Task II, persulfate and the metal chelate concentration are measured to determine the longevity of the chelate complex in the persulfate solution. During the aqueous phase tests, COCs are analyzed at various times. Based on the aqueous phase results, a chelate can be chosen to be used in a soil slurry tests.

In the soil slurry tests, COCs are measured at Time=0, 1, 5 and 30 days. The chelate used is based on the results of the aqueous phase comparison of EDTA and citric acid The best performing persulfate activation method from the aqueous phase tests is used in these soil slurry tests. Results of the 30-day soil slurry test using Fe(II)-EDTA activated persulfate and *Citrus* Burst-1 indicate that there was a 98.9 percent removal of total COCs in this soil slurry test as shown in FIG. 17. In comparison to other soil slurry treatments with a dual oxidant hydrogen peroxide-persulfate, Fe(II)-EDTA activated persulfate and Fe(II)-EDTA activated persulfate with Alfoterra 53 (S-ISCO process), the greatest removal and efficiency was with the S-ISCO soil slurry test. The efficiency of the S-ISCO process was evaluated with respect to the moles of MGP COCs removed from soil slurry tests per moles of sodium persulfate utilized during the 30 day testing period.

Simple replicate soil column tests were conducted with homogenized soils. The results of the S-ISCO soil column using Fe(II)-EDTA activated persulfate with Alfoterra-53, in FIG. 18, had the highest removal of MGP VOCs, SVOCs and tentatively identified compounds (TICs) in comparison with other soil columns using Fe(II)-EDTA activated persulfate and persulfate alone. In FIG. 19, the efficiency of the S-ISCO process (Fe(II)-EDTA activated persulfate with Alfoterra-53) is compared to that of persulfate alone, Fe(II)-EDTA activated persulfate in a soil column study. The efficiency was 65 percent greater using the S-ISCO Process with Fe(II)-EDTA activated persulfate and *Citrus* Burst-2.

Surfactant Systems and S-ISCO

Surfactant enhanced in situ chemical oxidation (S-ISCO) remediation depends on choosing the correct surfactants or surfactant-cosolvent mixtures that create the most effective solubilized micelle or microemulsion with the NAPL present in the soil, such that a Winsor Type I phenomenon occurs and other Winsor type behaviors are generally avoided. Once an adequate Winsor Type I solubilized micelle or microemulsion has formed and thus increases the apparent solubility of the NAPL, the solubilized micelle or microemulsed NAPL is able to enter into "aqueous phase reactions" and in the case of S-ISCO™ remediation, it can be oxidized using a chemical oxidant such as permanganate, ozone, persulfate, activated persulfate, percarbonate, activated percarbonate, or hydrogen peroxide, or ultraviolet (uV) light or any combination of these oxidants with or without uV light. It is well known in the literature that several methods can be used to activate or catalyze peroxide and persulfate to form free radicals such as free or chelated transition metals and uV light. Persulfate can be additionally activated at both high and low pH, by heat or by peroxides, including calcium peroxides. Persulfate and ozone can be used in a dual oxidant mode with hydrogen peroxide.

S-ISCO can make use of increased solubilization of NAPL or sorbed contaminants in Winsor Type I systems. In situ chemical oxidation of the solubilized or microemulsed NAPLs in a Winsor Type I system eliminates the necessity of complete liquid pumping extraction recovery of the solubilized NAPL. Elimination of extraction systems avoids technical challenges associated with costly complete plume capture, costly above ground treatment systems, requirements to recycle surfactant or surfactant-cosolvent mixtures, and to dispose or reinject the bulk liquid back into the subsurface. Martel et al. (22, 23) proposed the use of Winsor Type I microemulsions to solubilize NAPLs without NAPL mobilization. These systems have the advantage of high solubilization of NAPLs (although not as high as middle-phase microemulsions) with relatively low amounts of chemical additives required. Chun-Huh (24) showed that, in microemulsions, solubilization of the oil phase into the microemulsion is related to interfacial tension by an inverse squared relationship. Remediation systems that rely on Winsor Type I solubilized micelle or microemulsification are necessarily less efficient than those that rely on Winsor Type III microemulsions and mobilization, since solubilization is lower at the higher interfacial tensions required to prevent mobilization. However, desorption and solubilization of contaminants using Winsor Type I microemulsions are controllable such that the risk of off-site mobilization of NAPL contaminants of concern (COCs) is minimal. This type of behavior is the focus of S-ISCO™ (surfactant enhanced in situ chemical oxidation) remediation and can be useful in remedying manufactured gas plant (MGP) sites as well as sites with chlorinated solvents, petroleum hydrocarbons, pesticides, herbicides, polychlorinated biphenyls, and other NAPL or sorbed COCs. Under solubilizing conditions, the NAPL removal rate is dependent on the increase in solubility of the NAPL in the surfactant mixture. Under desorbing conditions, the sorbed COC species removal rate is dependent on the rate of desorption of the COC into the surfactant or surfactant-cosolvent mixture.

The invention involves a method and process of increasing the solubility of contaminants, such as normally low solubility nonaqueous phase liquids (NAPLs), sorbed contaminants, or other chemicals in soils in surface and ground water, and simultaneously or subsequently oxidizing the chemicals using a chemical oxidant without the need of extraction wells for the purpose of recovering the injected cosolvents and/or surfactants with NAPL compounds. Examples of contaminants are dense nonaqueous phase liquids (DNAPLs), light nonaqueous phase liquids (LNAPLs), polycyclic aromatic hydrocarbons (PAHs), chlorinated solvents, pesticides, polychlorinated biphenyls and various organic chemicals, such as petroleum products. Contaminants can be associated with, for example, manufactured gas plant residuals, creosote wood treating liquids, petroleum residuals, pesticide, or polychlorinated biphenyl (PCB) residuals and other waste products or byproducts of industrial processes and commercial activities. Contaminants may be in the liquid phase, for example, NAPLs, sorbed to the soil matrix or in the solid phase, for example, certain pesticides.

The term "solubilize" as used herein can refer to, for example, one or more of incorporating a contaminant in the aqueous phase, forming a molecular scale mixture of contaminant and water, incorporating contaminant at a micellar interface, and incorporating contaminant in a hydrophobic core of a micelle. The term "solution" as used herein can refer to, for example, a contaminant in the aqueous phase, a molecular scale mixture of contaminant and water, a contaminant at a micellar interface, and a contaminant in a hydrophobic core of a micelle.

Minimal mobilization can be defined as follows. NAPL may move through colloidal transport but bulk (macroscopic) movement of NAPL downward or horizontal is not occurring.

The subsurface can include any and all materials below the surface of the ground, for example, groundwater, soils, rock, man-made structures, naturally occurring or man-made contaminants, waste materials, or products. Knowledge of the distribution of hydraulic conductivity in the soil and other physical hydrogeological subsurface properties, such as hydraulic gradient, saturated thickness, soil heterogeneity, and soil type is desirable to determine the relative contribution of downward vertical density driven flow to normal advection in the subsurface.

The phase behavior of the specific system is controllable. Laboratory experiments have shown that surfactant/cosolvents that preferentially stay with the aqueous phase can dramatically increase the solubility of NAPL components in the aqueous phase (Falta, 1998) (20). In cases where the solvent preferentially partitions into the aqueous phase, separate phase NAPL mobilization is not observed and the NAPL removal occurs by enhanced dissolution. Solubilization has the added benefit of increasing bioavailability of the contaminants and increasing the rate of biological degradation of the contaminants.

Surfactant Solubilization, Surfactant Mobilization, and Microemulsions

Surfactants are surface active agents. They are molecules that have both hydrophilic and lipophilic parts (Shiau et al., 1994) (21). The amphophilic nature of surfactant molecules (having both positive and negative charged parts) causes them when injected into aquifers to accumulate at the water-solid interface. Furthermore, surfactant molecules can coagulate into aggregates known as micelles. Micelles are colloidal-sized aggregates. The surfactant concentration at which micelle formation begins is known as the critical micelle concentration (CMC). Determining the CMC of a surfactant or a cosolvent-surfactant mixture is an important component in managing S-ISCO remediation. Micelle formation generally distinguishes surfactants from amphophilic molecules (for example, alcohols) that do not form micelles and have lower surface activity.

Surfactant addition above the CMC results in the formation of additional micelles. Winsor Type behavior describes different types of micelle formation that is relevant to remediation of sites with NAPLs or sorbed COCs. Winsor Type I micelles have a hydrophilic exterior (the hydrophilic heads are oriented toward the exterior of the aggregate) and a hydrophobic interior (the hydrophobic tails are oriented toward the interior of the aggregate). This type of micelle can be likened to dispersed oil drops or molecules; the hydrophobic inside of the micelle acts as an oil sink into which hydrophobic contaminants can partition. The increased scale aqueous solubility of organic compounds at concentrations above the CMC is referred to as "solubilization." During solubilization, surfactant concentration increases, additional micelles are formed and the contaminant solubility continues to increase. S-ISCO™ remediation optimizes and controls solubilization reactions at NAPL and sorbed COC sites.

Winsor Type II surfactants are oil soluble and have a low hydrophile-lipophile balance (HLB). These type of surfactants partition into the oil phase, and may form reverse micelles. A reverse micelle has a hydrophilic interior and lipophilic exterior. The resulting phenomenon is similar to dispersed water drops in the oil phase. Surfactant systems intermediate between micelles and reverse micelles can result in a third phase (Winsor Type III system) known as a middle-phase microemulsion. The middle phase system is known to coincide with very low interfacial tensions (IFTs) and can be used for bulk (pump-and-treat) extraction of contaminants from residual saturation. Surfactant-enhanced remediation by this approach is often referred to as mobilization. The surfactants or cosolvent-surfactant mixtures used and the chemical conditions under which solubilization and mobilization occur are very different. Solubilization can be effected at very low surfactant concentrations that can be orders of magnitude below that at which mobilization occurs.

Microemulsions are a special class of a Winsor Type I system in which the droplet diameter of the dispersed phase is very small and uniform. Droplet diameters of oil-in-water microemulsions generally range between 0.01 and 0.10 μm. (Tawitz, et al., 1998) (26). These microemulsions are single phase, optically transparent, low viscosity, thermodynamically stable systems that form spontaneously on contact with an oil or NAPL phase. A properly designed microemulsion system is dilutable with water and can be transported through porous media by miscible displacement. This is in contrast to surfactant-based technologies that utilize Winsor Type III middle-phase microemulsions which depend on mobilization to transport the NAPL phase as an immiscible displacement process.

Microemulsions are usually stabilized by a surfactant and a cosolvent. A mixture of water, surfactant, and cosolvent form the microemulsion "precursor"; this "precursor" should be a stable single-phase, low viscosity system. When this precursor is injected into a porous medium containing residual NAPL, the NAPL is microemulsified and can be transported to an extraction well as a single phase, low viscosity fluid. Suitable cosolvents are low-molecular-weight alcohols (propanol, butanol, pentanol, hexanol, etc.), organic acids, and amines. There are many surfactants that form oil-in-water microemulsions in the presence of alcohol cosolvents. Some of these surfactants have been given direct food additive status by the FDA, are non-toxic, and are readily biodegradable.

Any surfactant-based remediation technology must utilize surfactants with optimum efficiency (i.e., minimal losses to sorption, precipitation, coacervate formation, crystallization, or phase changes), environmental acceptance, and biodegradability. Surfactants can be lost from a solution by adsorption onto aquifer solid phases and by precipitation with polyvalent cations dissolved in ground water or adsorbed onto cation exchange sites. Surfactants without cosolvents sometimes create viscous macromolecules or liquid crystals when they combine with the contaminants essentially blocking fluid flow. Cosolvents can be used to stabilize the system and avoid macromolecule formation. It has been suggested that chromatographic separation of surfactants and cosolvents could reduce microemulsification efficiency. However, experimental observations on systems containing 10 to 15 percent residual NAPL saturation indicate that, if chromatographic separation occurred, its effect on microemulsification was negligible.

In the embodiments described above, contaminants, or chemicals of concern (COCs) can be effectively removed, because of the control achieved by the methods presented herein over several aspects of the remediation process. Surfactants and cosolvent-surfactant mixtures and oxidants can be selected, so that the oxidant does not prematurely degrade the surfactant, and the surfactant can effectively solubilize the COCs. On the other hand, the oxidation zone can be designed, so that the surfactant is rapidly oxidized at the oxidation zone, and the COCs thereby immobilized, so that they do not spread beyond the oxidation zone. The oxidant can travel through the soil without prematurely reacting, so that it efficiently destroys the COCs. Control of where the oxidant reacts can be further enhanced by use of an antioxidant. The components of the injected treatment solution, e.g., oxidant, activator, and surfactant, can be co-eluted, so that they can effectively work in conjunction to destroy COCs. The density of the injected solution can be controlled, so that the surfactant, oxidant, activator and other injected components travel downward to where COCs targeted for destruction are located. The treatment solution can be injected to remove COCs residing at a downgradient location where it is not practical or economical to inject solution, e.g., under a building or railroad track.

Example 5: Facilitated Remediation

A surfactant or a mixture of surfactants and cosolvents can be simultaneously or sequentially be applied with a gas to a contaminated subsurface, for example, a subsurface contaminated with a non-aqueous phase liquid (NAPL), a light non-aqueous phase liquid (LNAPL), or a dense non-aqueous phase liquid (DNAPL). The gas can provide a hydraulic potential (pressure) to push or mobilize the contaminant to a recovery or extraction well. The surfactant and/or cosolvents can be applied first and then the gas pressure can be applied, or the surfactants and/or cosolvents can be applied simultaneously with the gas pressure. The gas can be created by injecting a liquid at an injection locus into a subsurface, so that upon contact of the liquid with subsurface materials the liquid decomposes into a gas (e.g., hydrogen peroxide solution that decomposes into oxygen and water). The gas phase can be created by pressurizing a gas phase into water (or another injected liquid) above ground or while injecting, so that upon release in the subsurface at lower pressure the dissolved gas comes out of solution and forms a gas phase. As an additional example, the gas may be injected as a compressed gas or a supercritical fluid. The gas can include, for example, air, oxygen, nitrogen, carbon dioxide, or a noble (inert) gas or a combination of gases. Carbon dioxide (CO2) may be useful as a gas; its use can serve the dual purpose of recovering or extracting contaminant from a subsurface and sequestering the carbon dioxide, a greenhouse gas.

Such an approach of facilitated remediation, when a gas injected into the subsurface under pressure acts to mobilize a contaminant to flow to an extraction well, can, for example, be combined with any of the above-identified approaches in which a contaminant, such as a NAPL, LNAPL, or DNAPL, is oxidized in and/or extracted from a subsurface. In general, whenever in this text the injection of an oxidant is described, the description can also be considered to include the case of a gas evolving material, e.g., H2O2, a dissolved gas, a compressed gas, or a supercritical fluid being administered. The gas evolving material, dissolved gas, compressed gas, or supercritical fluid can either itself be the oxidant, e.g., $H_2O_2$ that decomposes to form oxygen, or the gas evolving material, dissolved gas, compressed gas, or supercritical fluid can be administered as an adjuvant to an oxidant, for example, an oxidant such as sodium persulfate.

Factors influencing the selection of a mobilizing fluid, such as a gas evolving material, a dissolved gas, a compressed gas, or a supercritical fluid, for injection into a subsurface to promote movement of contaminant to an extraction well can include the following. The solubility of the contaminant, e.g., a NAPL, LNAPL, or DNAPL, in the mobilizing fluid can be considered. For example, it can be advantageous to select a mobilizing fluid, such as a supercritical fluid, in which the contaminant, surfactant, and/or cosolvent is soluble. Such a mobilizing fluid that solubilizes the contaminant can remove the contaminant from the matrix in the subsurface, for example, soil, and convey it to an extraction well. Alternatively, it can be advantageous to select a mobilizing fluid in which the contaminant is not soluble. Such a mobilizing fluid that does not solubilize the contaminant can act as a piston to push the contaminant in a separate phase to an extraction well. The mobilizing fluid can be selected to oxidize as well as promote the extraction of contaminant, and therefore promote the in situ destruction of contaminant. For example, hydrogen peroxide, oxygen dissolved in a liquid, or compressed air can be used as the mobilizing fluid. The selection of an oxidizing material as the mobilizing fluid can be more strongly indicated when the contaminant that is of primary concern can readily be oxidized, than when the contaminant is resistant to oxidation.

Alternatively, a mobilizing fluid may be selected because it is abundant or must be disposed of. For example, if a fossil fuel power generation plant is located near to a contaminated site, such as a manufactured gas plant (MGP) site, the carbon dioxide emitted by the power generation plant may be captured and used as the mobilizing fluid to drive contaminant in a subsurface, e.g., NAPL, LNAPL, or DNAPL associated at the MGP site, to extraction wells. Such use of carbon dioxide as the mobilizing fluid may also allow for the underground sequestration of carbon dioxide, a greenhouse gas. The geology of the subsurface in which the contaminant resides may influence the selection of the mobilizing fluid. For example, if many channels from the subsurface to the surface exist, such that gas injected into the subsurface will rapidly migrate to the surface and escape into the atmosphere, and it is considered important to sequester carbon dioxide for long periods of time, this may contraindicate the use of carbon dioxide to mobilize contaminant in the subsurface to an extraction well.

Examples of other gases than can be liberated by an injected material or by reaction of an injected material with a contaminant, can be dissolved in a liquid injected with the injection fluid, and/or can be introduced as a supercritical fluid or compressed gas include nitrogen, air, an inert gas such as helium or argon, and other gases.

A mobilizing fluid can be selected, because a surfactant and/or cosolvent to be administered is soluble in the mobilizing fluid. For example, a dissolved gas may be selected as the mobilizing fluid, because the surfactant and/or cosolvent is also soluble in the liquid in which the gas is dissolved. As another example, a supercritical fluid may be selected as the mobilizing fluid, because the contaminant, surfactant, and/or cosolvent is soluble in the supercritical fluid at pressures and temperatures in the subsurface to be remediated. In some cases, the design of the remediation process can include tuning one or more properties of the supercritical fluid, such as the ability to dissolve contaminant, surfactant, and/or cosolvent, for example, through selection of the pressure and/or temperature imposed on the supercritical fluid in the subsurface, to be optimal for the remediation process. On the other hand, if, for example, the temperatures and pressures in a portion of the subsurface will be such that a supercritical fluid will change to the gas state and the surfactant and/or cosolvent will come out of solution, the use of the supercritical fluid as the mobilizing fluid, or as the only fluid to be introduced, may be contraindicated. In other cases, it may be acceptable or even desirable for the mobilizing fluid to be in one state, e.g., a supercritical state, in one region of a subsurface, and in another state, e.g., a gaseous state, in another region of the subsurface. For example, if the contaminant in the subsurface is initially localized adjacent to water, such as if the contaminant is an LNAPL lying above a pool of water or a DNAPL lying below a pool of water, the remediation process may be designed, so that the mobilizing fluid is in a supercritical state between the injection well and the contaminant, so that the mobilizing fluid transports solubilized surfactant and/or cosolvent to the contaminant, but that between where the contaminant is initially localized and the extraction well, the mobilization fluid changes from a supercritical to a gas state. The change to a gas state may be acceptable because the pool of water may act to solubilize the surfactant and/or cosolvent as well as, say, emulsify the contaminant. The viscosity of the emulsified contaminant may be lower than the viscosity of the contaminant alone, so that the contaminant is more rapidly transported to the extraction well.

The placement of injection wells and/or extraction wells may be influenced by the selection of a mobilizing fluid, e.g., a gas evolving material, a dissolved gas, a compressed gas, or a supercritical fluid. For example, if a supercritical fluid is to serve as the mobilizing fluid, the injection and extraction wells can be placed such that in traveling from the injection to the extraction wells, the supercritical fluid experiences pressures and temperatures such that a surfactant and/or cosolvent to be injected with the supercritical fluid remains in solution in the supercritical fluid.

The composition of a surfactant and/or cosolvent liquid amendment for injection into a subsurface can include a natural surfactant or a surfactant derived from a natural product, such as a plant oil or plant extract. Mixtures of these natural surfactants or surfactants derived from natural products can be chosen to best emulsify the subsurface contaminant, e.g., NAPL, LNAPL, or DNAPL, such that a mobile phase emulsion is formed with greatly differing properties from the source contaminant. The choice of surfactants and/or cosolvents can be based on the testing of the source contaminant. For example, a surfactant and/or cosolvent mixture can be selected to produce a low interfacial tension that enables the formation of either Winsor Type I, Winsor Type II, or Winsor Type III systems. A preferred formation of microemulsions is to form Winsor Type III microemulsions or Winsor Type I microemulsions. Frequently the preferred natural solvent such as those derived from plants are generally biodegradable, including terpenes. Terpenes are natural products extracted from conifer and *citrus* plants, as well as many other essential oil producing species. The combination of cosolvent and surfactants enhances the formation of microemulsions from a contaminant, e.g., a NAPL, LNAPL, or DNAPL. The specific choice of natural cosolvents and the ratio of cosolvent to surfactant can be based on laboratory tests conducted on the contaminant to be emulsified. All of the above natural surfactants, surfactants derived from natural oils and natural cosolvents can be combined into formulations to form non- or low-toxicity macroemulsions and microemulsions, with contaminants, enhancing their recovery, and, thus, elimination from a contaminated subsurface. Once emulsified, the contaminant-surfactant-cosolvent system is formed, so that the contaminant is amenable to become mobile in the subsurface.

Compositions for use as surfactant and/or cosolvent liquid amendments for subsurface injection can include natural biodegradable surfactants and cosolvents. Natural biodegradable surfactants can include those that occur naturally, such as yucca extract, soapwood extract, and other natural plants that produce saponins, such as horse chestnuts (*Aesculus*), climbing ivy (*Hedera*), peas (*Pisum*), cowslip, (*Primula*), soapbark (*Quillaja*), soapwort (*Saponaria*), sugar beet (*Beta*) and balanites (*Balanites aegyptiaca*). Many surfactants derived from natural plant oils are known to exhibit excellent surfactant power, and are biodegradable and do not degrade into more toxic intermediary compounds.

Examples of surfactants and/or cosolvents that can be used include terpenes, *citrus*-derived terpenes, limonene, d-limonene, castor oil, coca oil, coconut oil, soy oil, tallow oil, cotton seed oil, and a naturally occurring plant oil. For example, additionally or alternatively, the surfactant can comprise *Citrus* Burst 1, *Citrus* Burst 2, *Citrus* Burst 3, or E-Z Mulse. For example, the surfactant and/or cosolvent can be a nonionic surfactant, such as ethoxylated soybean oil, ethoxylated castor oil, ethoxylated coconut fatty acid, and amidified, ethoxylated coconut fatty acid. For example, the surfactant and/or cosolvent can be ALFOTERRA 53, ALFOTERRA 123-8S, ALFOTERRA 145-8S, ALFOTERRA L167-7S, ETHOX HCO-5, ETHOX HCO-25, ETHOX CO-5, ETHOX CO-40, ETHOX ML-5, ETHAL LA-4, AG-6202, AG-6206, ETHOX CO-36, ETHOX CO-81, ETHOX CO-25, ETHOX TO-16, ETHSORBOX L-20, ETHOX MO-14, S-MAZ 80K, T-MAZ 60 K 60, TERGI- TOL L-64, DOWFAX 8390, ALFOTERRA L167-4S, ALFOTERRA L123-4S, and ALFOTERRA L145-4S.

For example, the surfactant can comprise a surfactant/cosolvent mixture, in which case, the co-solvent can comprise of dilimnone, terpinoids, alchohols, or plant-based solvents. For example, a composition of surfactant and cosolvent can include at least one *citrus* terpene and at least one surfactant. A *citrus* terpene may be, for example, CAS No. 94266-47-4, *citrus* peels extract (*citrus* spp.), *citrus* extract, Curacao peel extract (*Citrus aurantium* L.), EINECS No. 304-454-3, FEMA No. 2318, or FEMA No. 2344. A surfactant may be a nonionic surfactant. For example, a surfactant may be an ethoxylated castor oil, an ethoxylated coconut fatty acid, or an amidified, ethoxylated coconut fatty acid. An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE (20) castor oil, POE (20) castor oil (ether, ester), POE (3) castor oil, POE (40) castor oil, POE (50) castor oil, POE (60) castor oil, or polyoxyethylene (20) castor oil (ether, ester). An ethoxylated coconut fatty acid can include, for example, CAS No. 39287-84-8, CAS No. 61791-29-5, CAS No. 68921-12-0, CAS No. 8051-46-5, CAS No. 8051-92-1, ethyoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate. An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

Examples of surfactants derived from natural plant oils are ethoxylated coca oils, coconut oils, soybean oils, castor oils, corn oils and palm oils. A surfactant and/or cosolvent can be or can be derived from a plant extract or a biodegradable plant extract. Many of these natural plant oils are U.S. FDA GRAS (Generally Recognized As Safe). The addition of biopolymers to the surfactant-cosolvent mixture may be used to thicken the emulsion to enhance hydrocarbon recovery efforts. Biopolymers can be useful in increasing the viscosity of the emulsion enabling the emulsified contaminant, such as an emulsified NAPL, LNAPL, or DNAPL, to be pushed to an extraction well with a lower cost bulk liquid injectant such as a water or brine solution. Similarly, the microemulsion can be followed by an injection of a biopolymer to shield the microemulsion from the bulk liquid injectant used to push the microemulsion to an extraction well. The addition of a chemical oxidant, such as hydrogen peroxide and/or sodium persulfate, can enhance the extraction of the contaminant by the buildup of pressure (for example, oxygen and $CO_2$ in the case of peroxide and $CO_2$ in the case of persulfate). Additionally, the oxidants can be used to pre-treat a contaminated subsurface to condition the contaminant, e.g., a NAPL, LNAPL, or DNAPL, to make the contaminant more amenable to emulsification and/or transport. Mineral amendments may be added to optimize emulsification and/or transport of a contaminant. Mineral amendments include salts, such as sodium chloride (NaCl), bases, such as sodium hydroxide (NaOH), and acids. The addition of NaCl may be particularly useful in low salt conditions where the destabilization of clay colloids, that may impact efficient and effective contaminant recovery or extraction, can be facilitated by the addition of salt. The addition of acids and bases may also be utilized under conditions where destabilization of clay colloids is desirable. Finally heat may be added to initially decrease the viscosity of a viscous contaminant, such as coal tar, to enhance emulsion formation.

The composition using natural surfactants and mixtures of natural surfactants, natural biopolymers, natural cosolvents to extract contaminant from a subsurface is novel and has not been practiced in the past. The combination of mixtures of natural surfactants, natural biopolymers, natural cosolvents with chemical oxidants to condition the contaminant prior to treatment with natural surfactants, natural biopolymers, or natural cosolvents is novel. The use of salts, acids, and bases with natural surfactants, natural biopolymers, natural cosolvents, and oxidants is novel. These processes enable the use of renewable resources to extract contaminants from subsurfaces where the contaminants would not otherwise be recoverable.

In an embodiment, the injection fluid for injection at an injection locus, e.g., and injection well, into the subsurface of a contaminated site includes hydrogen peroxide. When the injection fluid leaves the injection well and travels through the subsurface, it can decompose to liberate oxygen and water. The liberated oxygen gas provides pressure that can mobilize the contaminant to travel to an extraction well, the extraction well being at a lower pressure, e.g., atmospheric pressure. The liberated oxygen gas can also react with and oxidize the contaminant. The contaminant can be fully oxidized by the oxygen, for example, a hydrocarbon contaminant can be oxidized to carbon dioxide and water, rendering it harmless. Alternatively, the contaminant can be partially oxidized by the oxygen, so as to reduce the molecular weight of the contaminant. A reduction in the molecular weight of the contaminant may reduce its viscosity, and thus promote flow of the contaminant to an extraction well. A reduction in the molecular weight of the contaminant may also render the contaminant more susceptible to other degradation processes, for example, another step of oxidation by the oxygen gas or another oxidant, or microbial degradation. Alternatively, partial oxidation of the contaminant, even if it does not substantially lower the molecular weight of the contaminant, may change the contaminant to a chemical form that is more susceptible to other degradation processes, for example, another step of oxidation by the oxygen gas or another oxidant, or microbial degradation. The hydrogen peroxide can also oxidize the contaminant directly, before the liberation of oxygen gas. Other oxidants that decompose to liberate oxygen gas or that oxidize the contaminant directly, such as ozone, a persulfate, sodium persulfate, or a percarbonate, can be used together with or instead of hydrogen peroxide. Reaction of liberated oxygen with the contaminant can produce carbon dioxide. This carbon dioxide can also serve to provide pressure to drive the contaminant to an extraction well.

The decomposition of the hydrogen peroxide (and/or other oxidant), as well as the oxidation of the contaminant by liberated oxygen gas and/or hydrogen peroxide (and/or other oxidant) can liberate heat. This heat can act to increase the temperature of the contaminant. The increase in temperature of the contaminant can have a feedback effect on the oxidation reaction(s) and further increase the rate of oxidation. The increase in temperature of the contaminant can also decrease the viscosity of the contaminant, so that the contaminant flows at a greater volumetric rate to an extraction well.

At the extraction well, the contaminant can be removed to the surface. Removal of contaminant to the surface can be effected by, for example, the pressure of gas in the subsurface, e.g., of oxygen liberated from hydrogen peroxide or another oxidant or carbon dioxide formed from the oxidation of contaminant. Removal of contaminant to the surface can be effected by applying a partial or a full vacuum to the extraction well, to promote movement of the contaminant to the surface. Removal of contaminant to the surface can be effected by pumping the contaminant out of the extraction well, e.g., with a pump that is located at the bottom of or at another point in the extraction well.

The injection of the injection fluid and the extraction of the contaminant can proceed sequentially. For example, a mobilizing fluid, such as hydrogen peroxide, a gas dissolved in a liquid, a compressed gas, or a supercritical fluid, can be injected into the subsurface at an injection locus, such as an injection well, in a first step. After the injection, pressure imposed by the injected or liberated gas in the subsurface can be released at the injection locus, so that contaminant, as well as residual mobilizing fluid, can be removed to the surface through the sample injection well, which can now serve as an extraction well.

Alternatively, the injection of the injection fluid and the extraction of the contaminant can proceed simultaneously. For example, the injection fluid can be injected into the subsurface through an injection well, and the contaminant can be removed through a separate extraction well. Alternatively, a single well can be used to introduce the injection fluid and to remove the contaminant. For example, a pipe, through which the injection fluid can be introduced, can be included in the well, so that the injection fluid is released into the subsurface at a predetermined depth in the well. Another pipe, through which the contaminant can be removed from the subsurface to the surface can also be included in the well. For example, the pipe for removal of contaminant can have an inlet at a predetermined depth, say, below the depth at which injection fluid is released and below the level of a contaminant liquid, e.g., a NAPL, LNAPL, or DNAPL, to be removed. Thus, the gas liberated from the injection fluid can impose a pressure that acts on the contaminant liquid and drives to the surface (or assistants in moving to the surface) the contaminant through the pipe for removal of contaminant.

The design of a process for remediating a contaminated subsurface can be influenced by, for example, the distribution of contaminant, the geology of the site, and economic factors. For example, when a liquid contaminant is pooled in a limited volume of the subsurface, sufficient remediation may be achieved by using a single well, and either sequentially or simultaneously injecting injection fluid and removing the contaminant. Such a design can be economical, in that only one well must be dug. Alternatively, if the contaminant is distributed over a large volume of the subsurface, it may be necessary to dig at least an injection well and at least an extraction well and to simultaneously inject injection fluid and remove contaminant to effect sufficient remediation of the subsurface.

A surfactant and/or cosolvent can be injected into the subsurface before injection of an injection fluid comprising hydrogen peroxide and/or another oxidant. Alternatively, the surfactant and/or cosolvent can be injected into the subsurface simultaneously with the injection of an injection fluid comprising hydrogen peroxide and/or another oxidant. The design of the remediation process can guide whether the surfactant and/or cosolvent is injected before or simultaneously with an injection fluid comprising hydrogen peroxide and/or another oxidant. For example, if the injection fluid is capable of solubilizing the surfactant and/or cosolvent, for example, if the injection fluid is a liquid in which gas is dissolved or is a supercritical fluid, then the injection fluid and the surfactant and/or cosolvent may be injected simultaneously. Alternatively, if the injection or mobilization fluid cannot solubilize the surfactant and/or cosolvent, for example, if the injection or mobilization fluid is a compressed gas, then the surfactant and/or cosolvent may be injected first, for example, as an aqueous solution, and then the injection or mobilization fluid may be injected. For example, in this way, the injection or mobilization fluid may be in a phase separate from the contaminant, surfactant, and/or cosolvent, and act as a piston to drive the contaminant toward an extraction well.

Before, during, and after the injection of injection fluid and the removal of contaminant, the subsurface can be monitored to ensure that the remediation process is proceeding satisfactorily. For example, the concentration and/or spatial distribution of hydrogen peroxide, another oxidant, a surfactant, and/or a cosolvent that have been injected into the subsurface can be monitored continuously, periodically, or sporadically, for example, to ensure that the hydrogen peroxide, another oxidant, a surfactant, and/or a cosolvent are being transported to regions of the subsurface where they can promote the oxidation of contaminant and mobilization of contaminant to an extraction well. For example, the concentration and/or spatial distribution of the contaminant, one or more components of the contaminant, the product of contaminant oxidation, and/or one or more components of the product of contaminant oxidation can be monitored continuously, periodically, or sporadically. For example, such monitoring can ensure that the contaminant is being destroyed by oxidation, modified by oxidation, so that it is more susceptible to degradation, e.g., by a chemical or microbial process, being mobilized to an extraction well, and/or not being mobilized to a region in which the contaminant can have a more deleterious impact, e.g., below a residential area, than the region where the contaminant was located prior to starting remediation.

Additional surfactants, cosolvents, and oxidants are presented in published PCT international application number WO2007/126779, which is hereby incorporated by reference. The surfactant and/or cosolvent can be any combination of the above compounds. The oxidant can be any combination of the above compounds.

Experiments

In several columns discussed in the following Examples, MGP (Manufactured Gas Plant) DNAPL (Dense Non-Aqueous Phase Liquid), that is, the tarry residue generated as waste at MGP sites, was used as the contaminant in assessing the ability of various fluids to extract contaminants. MGP DNAPL has a consistency similar to that of the bitumen found in tar sands.

In general, development and design of a process for recovery or extraction of a contaminant from a subsurface, such as from a NAPL, LNAPL, or DNAPL contaminated site, can make use of actual samples of the contaminated subsurface to be remediated, for example, core samples, and/or can make use of simulated or analogous samples. For example, a simulated or analogous sample may be formed by mixing a sand similar to that present in the subsurface of the contaminated site with a contaminant, e.g., a NAPL, LNAPL, or DNAPL, similar to that present in the site of interest in proportions representative of those found in the subsurface of the contaminated site of interest. The actual, simulated, or analogous sample can then be tested under regimes of exposure to injection or mobilization fluids having various concentrations of hydrogen peroxide and/or other oxidants, with gas liberated from the decomposition of an added (injected) material or from the reaction of an added (injected) material with the contaminant, and/or with gas dissolved in an injection fluid, or with gas in the form of a supercritical fluid or compressed gas. Conditions such as temperature, pressure, and flow rate of the injection or mobilization fluid can be varied and results such as the rate of mobilization of the contaminant under these various conditions can be observed. Results obtained with such tests or experiments can be compared in selecting an optimum set of conditions for reducing the concentration of the contaminant at the site in the subsurface.

In an embodiment, a kit for reducing the concentration of a contaminant at a site in a subsurface can be provided. The kit can include an injection or mobilization fluid injection system, that can, for example, include a reservoir for the injection or mobilization fluid, and piping to convey the injection or mobilization fluid to a predetermined depth in an injection well. The kit can include a contaminant extraction system, that can, for example, include a storage tank or other disposal facility for the extracted contaminant, and piping to remove the contaminant from the subsurface to the surface and to the storage tank or other disposal facility through an extraction well. The kit can include an injection fluid including hydrogen peroxide and/or another oxidant, a liquid and a dissolved gas, a compressed gas, and/or a supercritical fluid. The injection fluid can include a surfactant and/or a cosolvent.

Experiment 1

To measure the effect on final soil total petroleum hydrocarbon (TPH) of VeruSOL-3, H2O2, heat and nitrogen air, an experiment was set-up as follows. Ten columns were set-up, each column having a length of 30 cm and a diameter of 5 cm. All columns were spiked with 8 g of MGP (Manufactured Gas Plant) DNAPL (Dense Non-Aqueous Phase Liquid), and a flow rate of about 5 ml/min was induced. Columns also contained varying amounts of VeruSOL-3, deionized water, hydrogen peroxide (H2O2), nitriloacetic acid chelated iron (Fe(NTA)), sodium bicarbonate (NaHCO3), tar sands and/or nitrogen air, as indicated on the x-axis of the chart in FIG. 20a. FIG. 20a shows that the columns with a mixture of VeruSOL-3, hydrogen peroxide and either Fe(NTA) or NaHCO3 have the lowest final soil TPH concentrations. VeruSOL-3 includes *citrus* terpenes and plant-derived surfactants.

A comparison of each of these experimental set-ups against a control is available in FIGS. 20b-20k. It should be noted that the photos in FIGS. 20b-20k were taken after the experiment was allowed to run for differing amounts of time in each experiment.

Experiment 2

Figure 21B:
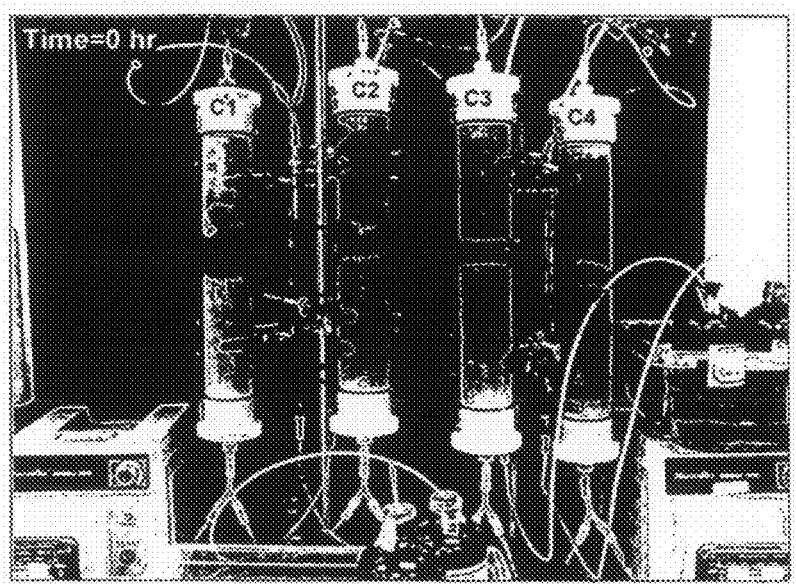
Figure 21C:
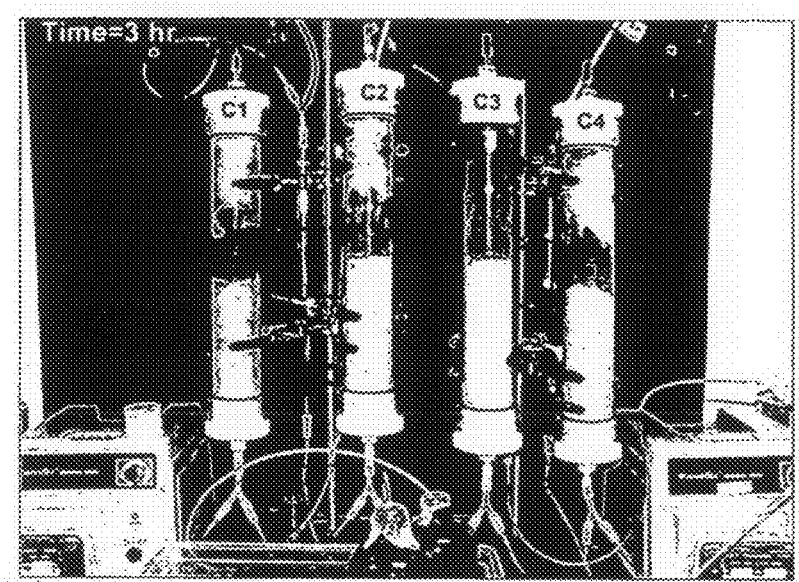
Figure 21D:
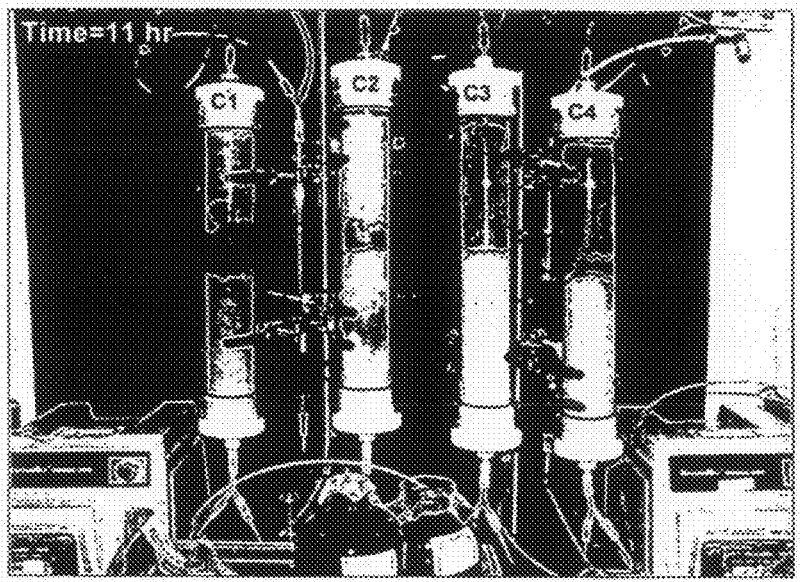
Figure 21E:
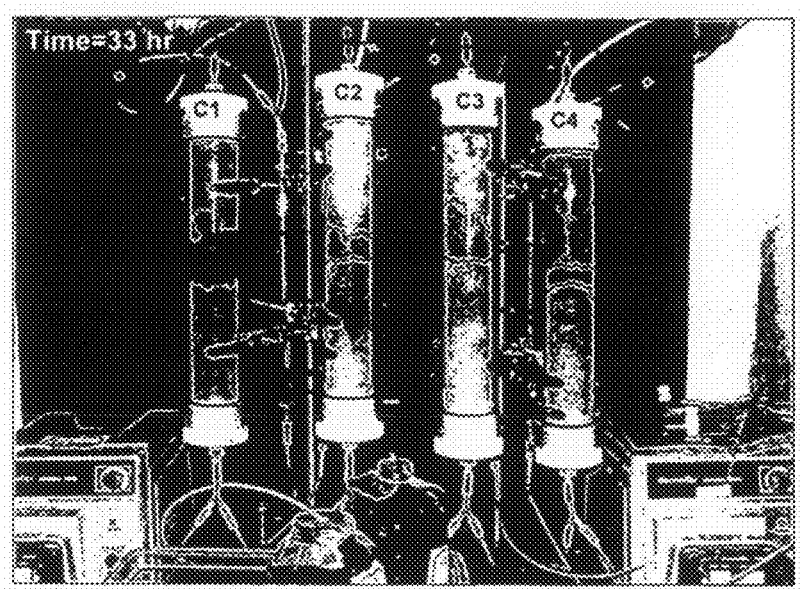
Figure 21F:
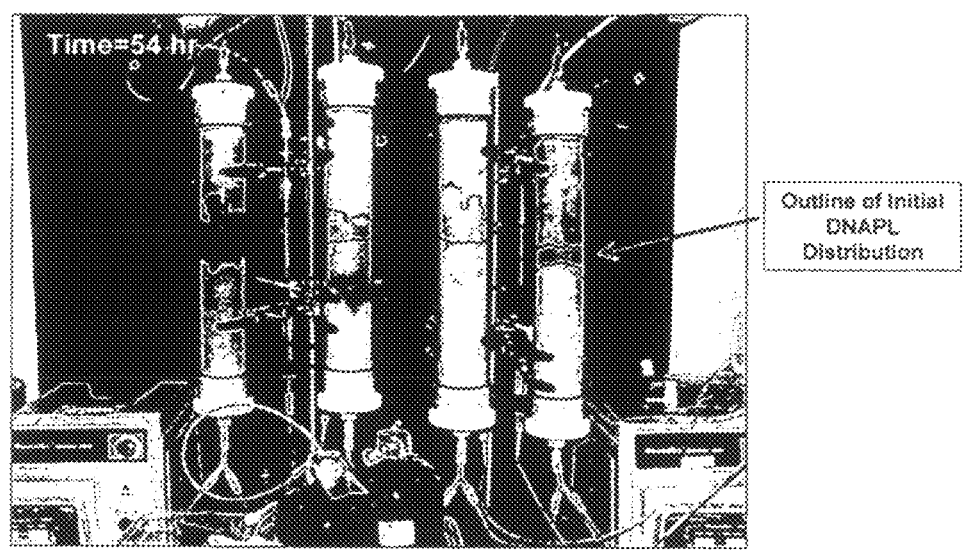

To measure the effects of $H_2O_2$ and $NaHCO_3$ on contaminant, e.g., NAPL, LNAPL, or DNAPL, displacement, an experiment was set up as follows and as shown in FIG. 21a. 950 g of sand and 8 g of DNAPL (MPG) were placed in each of four columns of 30 cm length, 5 cm diameter, and 589 ml volume. Varying amounts of $H_2O_2$ and $NaHCO_3$ were added to each column, along with 10 g/L of VeruSOL. A flow rate of 0.5 ml/min was induced. FIGS. 21b-21f are photos of the experimental set-up at varying time intervals over the course of 54 hours. FIG. 21f shows that after 54 hours of running the experiment, no DNAPL remained in any of the columns containing $H_2O_2$, VeruSOL, and $NaHCO_3$.

Experiment 3

Figure 22A:
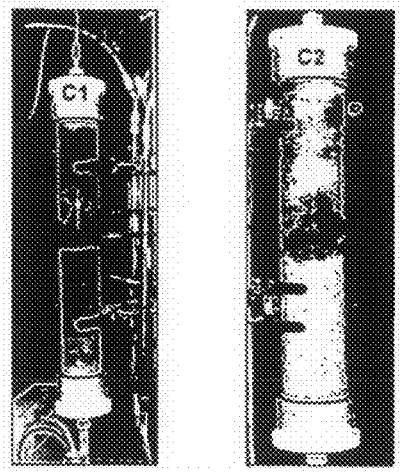
Figure 22B:
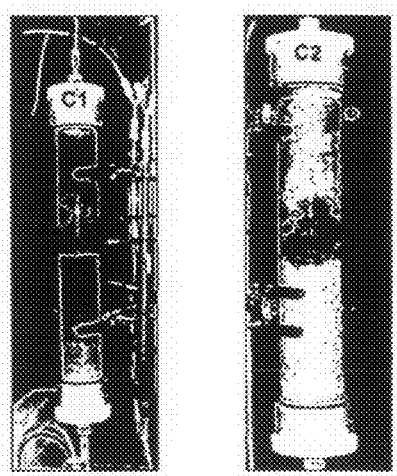
Figure 22C:
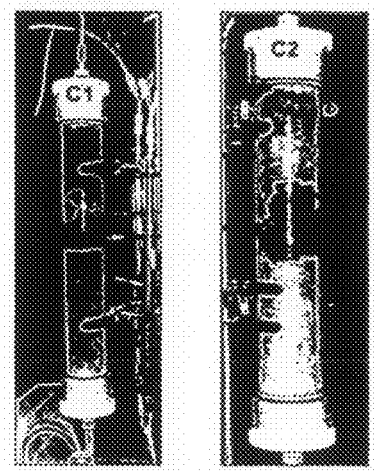
Figure 22D:
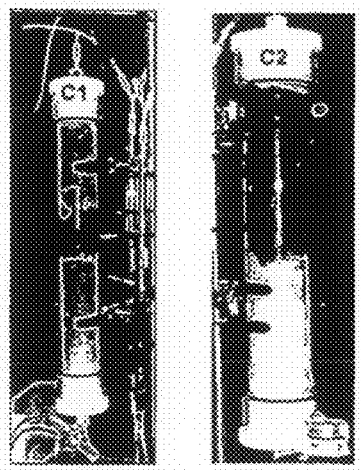
Figure 22E:
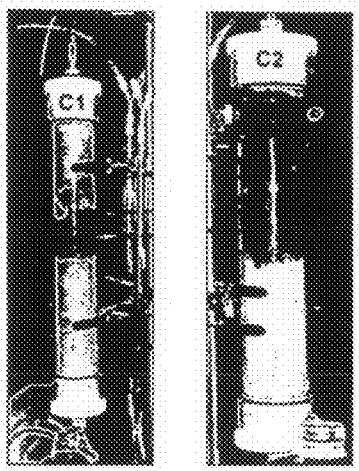
Figure 22F:
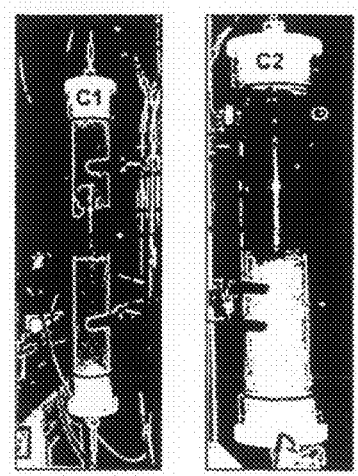

To measure the efficacy of VeruSOL on displacing contaminant, such as a NAPL, LNAPL, or DNAPL, an experiment was set up as follows and as shown in FIG. 22a. As in Example 2, columns were prepared containing sand and DNAPL (MGP). Each column also contained 8% $H_2O_2$ and Fe-NTA (250 mg/L as Fe (iron)), and had a flow rate of 0.5 ml/min. Column 2 had 10 g/L of VeruSOL added to it, while column 1 had no VeruSOL added. FIGS. 22b-22f are photos of the experimental set-up at varying time intervals over the course of 24 hours. FIG. 22f shows that after 24 hours of running the experiment, there was greater DNAPL displacement in column 2.

Example 6: Surfactant Enhanced Product Recovery (SEPR™)

VeruTEK's Surfactant Enhanced Product Recovery (SEPR™) and Surfactant Enhanced In Situ Chemical Oxidation (S-ISCO™) processes can be implemented cost-effectively and safely to extract and destroy soil contaminants, such as hydraulic oil contaminants. Several laboratory tests that were conducted to develop the SEPR™ and S-ISCO™ processes.

The SEPR™ and S-ISCO™ treatment processes can be applied sequentially to remediate a contaminated site. For example, the SEPR™ process can be applied first, in order to reduce the amount of contaminant at the site, for example, in a contaminated subsurface. By extracting the contaminant, the amount of oxidant and of surfactant and/or cosolvent that must be used is decreased, which can result in a decrease of total cost of remediation. In some cases, the extracted contaminant can be recycled or otherwise processed into a useful product, which can be used or sold, further improving the economics of remediation of the site. The S-ISCO™ process can then be applied, to decrease, for example, to destroy, the small amount of contaminant remaining at the site, which may be difficult to extract, for example, because the contaminant is adhered to soil particles. Applying the SEPR™ and S-ISCO™ processes in tandem can result in elimination of 99% of contaminant from a site, for example, a subsurface.

From visual inspection of the soil received from the Site, the LNAPL appeared to be dispersed throughout the soil in small lenses of oil. Significant product thicknesses (~10 feet maximum) were reported over a several year period, and due to the viscosity of the oil, conventional product recovery efforts are ineffective. Soils received from the Site were homogenized and analyzed for volatile organic compounds (VOCs) (EPA Method 8260B), semi-volatile organic compounds (SVOCs) (EPA Method 8270C), polychlorinated biphenyls (PCBs) (EPA Method 8082) and TPH (EPA Method 8100-Modified).

In developing SEPR™ and SISCO™ processes for application to a contaminated site, emulsification tests for initial screening to select and/or develop optimal surfactants and/or cosolvents suitable for emulsifying the contaminant can be performed. Dozens of plant-based or -derived surfactants and cosolvent-surfactant mixtures, were screened for a study motivated by interest in remediating a site in which the soil was contaminated with hydraulic oil (herein, the "Site"). Results of screening by emulsification tests are presented in Table 6. In these emulsification tests 90 g of LNAPL, a defined amount of surfactant, and water were mixed to make a total solution weight of 450 g. Tests were conducted in 500 mL glass jars and were mixed continuously on a shaker table at 120 rpm for 72 hours. After mixing, the samples were removed from the shaker table and were photographed at time intervals to evaluate the stabilization of the emulsions. Because it is desirable for LNAPL emulsion destabilization to facilitate separation of extracted emulsions, these tests include photologging of results, in addition to final analyses of the supernatant phase to assess true solubilization. Additionally, Interfacial Tension Measurement (IFT) and colloid particle size analyses were performed on several of the samples.

For the tests conducted, of which the conditions are shown in Table 6, the samples were placed on a shaker table set at 120 rpm for 72 hours. The In House TPH—Site Lab GRO/DRO (gasoline range organics/diesel range organics) was utilized. The water quality parameters (WQP) were obtained from IFT (interfacial tension) and zeta sizer measurements, and the measurements were recorded at end of 72 hours. The total solution mass for each sample was 450 g. The LNAPL amount for each sample was 90 g. The NaCl concentration was 50 g/L for each sample. The contaminants of concern (COC) were TPH. Photographic documentation was made at the beginning and end of a 72 hour period.

FDA Generally Recognized as Safe (GRAS) VeruTEK proprietary mixtures. Both VeruSOL-9™ and VeruSOL-10™ were capable of near complete emulsification of the hydraulic oil, but were also able to be separated into an oil phase and a supernatant with low Total Petroleum Hydrocarbon (TPH) concentrations in the supernatant. The property of oil emulsification with subsequent emulsification destabilization can be useful in performing extraction with the SEPR™ process.

An objective of laboratory dosage tests is to evaluate the extent of heavy oil/hydraulic oil contaminants of concern (COC) destruction of the Site soil and groundwater using chemical-based reaction mechanisms. The laboratory dosage study can be used to optimize the degradation of target hydraulic fluid COCs in Site soils and contaminated groundwater with VeruTEK's technologies.

In order to evaluate the S-ISCO™ and SEPR™ processes, two sets of soil column tests were conducted. For the first set of (Phase I) tests homogenized Site soil was placing into three columns: 1) A control column with only deionized water passing through the column; 2) A SEPR™ column in which a solution of 4% hydrogen peroxide and 10 g/L of VeruSOL-3™ were simultaneously passed through the column; and 3) a S-ISCO™ column in which a solution of activated persulfate (100 g/L of sodium persulfate with 350 mg/L of Fe-EDTA as Fe) plus 10 g/L of VeruSOL-3™ were simultaneously passed through the column. Experimental conditions for these columns are presented in Table 7.

For the tests conducted, for which conditions are shown in Table 7, the soil columns were packed with contaminated, composited Site soil. The duration of column runs is a minimum of 28 days; however, column 2 was terminated after 2 days as the column appeared to have had LNAPL flushed out. The effluent was collected and composited so that each sampling period represents the entire effluent between sampling periods. The reaction media was 10 inches of contaminated homogenized soil for each sample. The COC was TPH for all samples, and the water quality parameters (WQP) were based on ORP (oxidation reduction potential), pH, temperature, specific conductance, IFT (interfacial tension), and turbidity for all samples. The com-

TABLE 6

LNAPL Emulsification Tests

| Task | Test Conditions[1] | Surfactant | Volume Deionized Water (g) | Reaction Media | Surfactant (g) | LNAPL/ Surfactant Ratio |
|---|---|---|---|---|---|---|
| 5-A1 | Aqueous Control | NONE | 450 | Deionized water | 0 | ∞ |
| 5-A2 | Emulsification | VeruSOL-9 ™ | 350 | Surfactant dosed water | 9 | 10 |
| 5-A3 | Emulsification | VeruSOL-9 ™ | 356 | Surfactant dosed water | 23 | 4 |
| 5-A4 | Emulsification | VeruSOL-9 ™ | 358 | Surfactant dosed water | 45 | 2 |
| 5-A5 | Aqueous Control | NONE | 450 | Deionized water | 0 | ∞ |
| 5-A6 | Emulsification | VeruSOL-10 ™ | 350 | Surfactant dosed water | 9 | 10 |
| 5-A7 | Emulsification | VeruSOL-10 ™ | 356 | Surfactant dosed water | 23 | 4 |
| 5-A8 | Emulsification | VeruSOL-10 ™ | 358 | Surfactant dosed water | 45 | 2 |

From the emulsification screening tests, the surfactants VeruSOL-3™, VeruSOL-9™, and VeruSOL-10™ were found to be suitable. These plant-based surfactants are U.S. pounds addressed in the study were dissolved and sorbed components. The soil column operational specifications are as follows: length 30 cm; diameter=5 cm; volume in mL=589 mL; cross-sectional area=19.63 cm2. At the end of the experiment, the influent was to be terminated and the soil columns sacrificed, homogenized, and analyzed in duplicate for VOCs, SVOCs, PCBs and TPH in the soil. The flow rate was approximately 0.5 mL/min and was measured on a daily basis.

TABLE 7

Phase I - Soil Column Experimental Results

| Task | Test Conditions | VeruSOL-3 ™ Concentration (g/L) | Persulfate/ Activator (g/L) | Sampling Frequencies (days) |
|---|---|---|---|---|
| 3-Col A1 | Control | 0 | NONE | COCs, Time = 1 PV, Day 5, 14, and 28<br>WQPs, Time = 1 PV, Day 1, 2, 3, 5, 7, 14, and 28<br>SCPs, Time = 1 PV, Day 5, 14, and 28 |
| 3-Col A2 | Surfactant Enhanced Product Recovery- SEPR ™ | 10 | Hydrogen Peroxide - 4% | COCs, Time = 1 PV, Day 5, 14, and 28<br>WQPs, Time = 1 PV, Day 1, 2, 3, 5, 7, 14, and 28<br>SCPs, Time = 1 PV, Day 5, 14, and 28 |
| 3-Col A4 | S-ISCO ™ with Alkaline Persulfate | 10 | Persulfate - 100 g/L, High pH activation - pH >10.5 | COCs, Time = 1 PV, Day 5, 14, and 28<br>WQPs, Time = 1 PV, Day 1, 2, 3, 5, 7, 14, and 28<br>SCPs, Time = 1 PV, Day 5, 14, and 28 |

The second (Phase II) set of soil column tests evaluated the use of surfactant alone, screened from the emulsification tests with hydrogen peroxide to reduce hydraulic oil TPH concentrations in the homogenized Site soil. Test conditions for these column tests are described in Table 8. The columns were spiked with 30 g of LNAPL (dyed red with Suidan IV for visual and photographic examination) to simulate the effects of the presence of discrete lenses of LNAPL known to exist in the subsurface at this Site. The two columns used both hydrogen peroxide and VeruSOL-10™, a U.S. FDA GRAS Surfactant. The columns were run for only 3 days. The first column (Task 4-Column A1) was injected with 4% hydrogen peroxide and 10 g/L of VeruSOL-10™, and passed through at approximately 0.5 mL/min. The second column (Task 4-Column A2) was injected with 8% hydrogen peroxide and 25 g/L of VeruSOL-10™, and passed through at approximately 0.5 mL/min. A total of 2 pore volumes were passed through the columns in the 3-day period. Photographs of the soil columns were taken on an hourly basis for the duration of the column runs.

For the tests conducted, for which the conditions are shown in Table 8, the soil columns were packed with contaminated, composited Site soil. The duration of column runs was a minimum of three days. The effluent was collected and composited, so that each sampling period represents the entire effluent between sampling periods. The tests were conducted under surfactant enhanced product recovery (SEPR™) conditions. The reaction media was contaminated homogenized soil (10 inches) for each sample. The COC was TPH for all samples. The water quality parameters (WQP) were determined based on ORP (oxidation reduction potential), pH, temperature, specific conductance, IFT (interfacial tension), and turbidity. The sampling frequencies were as follows: WQP and COC at times of 12 hr, 24 hr, 48 hr, and 72 hr. The compounds addressed were LNAPL, dissolved and sorbed components. The soil column operational specifications were as follows: length=30 cm, diameter=5 cm; volume=589 mL; and cross-sectional area=19.63 cm2. The flow rate was approximately 0.5 mL/min and was measured on a daily basis. At the end of the experiment, the influent was terminated and the soil columns sacrificed, homogenized, and analyzed for TPH in soil.

TABLE 8

Phase II - SEPR ™ Soil Column Experimental Results

| Task | VeruSOL-3 ™ Concentration (g/L) | Hydrogen Peroxide Concentration (%) |
|---|---|---|
| 4-Col A1 | 10 | 4% |
| 4-Col A2 | 25 | 10% |

The soil and LNAPL samples from the Site included two 5 gallon cans containing soil from the Site and approximately 4-gallons of LNAPL. Upon visual examination, one of the 5 gallon containers had free LNAPL floating on the surface of the water on top of the soil in the container. The soil from this container was used for homogenization and characterization. The LNAPL was used in various tests associated with the laboratory dosage study. Composite soil samples were prepared so results of various testing could be reliably compared. The TPH, VOCs, SVOCs and PCBs, as well as moisture content, pH, and Oxidation Reduction Potential (ORP) of the homogenized composite soil was determined. Results of analyses of the homogenized composite Site soil are presented in Table 9. TPH was the predominant analyte detected in the unidentified TPH fraction range at a concentration of 14,000 mg/kg. There were no SVOCs or PCBs detected in the soil. The only VOCs detected in the soil were 1,2,4-trimethylbenzene at 440 µg/kg and naphthalene at 830 µg/kg. Therefore, the great majority of the TPH fraction was not detected in the VOC or SVOC analyses.

TABLE 9

Homogenized Site Soil Analysis Results

| Sample Type | Soil |
|---|---|
| Phoenix ID | AQ49741 |
| VeruTEK ID | 070808-URS-USS-T1-S |
| PARAMETERS | RESULTS |
| % Solid | 70% |
| TOC | — |
| pH | 8.38 |
| ORP (mV) | 162 |
| Conductivity (ms/cm) | 0 |
| VOCs (ug/kg) | VOCs (ug/kg) |
| 1,2,4-Trimethylbenzene | 440 |
| 1,3,5-Trimethylbenzene | RL(<240) |
| Ethylbenzene | RL(<240) |
| Benzene | RL(<240) |
| m&p-Xylene | RL(<240) |
| Naphthalene | 830 |
| o-Xylene | RL(<240) |
| p-Isopropyltoluene | RL(<240) |
| Toluene | RL(<240) |

TABLE 9-continued

Homogenized Site Soil Analysis Results

| Sample Type | Soil |
|---|---|
| Phoenix ID | AQ49741 |
| VeruTEK ID | 070808-URS-USS-T1-S |
| PARAMETERS | RESULTS |
| Trichloroethene | RL(<240) |
| total-xylenes | RL(<240) |
| Total VOCs | 1,270 |

| SVOCs (ug/kg) | SVOCs (ug/kg) |
|---|---|
| 2-Methylnaphthalene | RL(<470) |
| 2,4-Dimethylphenol | RL(<470) |
| 2-Methylphenol (o-cresol) | RL(<470) |
| 3&4-Methylphenol (m&p-cresol) | RL(<470) |
| Acenaphthene | RL(<470) |
| Acenaphthylene | RL(<470) |
| Anthracene | RL(<470) |
| Benz(a)anthracene | RL(<470) |
| Benzo(a)pyrene | RL(<470) |
| Benzo(b)fluoranthene | RL(<470) |
| Benzo(ghi)perylene | RL(<470) |
| Benzo(k)fluoranthene | RL(<470) |
| Bis(2-ethylhexyl)phthalate | RL(<470) |
| Chrysene | RL(<470) |
| Dibenz(a,h)anthracene | RL(<470) |
| Dibenzofuran | RL(<470) |
| Fluoranthene | RL(<470) |
| Fluorene | RL(<470) |
| Indeno(1,2,3-cd)pyrene | RL(<470) |
| Naphthalene | RL(<470) |
| Pentachlorophenol | RL(<470) |
| Phenanthrene | RL(<470) |
| Phenol | RL(<470) |
| Pyrene | RL(<470) |
| Total SVOCs | 0 |

| PCB (ug/kg) | PCB (ug/kg) |
|---|---|
| PCB-1016 | RL(<470) |
| PCB-1221 | RL(<470) |
| PCB-1232 | RL(<470) |
| PCB-1242 | RL(<470) |
| PCB-1248 | RL(<470) |
| PCB-1260 | RL(<470) |
| PCB-1262 | RL(<470) |
| PCB-1268 | RL(<470) |
| Total | 0 |

| TPH (mg/kg) | TPH (mg/kg) |
|---|---|
| Fuel Oil #2/Diesel Fuel | RL(<770) |
| Fuel Oil #4 | RL(<770) |
| Fuel Oil #6 | RL(<770) |
| Kerosene | RL(<770) |
| Motor Oil | RL(<770) |
| Other Oil (Cutting & Lubricating) | RL(<770) |
| Unidentified | 14,000 |
| Total | 14,000 |

LNAPL Emulsification and Oxidation Results
Emulsification Tests (Screening Tests):

Screening emulsification tests were conducted on more than 75 surfactant or cosolvent-surfactant mixtures with deionized water and LNAPL obtained from the Site. FIG. 23 shows the emulsification screening results. FIG. 23 indicates that the hydraulic oil based LNAPL present at this Site is readily emulsified by a subset of the surfactants tests, enabling physical removal using plant-based environmentally friendly surfactants. The photographs shown in FIG. 23 were taken more than 24 hours after a 72 hour mixing period on a shaker at 120 rpm. The screening tests were conducted using 1 mL of LNAPL from the Site, 4 mL deionized water and 250 µL surfactant, resulting in approximately 4:1 ratio by volume of LNAPL to surfactant.

Emulsification Tests (Task 5-A):

Emulsification tests (Task 5-A) were conducted using two surfactants (VeruSOL-9™ and VeruSOL-10™) and the LNAPL from the Site. Each of these surfactants is U.S. FDA GRAS. Each surfactant was tested in flasks with a total solution mass of 450 g, consisting of 90 g of Site LNAPL and the remainder surfactant (varying from 0 g to 45 g added to the solution). FIGS. 24, 25, and 26 show the stability of the emulsion in a series of photographs taken 5, 30 and 60 minutes after removal from the shaker table. The results presented in the photographs indicate that the emulsions will significantly separate quiescently, important in aboveground separation and treatment of the emulsions.

After three days of settling, the emulsion supernatant was analyzed for IFT, particle size and TPH to determine the properties of the emulsions. Results of the IFT and TPH analyses are presented in Table 10. For both the experiments performed with VeruSOL-9™ and VeruSOL-10™, it can be seen that the IFT decreases with increased VeruSOL™ concentrations and the TPH concentrations increase correspondingly. The solubilization of the LNAPL from this Site increases linearly with respect to concentration of VeruSOL-10™ from a concentration of 118.5 mg/L in the aqueous control (without surfactant) to 1,649 mg/L at a surfactant concentration of 100 g/kg. Increased solubility of the LNAPL TPH for both VeruSOL™ mixtures can be seen in FIG. 27.

TABLE 10

VeruSOL ™ Emulsification Tests Results

| Sample ID | Sample Type | Surfactant Type | Temp. (° C.) | IFT (mN/m) | VeruSOL (mg/L) | Particle Size (d · nm) | TPH (DRO) (ppm) |
|---|---|---|---|---|---|---|---|
| 5-A1 | Aqueous Control | None | 21.9 | 78.0 | 0 | 1953 | 186.85 |
| 5-A2 | Solubilization | VeruSOL-9 ™ | 21.8 | 39.0 | 20 | 474.6 | 761 |
| 5-A3 | Solubilization | VeruSOL-9 ™ | 22 | 40.0 | 50 | 1284 | 986 |
| 5-A4 | Solubilization | VeruSOL-9 ™ | 22.3 | 39.1 | 100 | 247.4 | 1369 |
| 5-A5 | Aqueous Control | None | 22.3 | 69.3 | 0 | 353.5 | 118.5 |

TABLE 10-continued

VeruSOL ™ Emulsification Tests Results

| Sample ID | Sample Type | Surfactant Type | Temp. (° C.) | IFT (mN/m) | VeruSOL (mg/L) | Particle Size (d · nm) | TPH (DRO) (ppm) |
|---|---|---|---|---|---|---|---|
| 5-A6 | Solubilization | VeruSOL-10 ™ | 22.5 | 37.8 | 20 | 22.09 | 471 |
| 5-A7 | Solubilization | VeruSOL-10 ™ | 22.6 | 38.1 | 50 | 131.9 | 956 |
| 5-A8 | Solubilization | VeruSOL-10 ™ | 22.7 | 38.9 | 100 | 3523 | 1649 |

The results of solubilization tests impacted colloid size distributions in the supernatant. In the aqueous control experiment (Task 5-A5), 90 g of Site LNAPL was mixed with water, placed on a shaker for 72 hours, followed by three days of quiescent settling. (The aqueous phase supernatant particle size distribution was 90 g LNAPL with 360 g water.) FIG. 28 demonstrates aqueous control with site LNAPL and colloid particle size distribution. The supernatant from this sample was analyzed for particle size distribution and the results can be found in FIG. 28. Examination of FIG. 28 reveals a binomial distribution of colloids in the control sample with average particle sizes of 36.9 nm and 442 nm. Particle size distribution in the settled supernatant was also analyzed for the three VeruSOL-10™ concentrations used to investigate the emulsion and solubilization of the Site LNAPL.

FIG. 29 shows colloid particle size distribution with VeruSOL-10™ at 20 g/kg. The particle size for the 20 g/kg VeruSOL-10™, 5-A7, is not nearly as bimodal as in the control sample, with an average particle size of 13.1 nm. The data shown represent the particle size distribution obtained with aqueous phase supernatant (90 g LNAPL with 360 g water) with 20 g VeruSOL-10™ in total of 450 g solution. The light scattering intensity of the VeruSOL-10™ peak varies from 15% to 20%, whereas the intensity of the smaller size fraction in the aqueous-LNAPL control was only ~2.5%. This demonstrates that VeruSOL-10™ not only increases the colloid concentration but also decreases the colloid particle size.

Examination of FIGS. 30 and 31, using VeruSOL-10™ at concentrations of 50 g/kg and 100 g/kg, respectively, showed the same trends of colloid particle size distribution with decreasing particle sizes of 11.10 nm and 9.4 nm. The data shown represent the particle size distribution for the aqueous phase supernatant (90 g LNAPL with 360 g water) with 50 g (for FIG. 30) or 100 g (for FIG. 31), respectively, of VeruSOL-10™ in total of 450 g solution. The intensity of the light scattering greatly increased (to 45% to 50%) at the 100 g/kg VeruSOL-10™ concentration. These results indicate that the groundwater at the Site likely does contain colloids with TPH. Furthermore, the addition of VeruSOL-10™ increases TPH concentrations in the settled supernatant, decreases particle size of the colloids, and increases intensity of the light scattering intensity of the colloids, indicating an increased colloid concentration.

S-ISCO™ and SEPR™ Soil Column Experiments

Two sets of soil column tests were conducted on the homogenized Site soil that was characterized for all of the tests. The first set of column tests that were run consisted of a control column, a SEPR™ column, and a S-ISCO™ column with experimental conditions described in Table 7. The first column was a control column with approximately 1 kg of Site soil that was flushed with deionized water at a flowrate of approximately 0.5 mL/min. During the 27-day column run, effluent samples were collected 5 times and analyzed for pH, ORP, IFT, electrolytic conductivity, turbidity and TPH. A total volume eluted from the column was 18.7 liters. Results of the control soil column test are found in Table 11. TPH concentrations in the column effluent were quite consistent, with a range varying from 33.4 mg/L to 39.8 mg/L. These concentrations are lower than those at equilibrium with a pure LNAPL phase as reported in the control samples associated with the emulsification/solubilization tests, at 186.85 mg/L and 118.5 mg/L. While there was hydraulic oil LNAPL visibly present in the soil columns, the solubilization of the oil constituents into the water passing through the columns was mass transfer limited, in comparison to the equilibrium results from the batch tests. IFT measurements in the control column varied from 67.5 mN/m to 77.6 mN/m. Typical water IFT values at room temperature are approximately 72 mN/m. Upon sacrificing and compositing soil in the control column, the TPH concentration was reported to be 11,000 mg/kg. This compares well to initial TPH concentration in the homogenized soil of 14,000 mg/kg.

For the tests conducted, for which the results are shown in Table 11, the soil columns were packed with contaminated, composited Site soil. The final Soil TPH Concentration was 11,000 mg/kg for Table 11.1, 2,600 mg/kg for Table 11.2, and 3,300 mg/kg for Table 11.3. Abbreviations: cum. vol.=cumulative volume, temp.=temperature, electr. cond.=electrolytic conductivity, turb.=turbidity, hydr. perx.=hydrogen peroxide; Na perslf.=sodium persulfate.

TABLE 11.1

Soil Column Results for Control, SEPR ™ and S-ISCO ™ Tests: Task 3- Column-1 - Aqueous Control Column - Homogenized Site Soil

| Date | flow rate (mL/min) | cum. vol. (mL) | pH | ORP (mV) | IFT (mN/m) | temp. (° C.) | electr. cond. (mS/cm) | turb. (NTU) | TPH, D/M (ppm) | TPH, GRO (ppm) | total TPH (mg/kg) |
|---|---|---|---|---|---|---|---|---|---|---|---|
| 10-Jul | 0.48 | 687 | 8.16 | 312.0 | 67.5 | 22.7 | 0.83 | 6.7 | 27.80 | 12.00 | 39.8 |
| 11-Jul | 0.55 | 1476 | 6.97 | 246.0 | 71.6 | 22.6 | 0.51 | 11.6 | 20.50 | 17.50 | 38 |
| 16-Jul | 0.63 | 4702 | 7.33 | 304.0 | 77.6 | 21.5 | 0.22 | 2.5 | 21.80 | 13.00 | 34.8 |

TABLE 11.1-continued

Soil Column Results for Control, SEPR ™ and S-ISCO ™ Tests: Task 3- Column-1 - Aqueous Control Column - Homogenized Site Soil

| Date | flow rate (mL/min) | cum. vol. (mL) | pH | ORP (mV) | IFT (mN/m) | temp. (° C.) | electr. cond. (mS/cm) | turb. (NTU) | TPH, D/M (ppm) | TPH, GRO (ppm) | total TPH (mg/kg) |
|---|---|---|---|---|---|---|---|---|---|---|---|
| 25-Jul | 0.64 | 10307 | 7.67 | 550.0 | 63.9 | 22.2 | 0.09 | 334.0 | 26.90 | 6.50 | 33.4 |
| 6-Aug | 0.60 | 18669 | 7.94 | 504.0 | 70.3 | 24.3 | 0.17 | 104.0 | 20.85 | 12.50 | 33.35 |

The second column was a SEPR™ column with approximately 1 kg of Site soil that was flushed with a solution of 4% hydrogen peroxide and 10 g/L of VeruSOL-3™ at a flowrate of 0.5 mL/min. During the first hours of the column run, it was observed that the hydraulic oil was physically pushed up and out of the column, which is the object of the SEPR™ process. During the 108-hour (4.5 day) column run, column effluent samples were collected 5 times and analyzed for pH, ORP, IFT, electrolytic conductivity, turbidity and TPH. At the end of the experiment, the soil column was sacrificed by extruding the soil from the column, homogenized and then sent to a third-party laboratory for chemical analysis for TPH. During the column run the IFT measurement in the column effluent decreased from 72 mN/m (ambient condition) to 46.1 mN/m, indicating the activity of the VeruSOL-3™ to emulsify the LNAPL. Additionally, the turbidity of the effluent from this column increased from 12.57 NTU to greater than 1,100 NTU at the end of the experiment. Column effluent Total TPH concentrations which were initially 120.6 mg/L increased to a maximum of 1331.5 mg/L during the third day of treatment. The effluent TPH values decreased after the third day of the column run to 306.0 mg/L. The column effluent ORP values were moderate in the range of 2693 mV to 369 mV. Upon sacrificing and compositing soil in the column, the TPH concentration was reported to be 2,600 mg/kg.

The third column was a S-ISCO™ column with approximately 1 kg of Site soil that was flushed with a solution of 100 g/L of sodium persulfate activated with 350 mg/L of Fe-EDTA as Fe and 10 g/L of VeruSOL-3™ at a flowrate of approximately 0.5 mL/min. During the 27-day column run, the IFT measurement in the column effluent decreased from 72 mN/m (ambient condition) to 31.8 mN/m, indicating the activity of the VeruSOL-3™ to emulsify the LNAPL. Additionally, the turbidity of the effluent from this column increased from an initial value of 30.05 NTU to a maximum of >1,100 NTU. The Total TPH concentrations which were initially 54.9 mg/L, increased to a maximum of 740.9 mg/L during the second day of treatment. The effluent TPH values decreased after the second day of the column run. Also of note in this column test was that the persulfate rapidly broke through the column within the first day of treatment indicating only a moderate consumption of the persulfate. Similarly, the ORP values in the column effluent were all high and in the range of 543 mV to 686 mV. At the end of the experiment, the soil column was sacrificed by extruding the soil from the column, homogenized and then sent to a third-party laboratory for chemical analysis for TPH. Upon sacrificing and compositing soil in the control column, the TPH concentration was reported to be 3,300 mg/kg.

TABLE 11.2

Soil Column Results for Control, SEPR ™ and S-ISCO ™ Tests: Task 3 Column-2 - SEPR ™ Column- Hydrogen Peroxide at 4%, VeruSOL-3 ™ at 10 g/L

| Date | flow rate (mL/min) | cum. vol. (mL) | pH | ORP (mV) | IFT (mN/m) | temp. (° C.) | electr. cond. (mS/cm) | turb. (NTU) | hydr. perx. (g/L) | TPH, D/M (ppm) | TPH, GRO (ppm) | total TPH (mg/kg) |
|---|---|---|---|---|---|---|---|---|---|---|---|---|
| 10-Jul | 0.30 | 200 | 6.72 | 279 | 62.1 | 23.0 | 1.64 | 12.57 | 0.20 | 103.1 | 17.5 | 120.6 |
| 11-Jul | 0.20 | 503 | 5.73 | 369 | 49.4 | 21.1 | 1.67 | 736.6 | 0.27 | 246.5 | 21.5 | 268 |
| 12-Jul | 0.47 | 1,179 | 5.03 | 360 | 46.2 | 23.0 | 3.77 | >1100 | 0.27 | 1278 | 53.5 | 1331.5 |
| 13-Jul | 0.42 | 1,778 | 5.14 | 351 | 46.1 | 22.8 | 4.29 | >1100 | 0.27 | 258.00 | 48.0 | 306 |
| 14-Jul | 0.45 | 2,428 | 5.26 | 367 | 49.3 | 23.1 | 5.41 | >1100 | 0.27 | | | |

TABLE 11.3

Soil Column Results for Control, SEPR ™ and S-ISCO ™ Tests: Task 3 Column-4 - S-ISCO ™ Column-Sodium Persulfate at 100 g/L, Fe-EDTA 350 mg/L as Fe, and VeruSOL-3 ™ at 10 g/L

| Date | flow rate (mL/min) | cum. vol. (mL) | ORP (mV) | IFT (mN/m) | temp. (° C.) | electr. cond. (mS/cm) | turb. (NTU) | Fe-EDTA (mg/L as Fe) | Na perslf. (g/L) | TPH, D/M (ppm) | TPH, GRO (ppm) | total TPH (mg/kg) |
|---|---|---|---|---|---|---|---|---|---|---|---|---|
| 10-Jul | 0.58 | 831 | 606 | 46.1 | 22.5 | 43.43 | 30.05 | 23.72 | 99.6 | 38.4 | 16.5 | 54.9 |
| 11-Jul | 0.64 | 1,750 | 607 | 36.3 | 22.4 | 68.8 | 551.7 | 23.56 | 95.2 | 689.4 | 51.5 | 740.9 |
| 16-Jul | 0.74 | 5,763 | 543 | 39.9 | 20.90 | 62.22 | 15.12 | 24.84 | 78.8 | 124 | 10.5 | 134.5 |

TABLE 11.3-continued

Soil Column Results for Control, SEPR ™ and S-ISCO ™ Tests: Task 3 Column-4 -
S-ISCO ™ Column-Sodium Persulfate at 100 g/L, Fe-EDTA 350 mg/L as Fe, and VeruSOL-3 ™ at 10 g/L

| Date | flow rate (mL/min) | cum. vol. (mL) | ORP (mV) | IFT (mN/m) | temp. (° C.) | electr. cond. (mS/cm) | turb. (NTU) | Fe-EDTA (mg/L as Fe) | Na perslf. (g/L) | TPH, D/M (ppm) | TPH, GRO (ppm) | total TPH (mg/kg) |
|---|---|---|---|---|---|---|---|---|---|---|---|---|
| 25-Jul | 0.58 | 12,579 | 635 | 31.8 | 22.40 | 63.20 | >1100 | | | 405.9 | 31.5 | 437.4 |
| 6-Aug | 0.53 | 21,824 | 686 | 39.8 | 25.10 | 65.22 | >1100 | | 101.2 | 135.5 | 103.0 | 238.5 |

A comparison of the final post-treatment TPH concentrations in the soils from the sacrificed columns is presented graphically in FIG. 32. From the graph, it can be seen that soil TPH concentrations decreased the most for the SEPR™ column treatment (81%) only after 4.5 days of treatment. For the S-S-ISCO™ column, the percent reduction was 76.4% after 27 days of treatment.

Phase-II SEPR™ Columns

The second (Phase II) set of soil column tests evaluated the use of SEPR™ using VeruSOL-10™ screened from the emulsification tests alone with hydrogen peroxide to reduce hydraulic oil TPH concentrations in the homogenized Site soil spiked with red dyed LNAPL hydraulic oil obtained from the Site. Test conditions for these two column runs were similar to the Phase I SEPR™ column experiments except that the columns were spiked with 30 g of LNAPL to simulate the effects of the presence of discrete lenses of LNAPL known to exist in the subsurface at this Site. The two columns used both hydrogen peroxide and VeruSOL-10™, a U.S. FDA GRAS Surfactant. The columns were run for three days.

Effluent from the columns was sampled four times for volume of LNAPL recovered from the column as a separate phase liquid. Additionally, IFT, particle size, TPH in the diesel range and TPH in the gasoline range were also analyzed in the aqueous effluent four times during the three day column runs. Upon completion of the tests, the columns were sacrificed, homogenized and sent to a third party laboratory for TPH analysis.

Based on the analysis of the homogenized Site soil used in these column tests, each column had 10.6 g of TPH associated with the soil. Each column also received 30 g of the LNAPL from the Site, for a total initial TPH mass of 40.6 g of TPH. Column 1 had a total mass of 755.5 g soil added and Column 2 had 756.8 g of soil. Therefore, with the added LNAPL Column 1 had an initial TPH concentration of 53.74 g/kg (~5.4%) and Column 2 had an initial TPH concentration of 53.65 (~5.4%).

Similar to the Phase I SEPR™ column, these two columns were observed to have the LNAPL physically pushed up the column and into the effluent sampling container. At the sampling intervals noted for Table 8, the volume of LNAPL product recovered and effluent chemistry parameter measurements were recorded. Results from these two column experiments are presented in Table 12. Photographic evidence of the hydraulic oil removal from the soil columns, as shown in SEPR™ Column Photos, also confirms the quantitative results and indicates that the bulk of the LNAPL was pushed up and out of the columns within 5 hours of the column runs. In Tables 12.1 and 12.2 the abbreviations used are as follow: cum. vol.=cumulative volume; recv.=recovered; sol.=solution; temp.=temperature; part.=particle; and surf. vol.=surface volume.

TABLE 12.1

Soil Column Results for Phase II SEPR ™ Soil Column Experiments: Task
4 - Column 1 - SEPR ™ Column - Hydrogen Peroxide at 4% and VeruSOL-10 ™ at 10 g/L

| date | flow rate (mL/min) | run hour (hr) | run vol. (mL) | cum. vol. (mL) | LNAPL recv. | IFT (mN/m) | temp (° C.) | part. Size (d nm) | TPH, D/M (ppm) | TPH, GRO (ppm) | total TPH (mg/kg) | mass LNAPL in sol. (g) | mass LNAPL recv. (g) | Total LNAPL (g) |
|---|---|---|---|---|---|---|---|---|---|---|---|---|---|---|
| 13-Aug | 0.54 | 12 | 390 | 390 | 10 | 61.5 | 22.5 | 1001 | 1154 | 78.5 | 1232.5 | 0.45 | 8.70 | 9.15 |
| 14-Aug | 1.14 | 12 | 430 | 820 | 10 | 72.7 | 22.5 | 350.7 | 266 | 32 | 298 | 0.22 | 8.70 | 8.92 |
| 14-Aug | 1.08 | 24 | 740 | 1560 | 10 | 67.3 | 22.7 | 102.2 | 377 | 39 | 416 | 0.59 | 8.70 | 9.29 |
| 15-Aug | 1.81 | 24 | 1050 | 2610 | 5 | 59.7 | 23.1 | 200.8 | 444.8 | 39 | 483.8 | 1.16 | 4.35 | 5.51 |
| | | | | | | | | | | | Totals | 2.42 | 30.45 | 32.87 |

TABLE 12.2

Soil Column Results for Phase II SEPR ™ Soil Column Experiments: Task
4 - Column 2 - SEPR ™ Column - Hydrogen Peroxide at 8% and VeruSOL-10 ™ at 25 g/L

| date | flow rate (mL/min) | run hour (hr) | run vol. (mL) | cum. vol. (mL) | LNAPL surf. vol. (mL) | IFT (mN/m) | temp. (° C.) | part size (d nm) | TPH, D/M (ppm) | TPH, GRO (ppm) | total TPH (mg/kg) | mass LNAPL in sol. (g) | mass LNAPL recv. (g) | total LNAPL (g) |
|---|---|---|---|---|---|---|---|---|---|---|---|---|---|---|
| 13-Aug | 0.40 | 12 | 290 | 290 | 10 | 64.9 | 22.5 | 3616 | 1137 | 71.5 | 1208.5 | 0.33 | 8.70 | 9.03 |
| 14-Aug | 0.48 | 12 | 345 | 635 | 5 | 67.8 | 22.6 | 1592 | 262.5 | 25 | 287.5 | 0.17 | 4.35 | 4.52 |

TABLE 12.2-continued

Soil Column Results for Phase II SEPR™ Soil Column Experiments: Task
4 - Column 2 - SEPR™ Column - Hydrogen Peroxide at 8% and VeruSOL-10™ at 25 g/L

| date | flow rate (mL/min) | run hour (hr) | run vol. (mL) | cum. vol. (mL) | LNAPL surf. vol. (mL) | IFT (mN/m) | temp. (° C.) | part size (d nm) | TPH, D/M (ppm) | TPH, GRO (ppm) | total TPH (mg/kg) | mass LNAPL in sol. (g) | mass LNAPL recv. (g) | total LNAPL (g) |
|---|---|---|---|---|---|---|---|---|---|---|---|---|---|---|
| 14-Aug | 0.52 | 24 | 750 | 1385 | 20 | 69.1 | 22.7 | 1555 | 2048.5 | 84.5 | 2133 | 2.84 | 17.40 | 20.24 |
| 15-Aug | 0.73 | 24 | 1050 | 2435 | 3 | 74.1 | 22.6 | 1632 | 940 | 69 | 1009 | 2.29 | 2.61 | 4.90 |
| | | | | | | | | | | | Total | 5.62 | 33.06 | 38.68 |

Results for Column 1 with 4% hydrogen peroxide and 10 g/L VeruSOL-10™ indicate that a total of 2.42 g TPH eluted from the column associated with the aqueous phase. The mass of LNAPL recovered as a separate phase was 30.45 g. Therefore, the total LNAPL extracted from the column in either as a separate phase liquid or in the aqueous phase was 32.87 g. Considering that 40.6 g of TPH was initially present in the column this represents a LNAPL removal efficiency of 81.00% based on mass of LNAPL extracted alone. Based on the sacrificed and homogenized soil TPH concentrations measured by the third party laboratory, the remaining concentration of TPH in the soil was 9,500 mg/kg. When comparing the initial concentration in the soil before SEPR™ treatment of 40,600 mg/kg, there was 82.30% removal of TPH in the soil, which is shown in FIG. 33. Therefore, the percent removal of TPH from the soil in Column 1 was very close based on either method used. Based on the mass of TPH extracted from the soil in both aqueous and separate phases, the percent removal calculated was 78.49%. Based on the mass of TPH remaining in the soil, the percent removal was 82.30%.

Results for Column 2 with 8% hydrogen peroxide and 25 g/L VeruSOL-10™ indicate that a total of 5.62 g TPH eluted from the column associated with the aqueous phase. This is more than twice the mass of TPH eluting from Column 2 in comparison to Column 1. Given that the VeruSOL-10™ concentration was more than twice in Column 2 than in Column 1, the increased aqueous phase TPH mass eluting was expected. The mass of LNAPL recovered as a separate phase from Column 2 was 33.06 g, only slightly greater than in Column 1. The total LNAPL extracted from Column 2 as either a separate phase liquid or in the aqueous phase was 38.68 g, which is almost 5 g greater than observed with Column 1. Considering that 40.6 g of TPH was initially present in the column this represents a LNAPL removal efficiency of 95.27% based on mass of LNAPL extracted alone. Based on the sacrificed and homogenized soil TPH concentrations measured by the third party laboratory the remaining concentration of TPH in the soil was 11,000 mg/kg. When comparing the initial concentration in the soil before SEPR™ treatment of 40,600 mg/kg, there was 72.9% removal of TPH in the soil, which is shown in FIG. 33. The percent removal TPH from the soil in Column 2 revealed approximately 10% difference depending on whether the calculation was based on the mass of TPH extracted from the soil in both aqueous and separate phases or the mass of TPH remaining in the soil. Sources of the difference in these estimates could be variation in the initial soil concentration, given the observed variability in the lenses of hydraulic oil present in the homogenized soil.

The results of analyses of the homogenized composite Site soil indicated that TPH was the predominant analyte detected in the unidentified TPH fraction range at a concentration of 14,000 mg/kg. There were no SVOCs or PCBs detected in the soil. The only VOCs detected in the soil were 1,2,4-trimethylbenzene at 440 µg/kg and naphthalene at 830 µg/kg. Therefore, the great majority of the TPH fraction present in the soils is not detected in the VOC or SVOC analyses. Based on screening level tests used to evaluate candidate plant-based surfactants capable of emulsifying the hydraulic oil, VeruSOL-9™ and VeruSOL-10™, mixtures of U.S. FDA Generally Recognized as Safe (GRAS) surfactants, were selected for additional emulsification tests. These tests indicated that both VeruSOL-9™ and VeruSOL-10™ were capable of near complete emulsification of the hydraulic oil, but were also able to be separated into an oil phase and a supernatant with low Total Petroleum Hydrocarbon (TPH) concentrations in the supernatant. The property of oil emulsification with subsequent emulsification destabilization is an important property for extraction with the SEPR™ process. With VeruSOL-3™, a mixture of plant-based cosolvents and surfactants, for soil column tests using soils obtained from the Site, 81% reduction of TPH was feasible using the SEPR™ process after only 4.5 days of treatment. Using the S-ISCO™ process alone, a 76% reduction of TPH was achieved. TPH concentration reductions from 14,000 mg/kg to 2,600 mg/kg and 3,300 mg/kg were attained using SEPR™ and S-ISCO™ processes, respectively. Additional SEPR™ soil column tests were performed to develop field design parameters using hydraulic oil spiked soils from the Site. Two doses of hydrogen peroxide and VeruSOL-10™ were tested. The Site soils were spiked with 30 g of hydraulic oil during packing of the soil columns and resulted in concentration of 5.4% by weight TPH (54 g oil/kg soil). Using the SEPR™ process, these hydraulic oil saturated soil columns were successfully remediated with TPH removal efficiencies of 78.5% to 89.0%, depending on treatment conditions after 3 days. Of the 40.6 g mass of TPH initially present in each of the soil columns, 31.87 g of LNAPL was removed using 4% hydrogen peroxide and 10 g/L VeruSOL-10™ and 36.17 g of LNAPL was removed using 8% hydrogen peroxide and 25 g/L VeruSOL-10™. Photographic evidence of the hydraulic oil removal from the soil columns, shown in FIG. 34, also confirmed the quantitative results and indicated that the bulk of the LNAPL was pushed up and out of the columns within 5 hours of the column runs. Both SEPR™ and S-ISCO™ treatment processes were effective at treating the hydraulic oil LNAPL contaminated soils from the Site. Based on the effective extraction and recovery of the hydraulic oil observed in the laboratory dosage study, the SEPR™ process is predicted to initially extract the majority of the hydraulic oil present in the subsurface at the Site. Following the initial SEPR™ product extraction application at the Site, the remaining hydraulic oil contaminated soils can be treated using the S-ISCO™ process to meet remediation goals.

Results from the emulsification tests indicated that VeruSOL-10™ was the best performing surfactant mixture for the SEPR™ extraction proposed for the Site. For example, the SEPR™ process can be applied using a VeruSOL-10™ concentration in the range of 10 g/L to 25 g/L and a hydrogen peroxide concentration range varying from 4% to 8%. The S-ISCO™ process can use a sodium persulfate concentration range in the 50 g/L to 100 g/L, for example, following the application SEPR™ process.

The SEPR™ and S-ISCO™ processes can be applied as part of a comprehensive remediation plan to remediate a contaminated site. Such a plan can include mobilization, set-up, pre-injection monitoring, SEPR™ chemical injections and extraction, S-ISCO™ chemical injections, post injection-monitoring, and demobilization.

Monitoring can be conducted before, during, and after the chemical injections and SEPR™ and S-ISCO™ operations. Pre-injection monitoring can begin during the set-up phase. During the injection process both process and performance monitoring can be conducted. This monitoring can be used to evaluate the site conditions, and movement of injected chemicals. Following the completion of the SEPR™ and S-ISCO™ processes, post-injection soil and groundwater samples can be collected as confirmation of project completion. The post-injection soil and groundwater samples can be collected after completion of performance monitoring. The performance monitoring can be conducted periodically, for example, for one to three months after the injection phases.

Example 7: Study of Treatment of Number 6 Oil in Soil Columns

In a study, soil column tests were conducted on Number 6 oil contaminated soils. The tests included an initial product extraction phase followed by a surfactant enhanced chemical oxidation. Table 13 discloses the concentrations of TPH diesel and motor oil range (D/M) before and after treatment with surfactant enhanced product recovery (SEPR) process followed by surfactant enhanced in situ chemical oxidation (S-ISCO) processes for the Number 6 fuel oil contaminated soil.

TABLE 13

| | | TPH D/M (mg/kg) | | |
|---|---|---|---|---|
| Column ID. | Treatment Conditions | Un-treated soil | Post-treated soil | Post-treated soil (Dup) |
| Column 7 | Stage 1 (Surfactant enhanced recovery): VSOL-3 (25 g/L) + HP (4%-2%) for 22 days Stage 2 (S-ISCO): VSOL-3 (10 g/L) with 50 g/L SP at pH >12 for 13 days | 68,796 | 146 | 198 |
| Column 9 | Stage 1 (Surfactant enhanced recovery): VSOL-3 (25 g/L) + CHP (2%-4%) for 16 days Stage 2(S-ISCO): VSOL-3 (10 g/L) with 50 g/L SP at pH >12 for 16 days | 68,796 | 9.9 | 13.0 |

FIG. 35 shows a comparison of soil column surfactant enhanced product recovery (SEPR™) using hydrogen peroxide and using catalyzed hydrogen peroxide.

FIG. 36 presents a photograph of a soil column to which the SEPR™ process is being applied. The column is packed with 8 grams of No. 6 oil, has 8% HP, includes 10 g/L VeruSOL, and possesses the influent flow rate of 0.6 ml/min.

Some benefits of facilitated recovery or surfactant-enhanced product recovery (SEPR™) are as follow. In the SEPR™ method a combination of hydrogen peroxide and VeruSOL™ is administered to a contaminated soil. The hydrogen peroxide can be delivered at low concentrations, for example, from about 2% to about 8%, and oxygen microbubbles resulting from the decomposition of the hydrogen peroxide help loosen and release contaminant (product) from soil particles. The action of the VeruSOL™ decreases the interfacial tension for easy recovery of the contaminant (product).

Example 8: Comparison of Treatment of Contaminated Soil with Hydrogen Peroxide to Treatment with Hydrogen Peroxide and VeruSOL™

Comparison of treatment of manufactured gas plant (MGP) non-aqueous phase liquid (NAPL) contaminated soil by catalyzed hydrogen peroxide (CHP) (left photograph) to SEPR™ (right photograph) is shown in FIG. 37. The C1 (CHP) column, on the left, is treated with a solution of 8% hydrogen peroxide and 250 mg/L Fe-NTA at total flow rate of 0.5 ml/min. The C2 (CHP with VeruSOL-3™) column, on the right, is treated with a solution of 8% hydrogen peroxide, 10 g/L VeruSOL, and 250 mg/L Fe-NTA at total flow rate of 0.5 mL/min.

The SEPR™ process was optimized by confirming that hydrogen peroxide does not need to be catalyzed for the product recovery effect to occur. Hydrogen peroxide concentrations have been evaluated to optimize dosing and the SEPR™ effect.

Example 9: Comparison of Treatment of Contaminated Soil with Hydrogen Peroxide to Treatment with Hydrogen Peroxide and VeruSOL™

The results of treatment of soil contaminated with TPH with the SEPR™ and S-ISCO™ processes with and without the inclusion of Fe-EDTA in the SEPR™ process is presented in FIG. 38.

Example 10: Comparison of Treatment of Contaminated Soil with Hydrogen Peroxide to Treatment with Hydrogen Peroxide and VeruSOL™

A comparison of the results of treatment of soil contaminated with manufactured gas plant (MGP) dense non-aqueous phase liquid (DNAPL) with VeruSOL™, with Fenton's reagent, with heat, and with the SEPR™ process is presented in FIG. 39. The concentration of TPH in the sacrificed soil for the various treatments is shown. In this experiment, the soil for each condition contained the same concentration of TPH, and the test for each condition (each bar) was performed for the same duration of time.

Example 11: Surfactant Enhanced Product Recovery (SEPR™) Site Remediation

FIGS. 40 and 41 present cartoons illustrating the SEPR™ (facilitated remediation) process. The SEPR™ process exhibits enhanced contaminant (product) recovery when compared with Fenton chemistry and catalyzed hydrogen peroxide treatment.

Example 12: Surfactant Enhanced Product Recovery (SEPR™ and S-ISCO) Site Remediation FIG. 42 presents a plan view of a site undergoing remediation. The area marked with diagonal lines represents a contaminated zone 4626 square feet in area. FIG. 43A presents a plan view of the site prior to treatment. Zones in which non-aqueous phase liquid (NAPL) and no water is observed in wells 2102, zones in which NAPL and water is observed in wells 2104, and zones in which water and no NAPL is observed in wells 2106 are shown and provide an indication of the extent of contamination. FIG. 43B presents a plan view of the site after 4 weeks of SEPR™ treatment. A 60% to 75% reduction in the extent of the contaminant plume can be observed. FIG. 44A presents an elevation view of the site prior to treatment. FIG. 44B presents an elevation view of the site after 5 weeks of treatment.

Example 13: Steps for Surfactant Enhanced Product Recovery (SEPR™) Remediation

An example of steps in a Surfactant Enhanced Product Recovery (SEPR™) process is presented below:
1) Obtain a sample of the material to be extracted including the contaminant, such as NAPL, LNAPL, or DNAPL, and the mineral matrix.
2) Test pretreatment of the materials using chemical oxidants to test viscosity, surface tension, and density changes.
3) Conduct testing of various mixtures of surfactants and cosolvents of the optimal formation of emulsions. The optimal formation leads to the maximum mass of contaminant extraction while still maintaining an emulsion system and minimizing the mass of surfactants and cosolvents needed for optimal emulsification.
4) Test the addition of salts, acids, and bases on the destabilization of colloids and on the effectiveness of the surfactant-cosolvent properties.
5) Conduct testing on the effects of adding various concentrations of biopolymers on the viscosity and density of the emulsion. The optimum choice of biopolymer and dose is one which increases the viscosity to a desired point for transport through the reservoir (or reactor) and for extraction recovery.
6) Test the effects of added heat on each of the above properties.
7) Conduct a field test using a sequence of treatment, oxidation, surfactant-cosolvent extraction, biopolymer addition to the emulsion or immediately following the surfactant-cosolvent addition.
8) Push the emulsified contaminant with water or brine into a zone of extraction removal.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES (1) Hoag, G. E.; Chheda, P.; Woody, B. A.; Dobbs, G. M. "Chemical Oxidation of Volatile Organic Compounds," U.S. Pat. No. 6,019,548. Issued Feb. 1, 2000.

(2) Hoag, G. E.; Chheda, P.; Woody, B. A.; and Dobbs, G. M. "Chemical Oxidation of Volatile Organic Compounds," U.S. Pat. No. 6,474,908. Issued Nov. 5, 2002.

(3) Huang, K., Couttenye, R. A., and Hoag, G. (2002) Kinetics of heat-assisted persulfate oxidation of methyl tert-butyl ether (MTBE). *Chemosphere* 49 (4), 413-420.

(4) Liang, C., Bruell, C., Marley, M., and Sperry, K. (2003) Thermally activated persulfate oxidation of trichloroethylene (TCE) and 1,1,1-trichloroethane (TCA) in aqueous systems and soil slurries. *Soil and Sediment Contamination* 12 (2), 207-228.

(5) Couttenye, R. A.; Huang, K. C.; Hoag, G. E.; Suib, S. L. Evidence of Sulfate Free Radical ($SO_4^-$.) Formation under Heat-assisted Persulfate Oxidation of MTBE. *Proceedings of the $19^{th}$ Petroleum Hydrocarbons and Organic Chemicals in Ground Water: Prevention, Assessment, and Remediation, Conference and Exposition*, Atlanta, Ga., United States, Nov. 5-8, 2002, 345-350.

(6) Berlin, A. A. *Kinetics and Catalysis*. 1986, 27, 34-39.

(7) House, D. A. *Chem. Rev.* 1962, 62, 185-200.

(8) Kolthoff, I. M.; Medalia, A. I.; Raaen, H. P. *Journal of American Chemical Society*. 1951, 73, 1733-1739.

(9) Kislenko, V. N.; Berlin, A. A.; Litovchenko, N. V. *Russian Journal of General Chemistry*. 1995, 65, 7, 1092-1096.

(10) Kislenko, V. N.; Berlin, A. A.; Litovchenko, N. V. *Kinetics and Catalysis*. 1997, 38, 3, 391-396.

(11) Brown, R., Robinson, D., Sethi, D., and Block, P. Second generation persulfate ISCO. Second International Conference on Oxidation and Reduction Technologies for In-Situ Treatment of Soil and Groundwater. Toronto, Canada.

(12) Hoag, G. E., and Mao, Feng, An Analysis of Chelated Iron Activated Persulfate-Mechanisms and Reactions, The Third International Conference on Oxidation and Reduction Technologies for In-Situ Treatment of Soil and Groundwater (ORTs-3). 2004. San Diego, Calif., Oct. 24-28, 2004.

(13) Liang, C., Bruell, C., Marley, M., and Sperry, K. (2004) Persulfate oxidation for in situ remediation of TCE: II. Activated by chelated ferrous ion. Chemosphere 55 (9), 1225-1233.

(14) Robinson, D., Brown, R., Dablow, J, and Rowland, K. (2004) Chemical oxidation of MGP residuals and dicyclopentadiene at a former MGP site, Proceedings of the Fourth International Conference on the Remediation of Chlorinated and Recalcitrant Compounds, Monterey, Calif., May 2004. Batelle Press, Columbus, Ohio.

(15) Block, P. A., Brown, R. A., and Robinson, D. (2004) Novel activation technologies for sodium persulfate in situ chemical oxidation, Proceedings of the Fourth International Conference on the Remediation of Chlorinated and Recalcitrant Compounds, Monterey, Calif., May 2004. Batelle Press, Columbus, Ohio.

(16) Zhai, X, Hua, I., and Rao, P. S. C. (2004) Cosolvent-enhanced chemical oxidation of PCE by potassium permanganate: Laboratory-scale evaluation, The Third International Conference on Oxidation and Reduction Technologies for In-Situ Treatment of Soil and Groundwater (ORTs-3). 2004. San Diego, Calif., Oct. 24-28, 2004.

(17) Dugan, P. J., Siegrist, R. L., Crimi, M. L., and Divinr, C. E. (2004) Coupling surfactants/cosolvents with oxidants: Effects on remediation and performance assessment, The Third International Conference on Oxidation and Reduction Technologies for In-Situ Treatment of Soil and Groundwater (ORTs-3). 2004. San Diego, Calif., Oct. 24-28, 2004.
(18) Young, C. M., Dwarakanath, V., Mailk, T., Milner, L, Chittet, J., Jazdanian, A., Huston, N, and Weerasooryia, V. (2002) In-situ remediation of Coal-Tar Impacted Soil by Biopolymer-surfactant flooding, Proceedings of the Second International Conference on the Remediation of Chlorinated and Recalcitrant Compounds, Monterey, Calif., May 2002. Batelle Press, Columbus, Ohio.
(19) Carvel, D. D., and Cartwright, R. T. (2005) Innovative heavy oil contaminant remediation at typical MGP remediation sites. Unpublished data from web sites: http://www.mecx.net/services1.html.
(20) Falta, R. W. (1998) Using Phase Diagrams to Predict the Performance of Cosolvent Floods for NAPL Remediation. Ground Water Monit. Rem. 18 (3), 227-232.
(21) Shiau, B. J., Sabatini, D. A., and Harwell, J. H. (1994) Solubilization and mobilization of DNAPLs using direct food additive (edible) surfactants. Ground Water 32, 561-569.
(22) Martel, R.; Gelinas, P. J.; Desnoyers, J. E.; Masson, A. (1993) Phase Diagrams to Optimize Surfactant Solutions for Oil and DNAPL Recovery in Aquifers, Ground Water, 31, 789-800.
(23) Martel, R., and Gelinas, P. (1996) Surfactant solutions developed for NAPL recovery in contaminated aquifers. Ground Water, 34, 143-154.
(24) Chun, H. and Scriven, L. E. Hydrodynamic model of steady movement of a solid/liquid/fluid contact line. *J. Colloid Interface Sci.*, 35:85-101, 1971.
(25) Kotterman, M. J. J., Rietberg, H. J., Hage, A., Field, J. A. (1997) Polycyclic aromatic hydrocarbon oxidation by white-rot fungus *Bjerkandera* sp. Strain BOS55 in the presence of non-ionic surfactants. Biotechnology and Bioengineering, 57, 220-227.
(26) Tawitz, J. W., Annable, M. D., Rao, P. S. C., and Rhue, R. D. (1998) Field implementation of a Winsor Type I surfactant/alcohol mixture for in situ solubilization of a complex LNAPL as a single phase microemulsion. Environmental Science and Technology, 32, 523-530.

We claim:

1. A method for decreasing an amount of a contaminant at a site in a subsurface, wherein at least a portion of the contaminant is non-aqueous phase liquid (NAPL), comprising:
introducing a liquid oxidant prior to or simultaneously with a surfactant into the subsurface;
generating gaseous oxygen in the subsurface in the form of bubbles by decomposition of the liquid oxidant;
allowing the oxygen bubbles to hydrodynamically scrub soil particles in the subsurface sufficient to release contaminant from the soil particles and form extractable NAPL contaminant in the subsurface;
extracting NAPL contaminant from the subsurface;
wherein the liquid oxidant is a gas phase generating oxidant; and
wherein the extracting of NAPL reduces the amount of the contaminant in the subsurface.

2. The method of claim 1, wherein the contaminant is extracted from the subsurface through an extraction well, and the surfactant is introduced as a fluid into the subsurface at an injection locus.

3. The method of claim 1, further comprising:
selecting a remediation zone including the contaminant;
allowing the oxidant to establish an oxidation zone in the subsurface;
providing an extraction well; and
inducing the flow of contaminant toward the extraction well to establish an extraction zone,
wherein the oxidation zone and the extraction zone lie within the remediation zone, and the oxidation zone prevents spread of the contaminant beyond the remediation zone.

4. The method of claim 3, wherein the contaminant migrates downgradient along streamlines that pass through the contaminated site and wherein the oxidation zone intercepts the streamlines that pass through the contaminated site.

5. The method of claim 3, wherein the oxidant is introduced into the subsurface at an injection locus, and wherein the injection locus is the extraction well.

6. The method of claim 3, wherein the oxidant is introduced into the subsurface in an injection well, and wherein a plurality of extraction wells surrounds the injection well.

7. The method of claim 3, wherein the oxidant is introduced into the subsurface through a plurality of injection wells, and wherein the plurality of injection wells surrounds the extraction well.

8. The method of claim 3, wherein the surfactant is injected through a well upgradient of the contaminated site.

9. The method of claim 1, further comprising introducing an iron nanoparticle into the subsurface.

10. The method of claim 1, wherein the surfactant is a biodegradable surfactant, is a naturally occurring plant extract, or is made from a naturally occurring plant extract.

11. The method of claim 1, further comprising introducing a base selected from the group consisting of sodium hydroxide, alkali carbonate, alkali bicarbonate, and sodium bicarbonate into the subsurface.

12. The method of claim 1, comprising introducing a chelated metal activator into the subsurface.

13. The method of claim 12, wherein the chelated metal activator is selected from the group consisted of a chelated iron activator, Fe-NTA (iron-nitrilotriacetic acid), Fe(II)-EDTA (iron II-ethylenediaminetetraacetic acid), Fe(III)-EDTA (iron III-ethylenediaminetetraacetic acid), Fe(II)-citric acid, Fe(III)-citric acid, Fe(II)-EDDS (iron II-ethylenediaminedisuccinic acid), Fe(III)-EDDS (iron III-ethylenediaminedisuccinic acid), Fe(II)-DTPA (iron(II)-diethylenetriaminepentaacetic acid), Fe(III)-DPTA (iron(III)-diethlyenetriaminepentaacetic acid), and combinations.

14. The method of claim 1, wherein the introduction of the oxidant and the surfactant and the extraction of the contaminant produced simultaneously.

15. The method of claim 1, wherein a mixture in the subsurface comprising the contaminant and the surfactant has an interfacial tension of at least the interfacial tension associated with the critical micelle concentration of the surfactant.

16. The method of claim 1, further comprising:
allowing the surfactant to solubilize and/or desorb contaminant; and
allowing the oxidant to oxidize contaminant,
wherein an overall rate of oxidation of contaminant is controlled to a predetermined value and an overall rate of solubilization of contaminant is controlled to a predetermined value by selecting the oxidant and surfactant and adjusting the concentrations of oxidant and surfactant, so that the rate of oxidation of contaminant is greater than, less than, or equal to the rate of solubilization of contaminant.

17. The method of claim 1, further comprising:
obtaining a sample from the contaminated site or composing a simulated or analogous sample;
testing the sample with various concentrations of oxidant and surfactant under various conditions of temperature, pressure, and flow rate of oxidant and surfactant;
determining the rate of mobilization of the contaminant under the various conditions; and
selecting optimum oxidant and surfactant for introduction into the subsurface, optimum concentrations of oxidant and surfactant for injection into the subsurface, and optimum temperature, pressure, and flow rate conditions for decreasing the amount of contaminant and the site of the subsurface.

18. The method of claim 1, wherein the oxidant comprises a peroxide or hydrogen peroxide.

19. The method of claim 1, wherein the surfactant is a non-ionic surfactant.

20. The method of claim 1, comprising introducing an activator.

21. The method of claim 1, wherein the surfactant has a hydrophilic-lipophilic balance (HLB) value within the range of between 10 and 15.

22. The method of claim 21, wherein the surfactant has an HLB value within the range of 10 to 12.

23. The method of claim 21, wherein the surfactant has an HLB value within the range of 12 to 15.

24. The method of claim 1, comprising the step of introducing an iron nanoparticle into the subsurface.

25. A method for decreasing an amount of a contaminant at a site in a subsurface, wherein at least a portion of the contaminant is non-aqueous phase liquid (NAPL), comprising:
introducing an oxidant prior to or simultaneously with a surfactant into the subsurface;
generating gaseous oxygen in the subsurface in the form of bubbles by decomposition of the oxidant;
allowing the oxygen bubbles to hydrodynamically scrub soil particles in the subsurface sufficient to release contaminant from the soil particles and form extractable contaminant in the subsurface;
extracting extractable contaminant from the subsurface;
wherein the oxidant is a gas phase generating oxidant;
and wherein the extracting of NAPL contaminant reduces the amount of the contaminant in the subsurface.

26. The method of claim 25, wherein the surfactant has a hydrophilic-lipophilic balance (HLB) value within the range of between 10 and 15.

27. The method of claim 26, wherein the surfactant has an HLB value within the range of 10 to 12.

28. The method of claim 26, wherein the surfactant has an HLB value within the range of 12 to 15.

29. The method of claim 25, comprising the step of introducing an iron nanoparticle into the subsurface.

30. A method for decreasing an amount of a contaminant at a site in a subsurface, wherein at least a portion of the contaminant is extractable, comprising:
introducing an oxidant prior to or simultaneously with a surfactant into the subsurface;
introducing an antioxidant into the subsurface;
extracting extractable contaminant from the subsurface;
characterizing the amount and/or distribution of contaminant in the subsurface;
wherein the extracting of contaminant and the introducing of oxidant and surfactant reduces the amount of the contaminant.

31. The method of claim 30, wherein the surfactant has a hydrophilic-lipophilic balance (HLB) value within the range of between approximately 10 and approximately 15.

32. The method of claim 31, wherein the surfactant has an HLB value within the range of approximately 10 to approximately 12.

33. The method of claim 31, wherein the surfactant has an HLB value within the range of approximately 12 to approximately 15.

* * * * *